(12) United States Patent
Donzelli et al.

(10) Patent No.: US 10,677,304 B2
(45) Date of Patent: *Jun. 9, 2020

(54) SMART BRAKING DEVICES, SYSTEMS, AND METHODS WITH SIGNAL CONDITIONERS

(71) Applicant: ITT Italia S.r.l., Barge (CN) (IT)

(72) Inventors: Daniele Donzelli, Luserna San Giovanni (IT); Mattia Solari, Barge (IT); Marco Terranova, Turin (IT); Stefano Serra, San Pietro Val Lemina (IT); Luca Martinotto, Legnano (IT)

(73) Assignee: ITT Italia S.r.l., Barge (CN) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,530

(22) Filed: Feb. 12, 2019

(65) Prior Publication Data

US 2019/0249736 A1 Aug. 15, 2019

Related U.S. Application Data

(63) Continuation of application No. 15/279,224, filed on Sep. 28, 2016, now Pat. No. 10,208,822, which is a (Continued)

(30) Foreign Application Priority Data

May 28, 2015 (IT) .......................... 102015000018701
May 28, 2015 (IT) .......................... 102015000018714
(Continued)

(51) Int. Cl.
*F16D 66/02* (2006.01)
*F16D 66/00* (2006.01)
(Continued)

(52) U.S. Cl.
CPC ......... *F16D 66/021* (2013.01); *F16D 65/092* (2013.01); *F16D 66/00* (2013.01);
(Continued)

(58) Field of Classification Search
CPC ............. F16D 2066/005; F16D 66/021; F16D 66/022; F16D 65/00; G01B 17/02; G01L 27/002
(Continued)

(56) References Cited

U.S. PATENT DOCUMENTS 2,289,954 A 7/1942 Arndt
3,689,880 A 9/1972 McKee et al.
(Continued)

FOREIGN PATENT DOCUMENTS

DE 100 06 012 A1 9/2000
DE 10230008 A1 1/2004
(Continued)

OTHER PUBLICATIONS

U.S. Appl. No. 15/167,883 and its entire file history, filed May 27, 2016, Serra et al.
(Continued)

*Primary Examiner* — Christopher P Schwartz
(74) *Attorney, Agent, or Firm* — Knobbe, Martens, Olson & Bear, LLP

(57) ABSTRACT

Various braking devices, systems, and methods are disclosed. In some embodiments, the braking device includes a support element, a block of friction material supported by the support element, at least one piezoceramic sensor supported by the support element and interposed between the block of friction material (and the support element, and a protective element located at the piezoceramic sensor and embedding the latter. The protective element can have one or more layers of resin-based material applied to protect the
(Continued)

piezoceramic sensor and direct a predetermined part of the external compression force onto an area of the support element surrounding the piezoceramic sensor. In some embodiments, a signal transduction device is provided and includes at least one piezoceramic sensor supported on a support element and has an integral protective coating having properties of mechanical and temperature resistance.

20 Claims, 29 Drawing Sheets

Related U.S. Application Data continuation of application No. 15/167,883, filed on May 27, 2016, now Pat. No. 9,939,035.

(30) Foreign Application Priority Data

| May 28, 2015 | (IT) | .................. | 102015000018748 |
|---|---|---|---|
| May 28, 2015 | (IT) | .................. | 102015000018771 |

(51) Int. Cl.
*F16D 65/092* (2006.01)
*G01L 1/16* (2006.01)
*G01L 5/28* (2006.01)

(52) U.S. Cl.
CPC .................. *G01L 1/16* (2013.01); *G01L 5/28* (2013.01); *F16D 2066/005* (2013.01); *F16D 2066/006* (2013.01)

(58) Field of Classification Search
USPC .............. 188/1.11 E, 1.11 L, 1.11 W, 1.11 R; 340/453, 454; 701/70–72
See application file for complete search history.

(56) References Cited

U.S. PATENT DOCUMENTS

| 3,724,916 | A |   | 4/1973  | Hirzel |   |   |
|---|---|---|---|---|---|---|
| 3,902,157 | A |   | 8/1975  | Kita et al. |   |   |
| 4,023,864 | A |   | 5/1977  | Lang et al. |   |   |
| 4,117,451 | A |   | 9/1978  | Sato et al. |   |   |
| 4,298,857 | A |   | 11/1981 | Robins et al. |   |   |
| 4,456,098 | A | * | 6/1984  | Lindre | .................. | F16D 66/024 |
|   |   |   |   |   |   | 188/1.11 L |
| 4,484,280 | A |   | 11/1984 | Brugger et al. |   |   |
| 4,495,434 | A |   | 1/1985  | Diepers et al. |   |   |
| 4,623,044 | A |   | 11/1986 | Ohta et al. |   |   |
| 4,649,370 | A |   | 3/1987  | Thomason |   |   |
| 4,782,319 | A |   | 11/1988 | Dell'Acqua et al. |   |   |
| 4,854,424 | A |   | 8/1989  | Yamatoh et al. |   |   |
| 4,869,350 | A |   | 9/1989  | Fargier et al. |   |   |
| 4,901,055 | A |   | 2/1990  | Rosenberg et al. |   |   |
| 4,928,030 | A |   | 5/1990  | Culp |   |   |
| 5,099,962 | A |   | 3/1992  | Furusu et al. |   |   |
| 5,115,162 | A | * | 5/1992  | Leonard | .................. | B60T 7/042 |
|   |   |   |   |   |   | 303/DIG. 3 |
| 5,133,431 | A |   | 7/1992  | Braun |   |   |
| 5,176,034 | A |   | 1/1993  | Hazony et al. |   |   |
| 5,235,135 | A |   | 8/1993  | Knecht et al. |   |   |
| 5,302,940 | A |   | 4/1994  | Chen |   |   |
| 5,406,682 | A |   | 4/1995  | Zimnicki et al. |   |   |
| 5,416,415 | A |   | 5/1995  | Dorri et al. |   |   |
| 5,419,415 | A |   | 5/1995  | Lamb et al. |   |   |
| 5,660,215 | A |   | 8/1997  | Nishikawa et al. |   |   |
| 5,719,577 | A |   | 2/1998  | Pitot et al. |   |   |
| 5,839,545 | A |   | 11/1998 | Preston et al. |   |   |
| 6,064,970 | A |   | 5/2000  | McMillan et al. |   |   |
| 6,179,091 | B1 |   | 1/2001  | Takanashi |   |   |
| 6,204,786 | B1 |   | 3/2001  | Bieth et al. |   |   |
| 6,310,545 | B1 |   | 10/2001 | Sapir |   |   |
| 6,339,956 | B1 |   | 1/2002  | Huinink et al. |   |   |
| 6,345,225 | B1 |   | 2/2002  | Bohm et al. |   |   |
| 6,477,893 | B1 |   | 11/2002 | Djordjevic |   |   |
| 6,529,803 | B2 |   | 3/2003  | Meyers et al. |   |   |
| 6,549,126 | B2 |   | 4/2003  | Hageman et al. |   |   |
| 6,612,736 | B2 |   | 9/2003  | Lee et al. |   |   |
| 6,668,983 | B2 | * | 12/2003 | Drennen | .............. | F16D 55/227 |
|   |   |   |   |   |   | 188/181 T |
| 6,681,631 | B2 |   | 1/2004  | Apel |   |   |
| 6,813,581 | B1 |   | 11/2004 | Snyder |   |   |
| 6,823,242 | B1 |   | 11/2004 | Ralph |   |   |
| 6,934,618 | B2 |   | 8/2005  | Eckert et al. |   |   |
| 7,124,639 | B1 |   | 10/2006 | Kurtz et al. |   |   |
| 7,127,948 | B2 |   | 10/2006 | Tavares et al. |   |   |
| 7,451,653 | B1 |   | 11/2008 | Sippola |   |   |
| 7,694,555 | B2 |   | 4/2010  | Howell et al. |   |   |
| 8,026,802 | B2 |   | 9/2011  | Shimura |   |   |
| 8,287,055 | B2 |   | 10/2012 | Lee |   |   |
| 8,573,045 | B2 |   | 11/2013 | Gotschlich |   |   |
| 8,676,721 | B2 |   | 3/2014  | Piovesan et al. |   |   |
| 8,717,158 | B2 |   | 5/2014  | Roach |   |   |
| 8,729,938 | B2 |   | 5/2014  | Watanabe |   |   |
| 8,789,896 | B2 |   | 7/2014  | Albright et al. |   |   |
| 8,958,966 | B2 |   | 2/2015  | Nohira et al. |   |   |
| 9,187,099 | B2 |   | 11/2015 | Powers et al. |   |   |
| 9,269,202 | B2 |   | 2/2016  | Phelan et al. |   |   |
| 9,286,736 | B2 |   | 3/2016  | Punjabi et al. |   |   |
| 9,316,278 | B2 |   | 4/2016  | Moore et al. |   |   |
| 9,415,757 | B2 |   | 8/2016  | Martinotto et al. |   |   |
| 9,635,467 | B2 |   | 4/2017  | Miyoshi et al. |   |   |
| 9,939,035 | B2 | * | 4/2018  | Donzelli | .................. | F16D 66/00 |
| 9,964,167 | B2 |   | 5/2018  | Martinotto et al. |   |   |
| 9,988,024 | B2 |   | 6/2018  | Schwartz et al. |   |   |
| 10,138,968 | B2 |   | 11/2018 | Serra et al. |   |   |
| 10,208,822 | B2 | * | 2/2019  | Donzelli | .................. | F16D 66/00 |
| 10,227,064 | B2 |   | 3/2019  | Serra et al. |   |   |
| 10,295,006 | B2 |   | 5/2019  | Serra et al. |   |   |
| 2001/0042661 | A1 |   | 11/2001 | Treyde |   |   |
| 2002/0047496 | A1 |   | 4/2002  | Wierach |   |   |
| 2002/0095253 | A1 |   | 7/2002  | Losey et al. |   |   |
| 2004/0041464 | A1 |   | 3/2004  | Eckert et al. |   |   |
| 2004/0187591 | A1 |   | 9/2004  | Baumann et al. |   |   |
| 2004/0242803 | A1 |   | 12/2004 | Ohme et al. |   |   |
| 2005/0029056 | A1 |   | 2/2005  | Baumgartner et al. |   |   |
| 2005/0103580 | A1 |   | 5/2005  | Kramer |   |   |
| 2006/0076196 | A1 |   | 4/2006  | Palladino |   |   |
| 2006/0254868 | A1 |   | 11/2006 | Thiesing et al. |   |   |
| 2007/0024113 | A1 |   | 2/2007  | Thrush |   |   |
| 2007/0228824 | A1 |   | 10/2007 | Yasukawa et al. |   |   |
| 2007/0284713 | A1 |   | 12/2007 | Ninomiya et al. |   |   |
| 2009/0033146 | A1 |   | 2/2009  | Rieth et al. |   |   |
| 2009/0133971 | A1 |   | 5/2009  | Baier-Welt |   |   |
| 2009/0157358 | A1 |   | 6/2009  | Kim |   |   |
| 2009/0187324 | A1 |   | 7/2009  | Lu et al. |   |   |
| 2010/0186938 | A1 |   | 7/2010  | Murata et al. |   |   |
| 2010/0211249 | A1 |   | 8/2010  | McClellan |   |   |
| 2010/0250081 | A1 |   | 9/2010  | Kinser et al. |   |   |
| 2011/0050406 | A1 |   | 3/2011  | Hennig et al. |   |   |
| 2011/0125381 | A1 |   | 5/2011  | Szell et al. |   |   |
| 2013/0048443 | A1 |   | 2/2013  | Muramatsu et al. |   |   |
| 2014/0097951 | A1 |   | 4/2014  | Grgic |   |   |
| 2014/0200784 | A1 |   | 7/2014  | Nohira et al. |   |   |
| 2014/0257605 | A1 |   | 9/2014  | Beck et al. |   |   |
| 2014/0311833 | A1 | * | 10/2014 | Martinotto | .............. | F16D 65/08 |
|   |   |   |   |   |   | 188/1.11 E |
| 2014/0337086 | A1 |   | 11/2014 | Asenjo et al. |   |   |
| 2015/0112515 | A1 |   | 4/2015  | Conway |   |   |
| 2016/0014526 | A1 |   | 1/2016  | Miyoshi et al. |   |   |
| 2016/0146279 | A1 |   | 5/2016  | Philpott |   |   |
| 2016/0341622 | A1 |   | 11/2016 | Mensa |   |   |
| 2017/0002883 | A1 |   | 1/2017  | Donzelli et al. |   |   |
| 2017/0030424 | A1 |   | 2/2017  | Martinotto et al. |   |   |
| 2017/0052028 | A1 |   | 2/2017  | Choudhury et al. |   |   |
| 2017/0082163 | A1 |   | 3/2017  | Serra et al. |   |   |
| 2017/0082164 | A1 |   | 3/2017  | Serra et al. |   |   |
| 2017/0082165 | A1 |   | 3/2017  | Donzelli et al. |   |   |
| 2017/0082166 | A1 |   | 3/2017  | Serra et al. |   |   |
| 2017/0082167 | A1 |   | 3/2017  | Serra et al. |   |   |
| 2017/0331030 | A1 |   | 11/2017 | Inoue et al. |   |   |

(56) References Cited

U.S. PATENT DOCUMENTS

| | | | |
|---|---|---|---|
| 2018/0160248 | A1 | 6/2018 | Murakami et al. |
| 2018/0231084 | A1 | 8/2018 | Donzelli et al. |
| 2018/0306262 | A1 | 10/2018 | Martinotto et al. |
| 2019/0003541 | A1 | 1/2019 | Serra et al. |

FOREIGN PATENT DOCUMENTS

| | | | |
|---|---|---|---|
| DE | 10243127 A1 | 3/2004 | |
| DE | 10259629 A1 | 7/2004 | |
| DE | 10 2005 052630 A1 | 3/2007 | |
| DE | 10 2006 018 952 A1 | 10/2007 | |
| DE | 10 2006 053 489 B4 | 5/2008 | |
| DE | 10 2010 010482 A1 | 8/2011 | |
| EP | 0 189 076 A2 | 7/1986 | |
| EP | 0 601 681 A1 | 6/1995 | |
| EP | 0744558 A1 | 11/1996 | |
| EP | 1431606 A1 | 6/2004 | |
| EP | 1530037 A1 | 5/2005 | |
| EP | 1531110 A2 | 5/2005 | |
| EP | 1923592 B1 | 5/2008 | |
| EP | 2741063 A1 | 6/2014 | |
| EP | 2778462 A1 | 9/2014 | |
| EP | 2570691 A1 | 10/2014 | |
| FR | 2815040 A1 | 4/2002 | |
| GB | 2309057 A | 7/1997 | |
| GB | 2372825 A | 9/2002 | |
| GB | 2478423 A | 9/2011 | |
| JP | H11 94707 A | 4/1999 | |
| JP | 2002-130348 A | 5/2002 | |
| JP | 2006-193091 A | 7/2006 | |
| JP | 2007-224988 | 9/2007 | |
| KR | 2009-0057640 A | 6/2009 | |
| KR | 10-2004-48957 A | 6/2010 | |
| KR | 2011- 0043849 A | 4/2011 | |
| WO | WO 2014/170726 A1 | 10/2014 | |
| WO | WO 2014/170849 A1 | 10/2014 | |
| WO | WO 2015/013217 A1 | 1/2015 | |
| WO | WO 2016/038533 A1 | 3/2016 | |

OTHER PUBLICATIONS

U.S. Appl. No. 15/184,806 and its entire file history, filed Jun. 16, 2016, Martinotto et al.
U.S. Appl. No. 15/268,039 and its entire file history, filed Jun. 16, 2016, Serra et al.
U.S. Appl. No. 15/268,179 and its entire file history, filed Sep. 16, 2016, Serra et al.
U.S. Appl. No. 15/947,008 and its entire file history, filed Apr. 6, 2018, Donzelli et al.
U.S. Appl. No. 16/020,680 and its entire file history, filed Jun. 27, 2018, Donzelli et al.
U.S. Appl. No. 16/250,856 and its entire file history, filed Jan. 17, 2019, Serra et al.
European Search Report; European Application No. EP 14158449; dated Aug. 6, 2014.
International Search Report; International Application No. PCT/IB2013/060881; dated Jul. 3, 2014.
International Search Report; International Application No. PCT/IB2014/060778; dated Aug. 6, 2014.
International Search Report; International Application No. PCT/IB2015/056861; dated Jan. 18, 2016.
Italian Search Report and Written Opinion for IT TO2013A000307; dated Mar. 7, 2014, in 3 pages.
Italian Search Report and Written Opinion for Italian Patent Application No. IT UB20151029; dated May 28, 2015; 8 pages.
Italian Search Report and Written Opinion for Italian Patent Application No. IT UB201510291; dated May 28, 2015; 7 pages.
Italian Search Report and Written Opinion for Italian Patent Application No. IT UB20151059; dated May 28, 2015; 7 pages.
Italian Search Report and Written Opinion for Italian Patent Application No. IT UB20151184; dated May 28, 2015; 7 pages.
Italian Search Report Coversheet for Italian Patent Application No. 102015000018714/ITUB20151184; dated Jan. 26, 2016; 1 page.
Italian Search Report Coversheet for Italian Patent Application No. 102015000018748/ITUB20151291; dated Feb. 3, 2016; 1 page.
Italian Search Report Coversheet Italian Patent Application No. 102015000018701 ITUB20151029; dated Feb. 3, 2016; 1 page.
Italian Search Report for Italian Patent Application No. 102015000018771 (UB20151059); dated Jan. 27, 2016; 1 page.
Italian Search Report for Italian Patent Application No. IO 56568 IT (UB20151059); dated Jan. 27, 2016; 1 page.
Italian Search Report for Italian Patent Application No. IO 56568 IT UB20151059; dated Jan. 20, 2016; 7 pages.
Italian Search Report for Italian Patent Application No. IO 56584/ITUB20151184; dated Jan. 14, 2016; 7 pages.
Italian Search Report for Italian Patent Application No. IO 56597/ITUB20151291; dated Jan. 25, 2016; 7 pages.
Italian Search Report Italian Patent Application No. IO 56565/ITUB20151029; dated Jan. 22, 2016; 8 pages.
Von Wagner, et al.: Active Control of Brake Squeal via "Smart Pads"; Oct. 10, 2004.
"The Next Generation of Hub Units"; SKF Group; 2012, www.vsm.skf.com; 32 pages.
Solyom, Stefan, et al.; "Synthesis of a Model-Based Tire Slip Controller"; 2004; Vehicle System Dynamics, pp. 475-499; http://dx.doi.org/10.1080/0042311051233 13868.
Gustafsson, Fredrik; "Slip-based Tire-Road Friction Estimation"; Automatica, 1997; vol. 33, No. 6; pp. 1087-1099.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Capra, D. et al.; An ABS Control Logic Based on Wheel Force Measurement. In: Vehicle System Dynamics; vol. 50, No. 12, pp. 1779-1796; http://porto.polito.it/2497487/.
Ait-Hammouda, Islam; "Jumps and Synchronization in Anti-Lock Brake Algorithms"; Oct. 2008, Japan, 7 pages; https://hal.archives-ouvertes.fr/hal-00525788.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; peg. 81-97.
Ray, Laura; "Nonlinear Tire Force Estimation and Road Friction Identification: Simulation and Experiments"; Automatica, vol. 33, No. 10, pp. 1819-1833; 1997.
Italian Search Report, IO 58761 (IT UB20153706), dated May 25, 2016, 8 pages.
Italian Search Report, IO 58837 (IT UB20153709), dated May 31, 2016, 7 pages.
International Search Report and Written Opinion; International Application No. PCT/EP2017/054455, filed on Feb. 27, 2017; dated May 3, 2017.

\* cited by examiner

Two-Stages Manufacturing Process

- Back plate production
  - Screen printing Deposition
  - Component Mounting & Placement
  - Soldering
  - Product electromechanical Testing

- Friction material deposition
  - Incoming & storage management of back plate
  - Friction Material printing & Oven Curing
  - Pad Calibration
  - Finishing
  - End of Online Testing

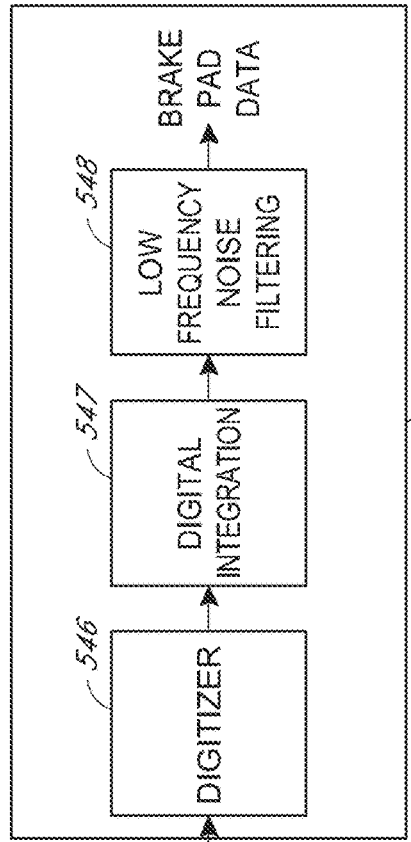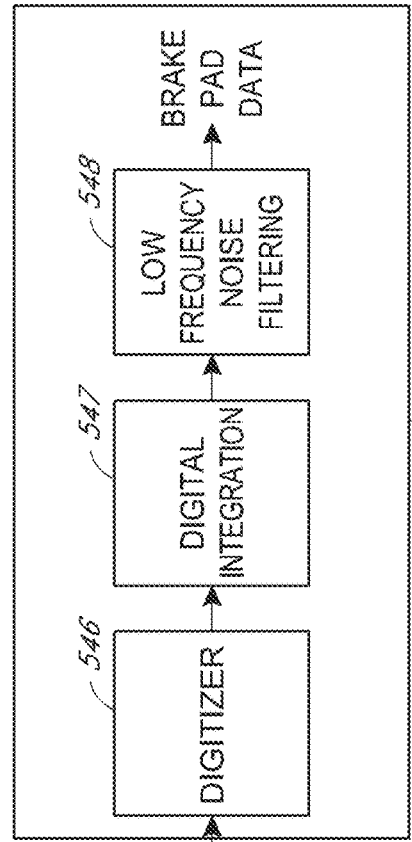
FIG. 27D
FIG. 27E

SMART BRAKING DEVICES, SYSTEMS, AND METHODS WITH SIGNAL CONDITIONERS

CROSS-REFERENCE

This application is a continuation of U.S. patent application Ser. No. 15/279,224, filed Sep. 28, 2016, which is a continuation of U.S. patent application Ser. No. 14/167,883, filed May 27, 2016, which is hereby incorporated by reference under 37 CFR 1.57. Also, any applications for which a foreign or domestic priority claim is identified in the Application Data Sheet as filed with the present application are hereby incorporated by reference under 37 CFR 1.57.

BACKGROUND

Field

The following disclosure relates to braking devices, systems, and methods, such as vehicle braking devices having one or more sensors. Some portions of this disclosure relate to signal transduction devices that are suitable for operating in harsh physical conditions, such as in the presence of high mechanical or thermal stresses.

Description of Certain Related Art

Piezoelectric sensors exploit the property of some crystalline materials of polarizing themselves generating a potential difference when they are subjected to mechanical deformation and deforming themselves in an elastic way when a current passes through them. Among the most common applications that make use of piezoelectric sensors are cooker gas igniters, seismic instruments, acoustic and musical instruments, pressure detectors, time detectors, microphones, sound generators, motion actuators, ultrasonic probes, etc. The use of piezoelectric sensors has spread mainly in areas where high resistance to the thermal and mechanical stresses found in nature is not required.

SUMMARY OF CERTAIN FEATURES

The systems, methods and devices described herein have innovative aspects, no single one of which is indispensable or solely responsible for their desirable attributes. Without limiting the scope of the claims, some of the advantageous features will now be summarized.

Braking device (e.g., brake pads) with embedded sensors can aid in detecting and/or predicting numerous problems, such as an abnormal consumption of the brake pads, for example due to the brake pads "touching" the disc even when the brake is not actuated, for example due to poor alignment of the brake calipers, or rather noise, vibration and unwanted screeching during braking.

Providing braking devices with resilient and reliable sensors can be a challenge. Braking devices can be subjected to high temperatures and pressures during the production process and/or that develop during braking. For example, the assembly of the braking device may include the application of a very high compression load in order to implement the permanent joining of the block of friction material to the metallic support element. This crushing force may be of such a magnitude that there is a risk of compromising the structural integrity and consequently also the correct operation of sensors located in the braking device.

In some embodiments, the present disclosure provides a sensorized braking device for vehicles that is both reliable and efficient in detecting the presence and/or magnitude of stresses at the interface with the element being braked during braking.

Certain embodiments provide a reliable production process for the production of a sensorized braking device that is both robust and resistant to high temperatures. This can, for example, increase flexibility of use of sensorized braking device. For example, ceratin variants of the sensorized braking device can be used in applications that are not only for light and industrial vehicles, but also for heavy vehicles (trucks, buses, etc.), such as where the operating temperatures can exceed 600° C.

Some embodiments provide a method for producing a sensorized braking device for vehicles which ensures that the optimal performance of said braking device is maintained over an extended period of time.

In various embodiments, the above-described features, and/or other features, are achieved by means of a braking device for vehicles. The braking device can comprise a support element, a block of friction material supported by the support element, and at least one piezoceramic sensor supported by the support element and interposed between the block of friction material and the support element. In some embodiments, the support element supports at least one protective element enclosing said at least one piezoceramic sensor. The protective element can exhibit mechanical properties adapted to maintain said piezoceramic sensor below its maximum load condition, such as when an external compression force exceeding 400 kg/cm$^2$ is applied to integrate said block of friction material on said support element. Some embodiments use types of piezoelectric sensors other than piezoceramic.

In some configurations, said protective element can be made of an electrically insulating material. In some configurations, said protective element exhibits mechanical properties such as to limit the force transmitted to the piezoceramic sensor when an external compression force is applied to said block of friction material.

In some configurations, said protective element is configured to direct, at least partly, said external compression force onto an area of the support element surrounding said at least one piezoceramic sensor.

The protective element can have various features. For example, in certain implementations, the protective element can function as a mechanical protection against damage due to handling the braking element during the production process, as an electrical insulator for the piezoceramic sensor, and/or as a limiter and deflector of the force transmitted to the piezoceramic sensor.

According to some embodiments, the piezoceramic sensor lies in a raised arrangement on the support element, and the protective element can be made up of a half-shell having an internal contact surface uniform with the external surface of the piezoceramic sensor and a uniform rest base on said support element area. In some configurations, said protective element is generally dome-shaped. In some configurations, said protective element can be made up of a material comprising a resin or made up of a ceramic material.

In some configurations, said protective element has a thermal shield for said at least one piezoceramic sensor. In some configurations, said thermal shield is provided by a thermally insulating layer of said protective element and/or by a thermally insulating element accommodated inside said protective element.

In some configurations, at least one thermally insulating layer covering said support element is provided, whereon said at least one piezoceramic sensor is arranged.

Some embodiments of this disclosure describe a method for constructing a braking device for vehicles. The braking device can comprise a support element, a block of friction material supported by said support element, and at least one piezoceramic sensor interposed between the block of friction material and said support element. The method can include embedding said at least one piezoceramic sensor in a protective element located at said piezoceramic sensor.

The production process according to the present disclosure can take advantage of established non-sensorized braking device technology that already exists on the market. The braking device may employ the same material used for the block of friction material provided for non-sensorized braking devices available on the market.

In some embodiments, the forming process for the sensorized braking device according to the present disclosure envisages the same process temperatures and pressures as those used for known non-sensorized braking devices that experience high temperatures and/or pressures, such as greater that 200° C. and 400 kg/cm$^{2t}$ respectively.

Given that the maximum load conditions that piezoceramic sensors can withstand are well below these pressures, with the present disclosure protective elements are provided that make the actual application of the established technology for non-sensorized braking devices that are on the market possible, thus increasing the likelihood that the integrity of the sensors, and/or of the overall functionality of the braking device, will be maintained.

In some embodiments, braking device can be vulnerable to temperatures and respectively to the pressures that such a device is subjected to during the manufacturing process and/or that develop during braking, such as temperatures and pressure that are higher even than 200° C. and 400 kg/cm$^2$ respectively. This can results in negative effects in terms of performance, reliability and durability.

Some embodiments provide a sensorized braking device for vehicles that within the use temperature interval and in particular up to use temperatures of at least 200° C. is able to withstand stresses that are thermal in nature, allows for proper transmission to the piezoelectric sensors of the mechanical stresses to be detected whilst at the same time adequately protecting its components from excessive mechanical stresses that may cause damage or lead to malfunction.

Certain implementations provide a sensorized braking device for vehicles that is capable of ensuring a stable response of the piezoelectric sensors with the temperature variations in the interval in working temperatures.

Some variants provide a sensorized braking device for vehicles that is both robust and resistant to high temperatures in order to increase its flexibility of use in applications not only for light and industrial vehicles but also for heavy vehicles (Trucks, Buses, etc.) where the operating temperatures can exceed 600° C.

These above-described features, and/or other features, can be achieved by means of a braking device for vehicles. The braking device can comprise a support element supporting a block of friction material, an electrically insulated electrical circuit, and at least one piezoceramic sensor interposed between the block of friction material and the support element. The electrical circuit can be connected to said at least one piezoceramic sensor so as to pick up an electric response signal emitted by said at least one piezoceramic sensor when said braking device is subjected to an external compression force. The braking device can include at least one protective element having one or more layers of resin-based material applied to protect at least said at least one piezoceramic sensor. The at least one protective element can be configured to direct a predetermined part of said external compression force onto an area of the support element surrounding said at least one piezoceramic sensor. The resin-based material can be selected from among materials having substantially stable mechanical properties in a temperature interval, such as an interval between −40° C. and at least 200° C. Various embodiments can be configured to limit or cancel out the variation in the response signal with the temperature variations to which said at least one piezoceramic sensor is exposed in said temperature interval. Such mechanical properties can include at least the elastic modulus and/or shear modulus.

In some configurations said resin-based material is electrically insulating. In some configurations said resin-based material is electrically and thermally insulating.

In some configurations, the thickness of said protective element is not less than the thickness of said piezoceramic sensor. This can aid in providing adequate mechanical protection and/or adequate thermal and electrical insulation properties.

By thickness of the piezoceramic sensor is meant its dimension in the direction that is orthogonal to its resting plate on the support element.

In some configurations said resin-based material has a curing temperature that is below the Curie temperature of the piezoceramic material that constitutes said piezoceramic sensor. The protection element can then be applied without risk of damaging the piezoceramic sensor before or after the latter's mechanical and electrical connection to the electrical circuit.

In some configurations said protective element has mechanical properties so as to limit the force transmitted to the piezoceramic sensor when the external compression force is applied to said block of friction material. In some configurations, said protective element is configured to direct a predetermined part of said external compression force onto an area of the support element surrounding said at least one piezoceramic sensor.

The protective element can have various features. For example, in some implementations, it functions as a mechanical protection against damage due to handling the braking element during the production process, provides electrical insulation for the piezoceramic sensor, and/or functions as a limiter and deflector of the force transmitted to the piezoceramic sensor.

Choosing a material with mechanical properties that are stable over a wide temperature interval allows for a stable response from the piezoceramic sensors within the same temperature interval.

Some embodiments provide a signal transduction device of the piezoelectric type capable of operating also under conditions of high thermal and mechanical stress.

Certain embodiments provide a signal transduction device of the piezoelectric type that is suitable for use in various industrial applications.

Some variants provide a signal transduction device of the piezoelectric type that is simple, robust, precise and reliable in operation.

These above-described features, and/or other features, can be achieved by a signal transduction device. The signal transduction device can comprise at least one piezoceramic sensor supported on a support element and featuring an integral protective coating having properties of mechanical and temperature resistance. The integral protective coating can be in direct or indirect contact with said support element perimetrally to said piezoceramic sensor so as to direct a predetermined part of an external compression force acting on said piezoceramic sensor onto an area of the support element surrounding said piezoceramic sensor.

The protective coating can be formed from a material comprising a resin or a ceramic material. The protective coating can be thermally insulating. The protective coating can be electrically insulating.

The support element can support an electrically insulated electric circuit upon which said piezoceramic sensor is mounted. A thermally insulating layer can be envisaged interposed between said support element and said electrical circuit.

Some embodiments of the signal transduction device can be used in an environment having a temperature of no less than 200° C. Some embodiments of the signal transduction device can be advantageous in any application involving high temperatures and pressure (at least potentially).

The high temperature technology coupled with the screen printing technology, sensor, and welding pastes derived from the sensorized braking pad technology provides the high temperature resistance to the application.

The adoption of specific material for the protective coating can increase the robustness with respect the pressure application. For example, the use of material for the protective coating with an elastic modulus smaller than those typical of the piezoceramic materials will imply a damping effect lowering the applied forces to the piezoceramic sensor.

An aspect that may be important to consider is that the high load applied may require an increase in the dimension of the piezoceramic sensor to withstand to such large applied load while keeping the real applied load on the piezoceramic sensor well below its mechanical rupture limit.

In the opposite direction an amplification effect increasing the applied forces to the piezoceramic sensor will be obtained in cases when a harder material for the protective coating will be used. This will be advantageous in any case where an amplification is required because forces to be measured are too small or piezoceramic sensor sensitivity is not enough to cover the whole range of measured values.

An example application, when a damping effect is required, is a pressure sensor for oil extraction plants, where pressures and temperatures can be very high. Another example is in the automotive sector, such as in a pressure sensor for the injection control of the engines. Here again pressures and temperatures are extremely high. The advantage would be to have smaller and cheaper sensors but keeping a good sensitivity in the range of pressures to be measured for these specific applications. Another example, when an amplification effect is required, may be in the biomedical sector where comparable sensitivities can be reached by smaller pressure sensors with lower costs.

Among the various possible applications, the signal transduction device according to the present disclosure can preferably be integrated into a strength meter or a linear movement actuator, for example the actuator of a tool of a machine for hot-working a part, or a vibrator.

This disclosure incorporates by reference the entirety of U.S. Patent Application Publication No. 2014/0311833, filed Dec. 13, 2013.

BRIEF DESCRIPTION OF THE DRAWINGS

Further characteristics and advantages of the present disclosure will become clear from the following description of an exemplary non limiting embodiment given purely by way of example and with reference to the drawings attached, in which:

FIG. 27D is a schematic diagram of another embodiment of an electrical system for generating brake pad data.

FIG. 27E is a schematic diagram of another embodiment of an electrical system for generating brake pad data.

DETAILED DESCRIPTION OF CERTAIN EMBODIMENTS

Figure 1:
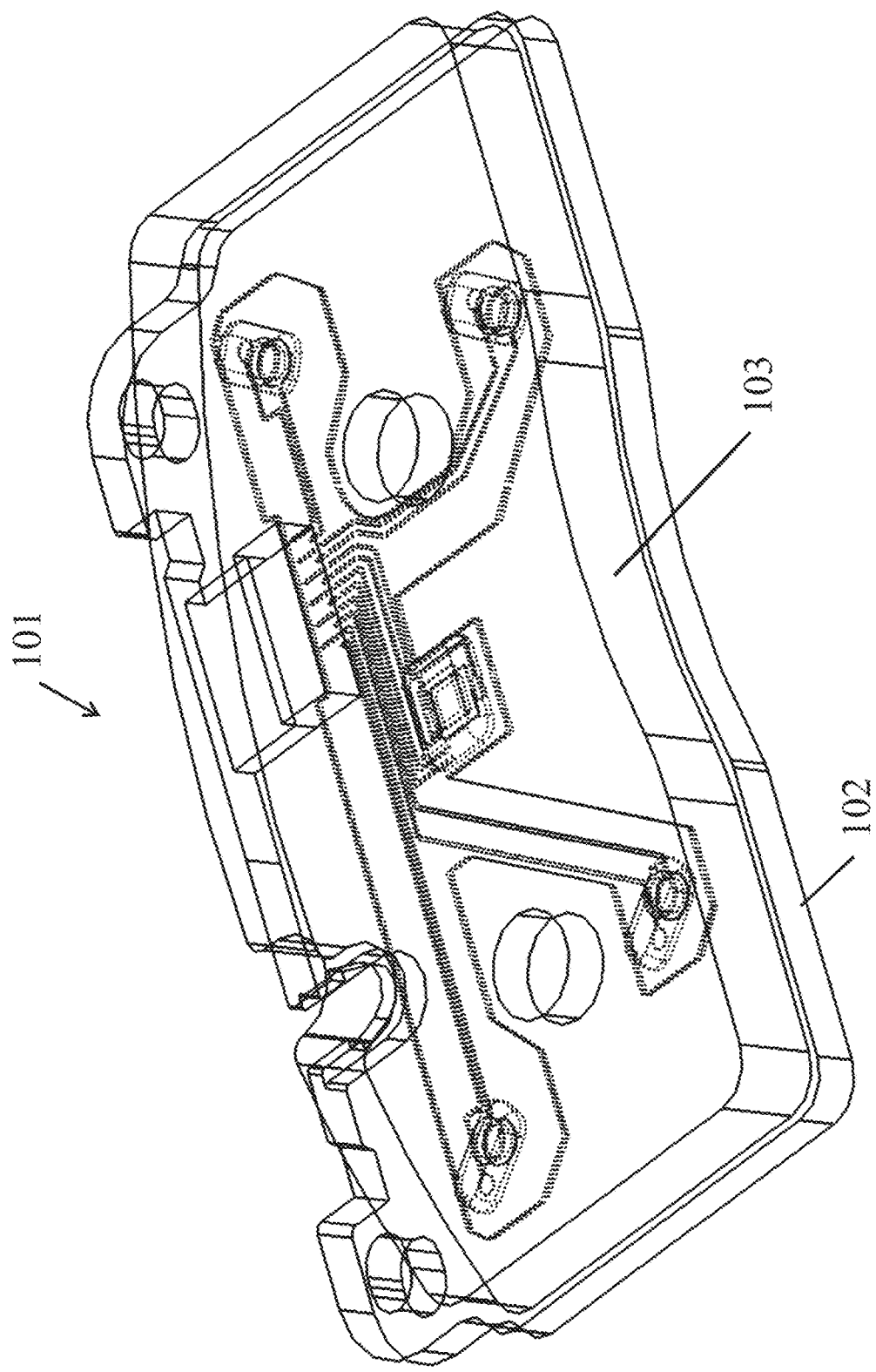
FIG. 1 schematically shows a perspective view of a braking device.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Sensorized Braking Devices for Vehicles and Associated Methods

With reference to FIGS. 1-14C, reference number 101 indicates a sensorized braking device for vehicles, in the example illustrated a brake pad, that is intended to equip a vehicle braking system.

Here and below specific reference will be made to a braking device formed of the brake pad 101, but it is clear that what follows is also identically applicable to the brake shoe of a drum brake.

The brake pad 101 comprises a support element 102, preferably but not necessarily metallic, and known as a "backplate", a block of friction material 103 supported by the element 102, and one or more piezoceramic sensors 104 supported by said support element 102 and interposed between the latter and the block of friction material 103. The piezoceramic sensors 104 are supported in a raised arrangement on the support element 102.

In the case of a brake shoe, there could be elements corresponding to those described for the brake pad 101. Therefore, for a person skilled in the art, the following description is easily transferable to obtain sensorized brake shoes.

Figure 2:
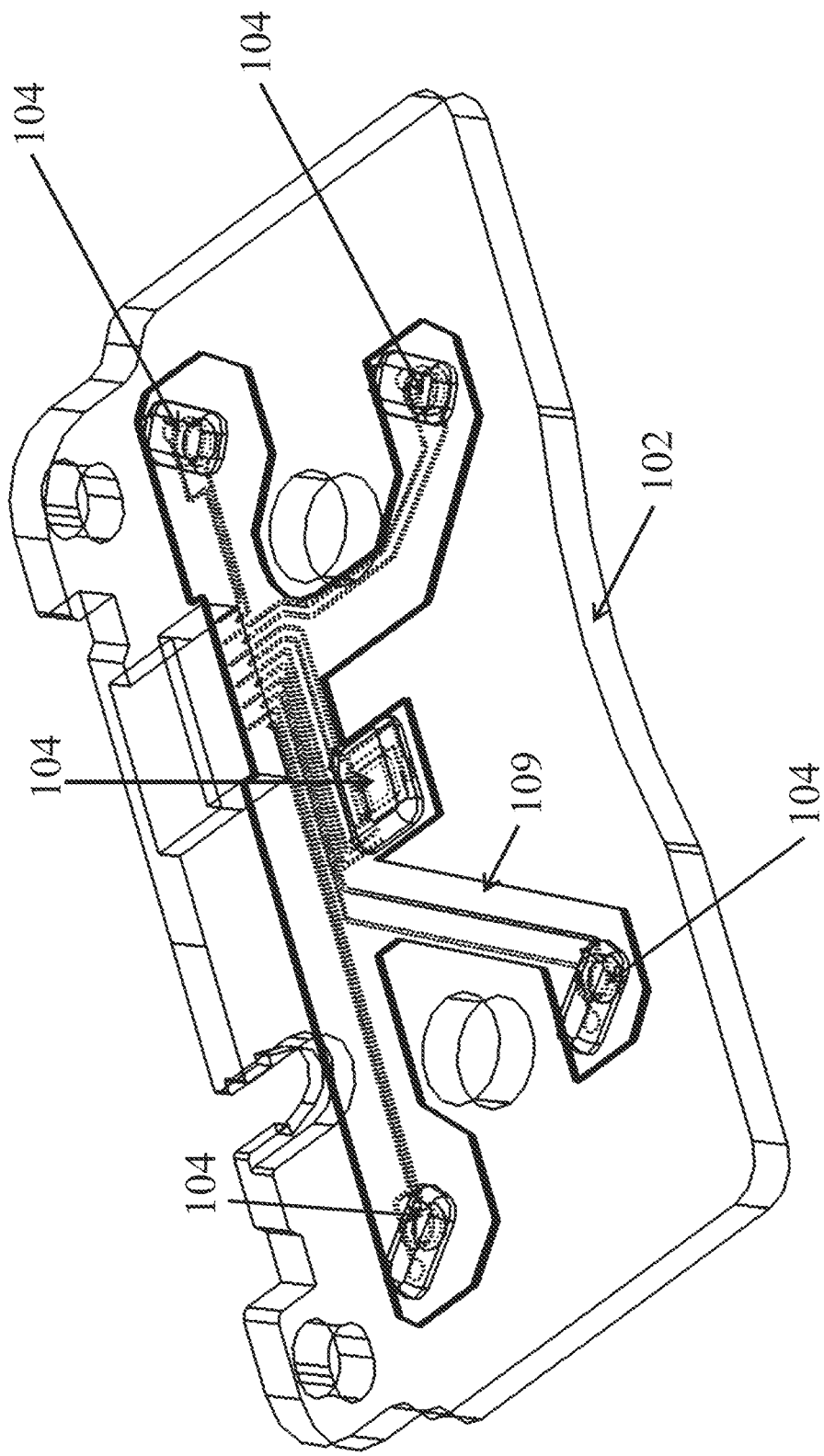
FIG. 2 shows a perspective view of the braking device of FIG. 1 without the block of friction material.
Figure 3:
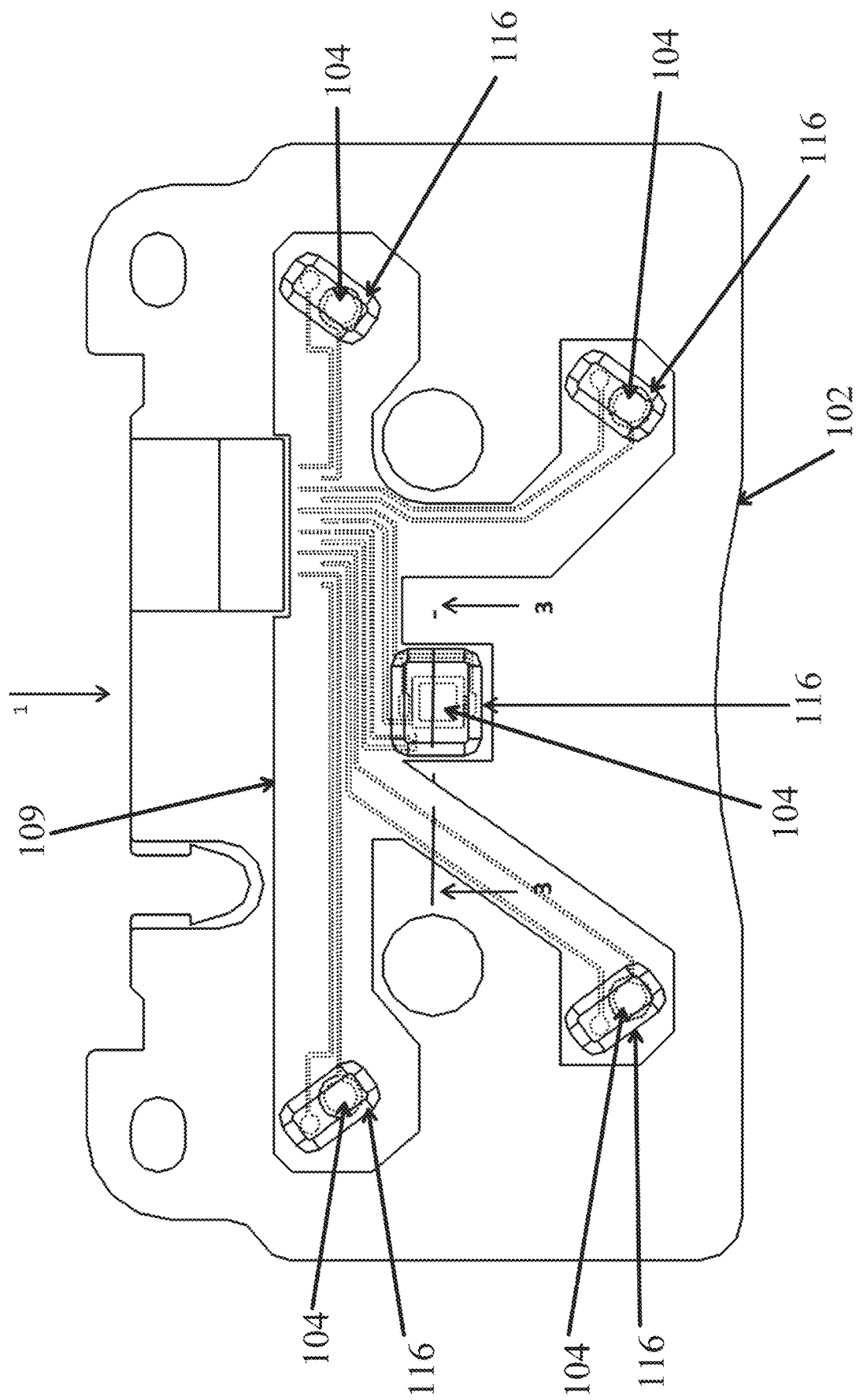
FIG. 3 shows a plan view of the braking device of FIG. 1.

As shown in FIGS. 1 and 2, the support element 102 in particular is shaped as a contour shaped flat plate having a first main planar surface 105 that is intended in use to face an element to be braked, such as a vehicle brake disc, and a second main planar surface 106 that is parallel to the first main planar surface 105.

The block of friction material 103 has in particular a first main planar surface 107 that is conjugated to the first planar surface 105 of the support element 102 and a second planar surface 108 that is parallel to the first planar surface 107, and intended in use to direct contact with the element to be braked.

The piezoceramic sensors 104 are able to detect the forces that are exchanged in use during the contact between the pad 101 and the element to be braked as a result of their inherent ability to emit an electrical signal when subjected to a mechanical stress.

Figure 4:
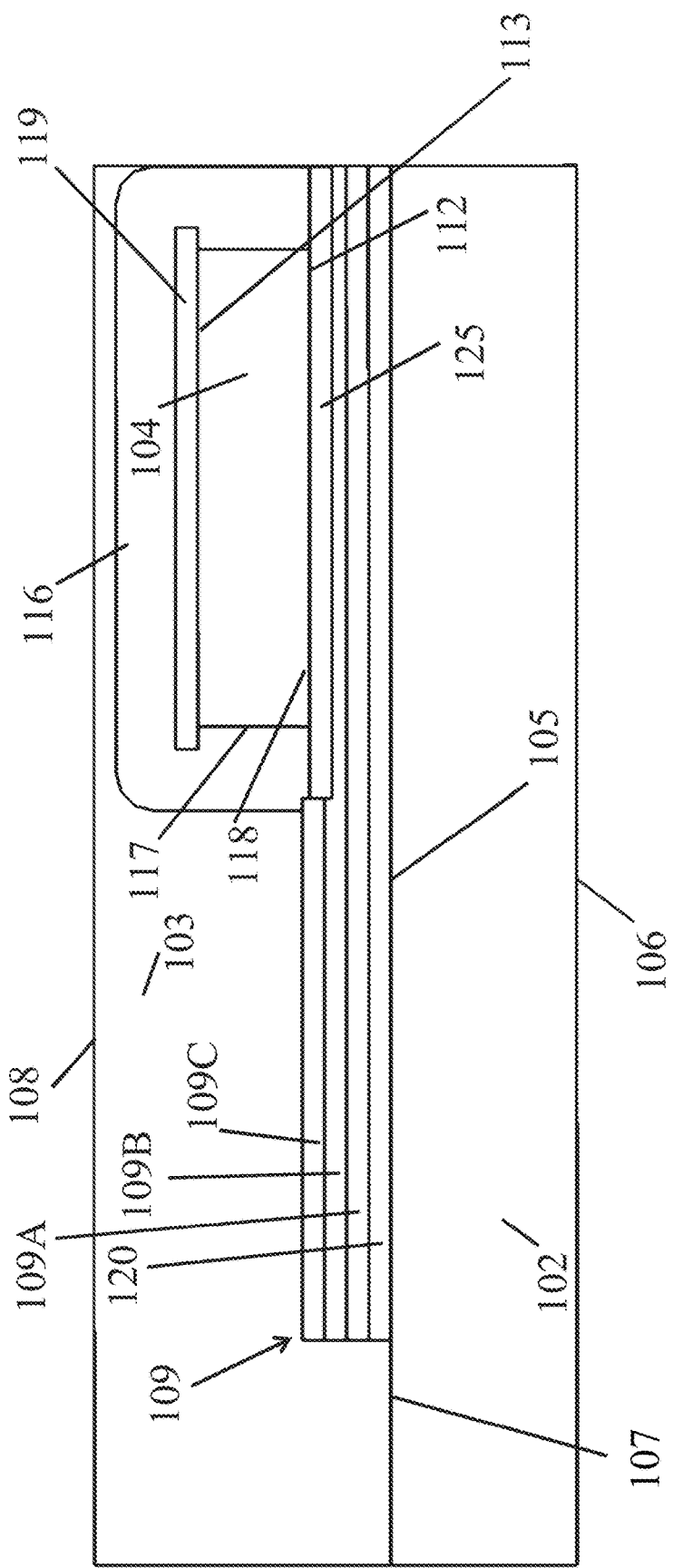
FIG. 4 shows a section of the brake device along the line 3-3 of FIG. 3.
Figure 5:
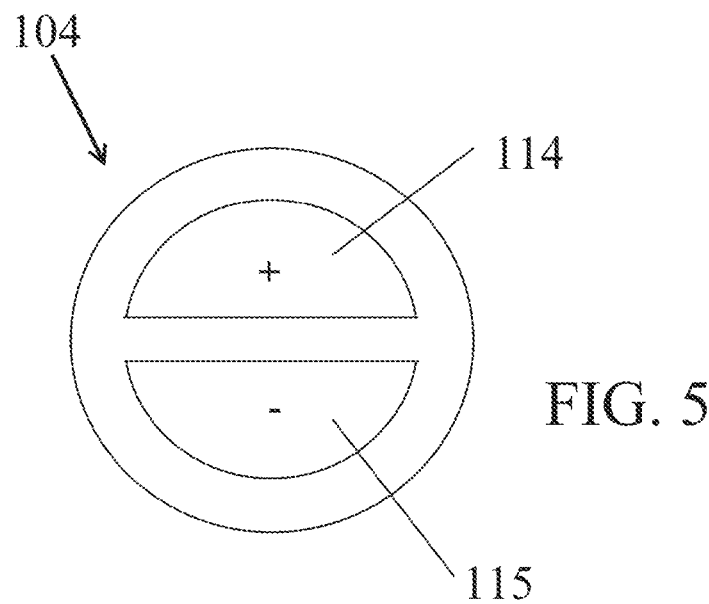
FIG. 5 shows a plan view of electrodes of the piezoceramic sensor.

For this purpose the support element 112 supports an electrically insulated electrical circuit 109. As shown in FIGS. 4 and 5, the circuit 109 has electrical contacts 110, 111 to which electrodes 114, 115 of piezoceramic sensors 104 are connected.

The electrical circuit 109 collects the electrical signal, which is generated without the need for an electrical power supply from piezoceramic sensors 104, when they are subjected to a mechanical stress in the direction of polarization.

The electrical signal emitted by the piezoceramic sensors 104 and collected by the electrical circuit 109 can either be processed in real time or at a later point in time.

The piezoceramic sensors 104 are made of piezoceramic materials with a Curie temperature greater than 200° C. and are formed of a preferably cylindrical body that is polarized in the direction of its axis and delimited by a pair of opposite flat faces 112 and 113 that are arranged in use parallel to the main planar surfaces 105, 106 of the support element 102.

Preferably only one of the faces 112, 113, in particular the one facing the electrical circuit 109, has both of the electrical signal sampling electrodes 114, 115.

The electrical circuit 109 has branches that are suitably shaped in order to arrange the piezoceramic sensors 104 in discrete positions on the support element 102 and is also provided with an integrated electrical connector at the edge of the support element 102.

In addition to the piezoceramic sensors, which are essentially pressure sensors, one or more temperature sensors and/or one or more shear force sensors that are electrically connected to the electrical circuit 109 may also optionally be integrated on the support element 102. The electrically insulated electrical circuit 109 is preferably screen printed and applied directly onto the support element 102.

All of the sensors integrated into the support element 102 are installed onto the electrically insulated electrical circuit 109 from the side of the latter that faces the block of friction material 103. The sensors that are thus integrated into the support element 102 are highly capable of measuring the forces acting on the braking device during braking or in general during the running of the vehicle.

Specific examples of piezoceramic sensors 104 that may be used are, for instance, PIC 255 (Manufacturer: PI Ceramic), PIC 300 (Manufacturer: PI Ceramic), PIC 181 (Manufacturer: PI Ceramic), PIC 050 (Manufacturer: PI Ceramic), TRS BT200 (Manufacturer: TRS Ceramics), PZT5A1 (Manufacturer: Morgan Advanced Ceramic), PZT5A3 (Manufacturer: Morgan Advanced Ceramic).

Figure 12:
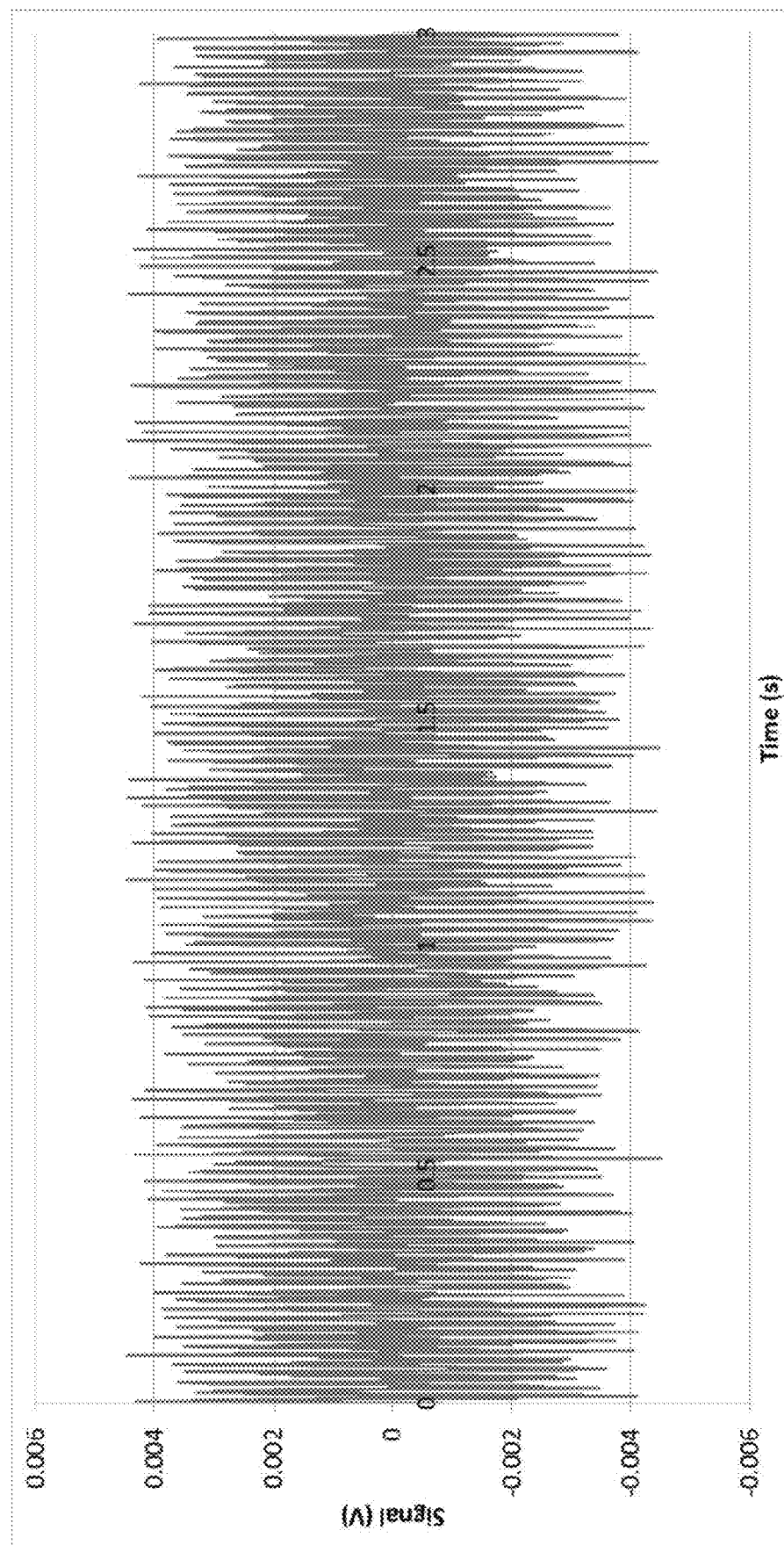
FIG. 12 shows a diagram of the sensor response when no braking is performed.
Figure 13:
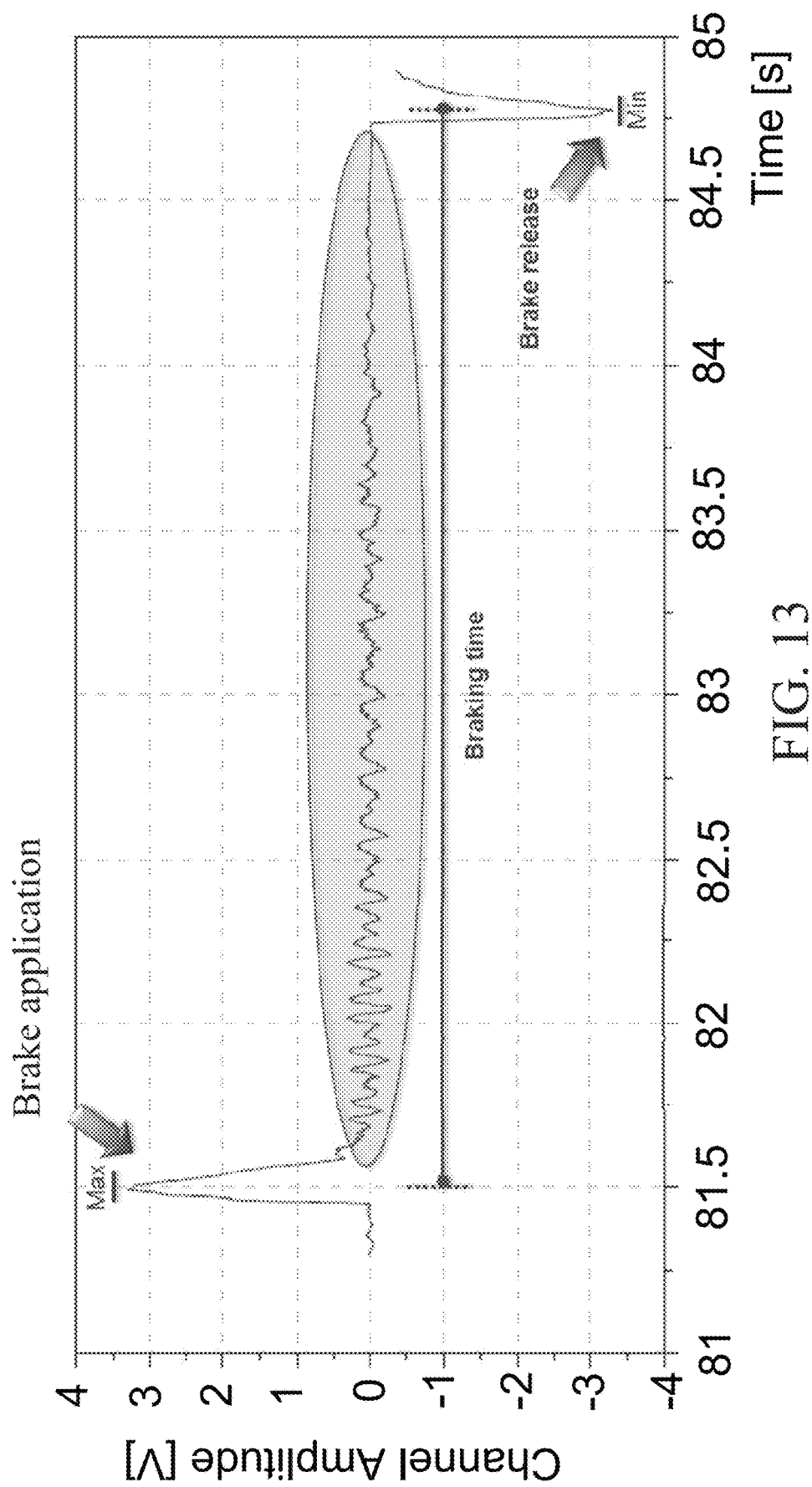
FIG. 13 shows a diagram of the sensor response on dynamic brake application.
Figure 14:
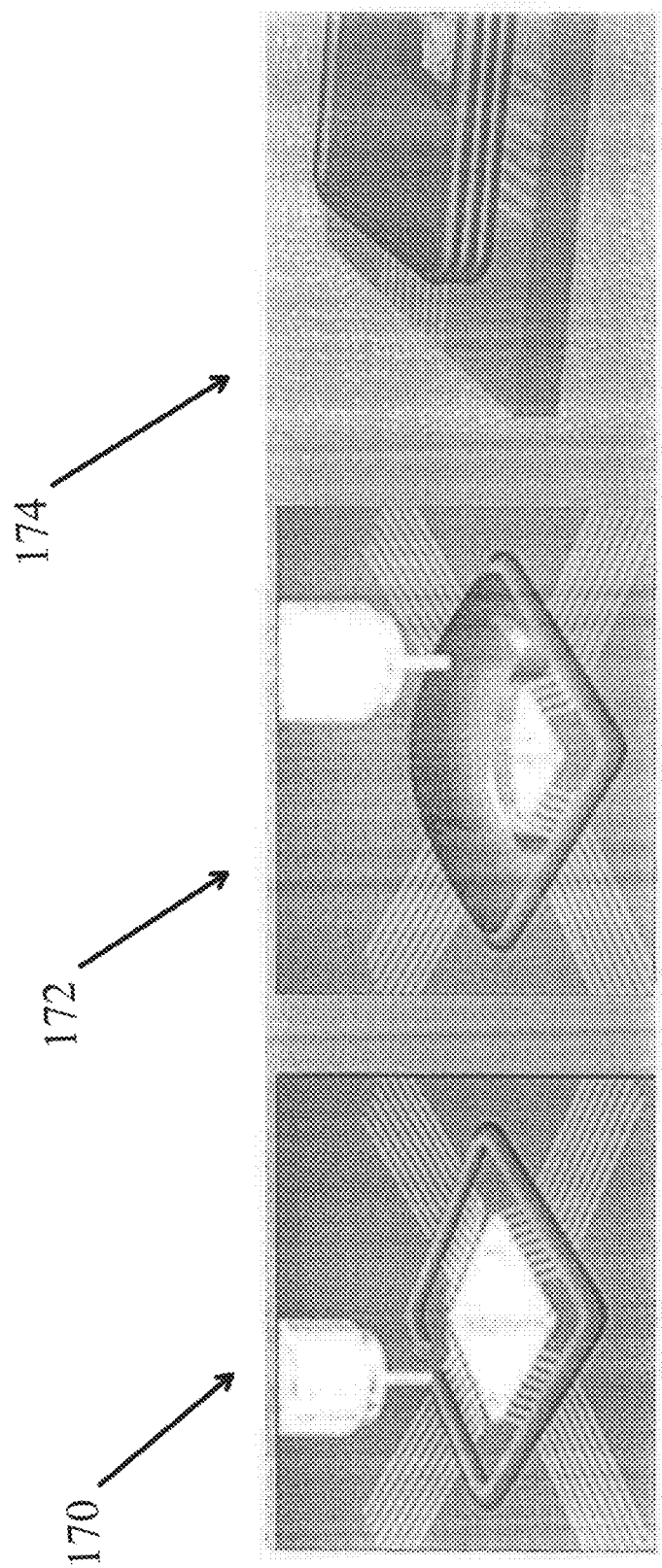
FIG. 14A shows a schematic view of a "damming" step of a method of application of a protective layer by a Dam & Fill technique.
FIG. 14B shows a schematic view of a "filling" step of the Dam & Fill technique.
FIG. 14C shows a schematic view of a formed protective element applied to the piezoelectric sensor by the Dam & Fill technique.

The arrangement for piezoceramic sensors 104 is dependent on what it is intended to be measured. FIG. 12 illustrates the sensor response signal versus time when no brake application is performed. FIG. 13 illustrates the sensor response signal versus time when a dynamic braking application is performed.

If the purpose is to measure the pressure and noise distribution along the brake pad 101, the preferred but not restrictive configuration is the one shown where four pressure sensors (normal force) are placed on the four corners of the backplate, while a shear sensor is placed about in the center of mass of the braking pad 101.

However, in case the pressure or noise distribution is not a concern, then it is preferable to place shear and force sensor in the nearby of the center of mass of the braking pad 1.

Figure 8:
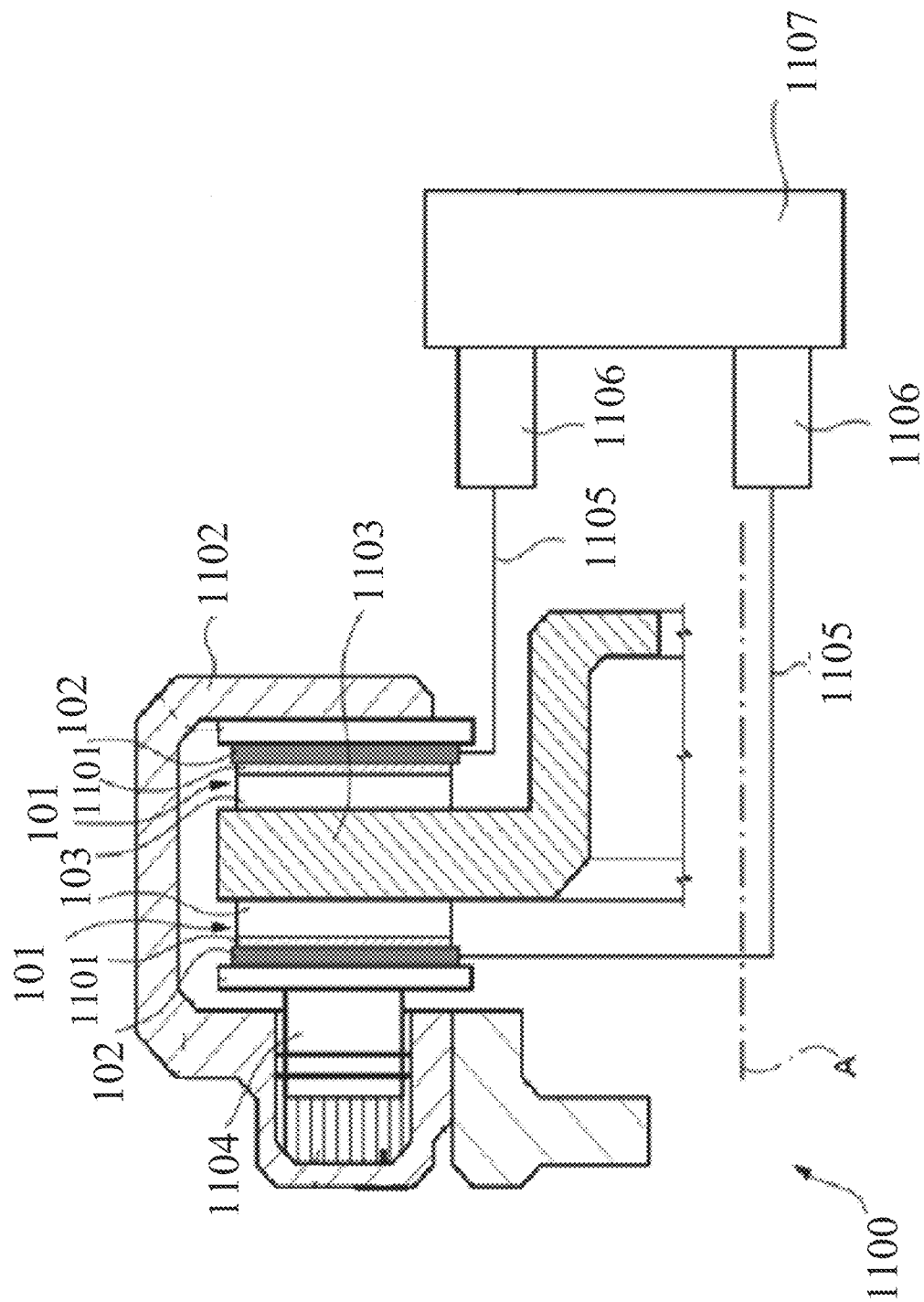
FIG. 8 shows the sensorized braking device in an overall braking system.

As illustrated in FIG. 8, a damping layer 1101 can be provided that is interposed between the block of friction material 103 and the support element 102.

The damping layer 1101, if provided, has in particular a first main surface that is conjugated to the first planar surface 105 of the support element 102 and a second surface that is conjugated to the first planar surface 107 of the block of friction material 103.

Damping layer 1101 it mostly made by phenolic resin material.

In some configurations each piezoceramic sensor 104 is embedded within a corresponding protective element 116.

The protective element 116 is located on the support element 102 at the position of the piezoceramic sensor 104.

For the electrical insulation of the piezoceramic sensor 104 the protective element 116 can be made of electrically insulating material.

The protective element 116 has, as we shall see, mechanical properties, and in particular an elastic modulus that has been carefully chosen in order to limit the force transmitted to the piezoceramic sensor 104 when an external compression force is applied to the block of friction material 103.

The protective element 116 is in particular configured in order to direct at least part of the external compression force to an area of the support element 102 surrounding the piezoceramic sensor 104 itself.

As we shall see below, a considerable external compression force is in fact generated during the hot pressing of the block of friction material onto the support 102.

Preferably all of the other sensors and possibly also other components of the electrical circuit 109 have a respective protective element of the same type as that described above.

The protective element 116 completely embeds the piezoceramic sensor 104 and can be made up of a half-shell having an internal direct or indirect contact surface 117 uniform with the external surface of the piezoceramic sensor 104 and a uniform direct or indirect rest base 118 on said support element 102.

The protective element 116 preferably is generally dome-shaped.

The protective element 116 is preferably made of a resin-based material, for example the material for the protective element is comprised of polyimide resins, epoxy resins (loaded or not), Bismaleimide resins and Cyanate-Ester resins.

The protective element can, for example, be made by means of the dripping of material at a standard pressure and moderate temperatures (usually less than 200° C.) prior to forming the block of friction material 103.

With reference to FIGS. 14A, 14B and 14C, a method to apply the protective element 116 to the piezoelectric sensor is illustrated in steps 170, 172, 174. The resin for the protective element 116 is deposited by a dispenser for resin material, preferably with an automatic dispenser for resins with a low level of thixotropy Dam & Fill technique. As shown in step 170 of FIG. 14A, a ring of a sacrificial thixotropy resin can be made first around the sensor in order to build a kind of dam to enclose the resin used for making the protective element 116. Then, the material for protective element 116 is used to fill up the dam in order to cover the sensor, as shown in step 172 of FIG. 14B. Multiple layers of material may be overlaid to form the protective element 116, as shown in step 174 of FIG. 14C.

Ceramic materials that are much harder than resins and suitable for temperatures above 350° C. may however also be used for the protective element.

Thanks to the provision of protective elements within the support element 1102 at those points where the sensors are actually placed, any limitation associated with effectively implementing the existing forming technology is substantially resolved.

In fact, thanks to the protective elements, the load of the forces actually experienced by the sensors during the production of the braking device or when the braking device is in operation is reduced, provided that the mechanical properties of the protective elements themselves are suitably chosen.

FIG. 8 shows the overall system 1100 embodying the braking device 101. This system 1100 comprises a caliper 1102 and disk shaped rotor 1103 rotating about an axis of the wheel of the vehicle. Two opposite braking devices 101 are movable by a corresponding piston 1104 so that friction material 103 thereof may engage or disengage the opposite sides of the disk shaped rotor 1103. Signals coming from both braking devices 101 are transmitted via cables 1105 to a signal conditioning device comprising analog front ends 1106 and digitalization and processing unit 1107.

Production of the braking device in particular envisages the application of a notable external compression force F upon the block of friction material 103 in order to integrate it with the support element 102.

We refer to the load situation acting upon a piezoceramic sensor 104. The protective element 116 experiences a force whose resultant F' is different from the compression force F applied to the block of friction material 103. Such a resultant force F' is also transmitted to the piezoceramic sensor 104 which experiences a final force $F_p$ which in general is also different from the force F' but also linked to it. $F_p$ is the force that induces the electrical signal that is effectively measured by the piezoceramic sensor.

We assume that the transfer of the external compression force F takes place from the surface of the block of friction material 103 to the underlying layers without appreciable tangential deformations, in other words, we assume that the block of friction material 103 is substantially rigid in the longitudinal direction.

In the model it is also assumed that the friction material and the protective element are represented in the mechanical model by springs with the elastic constants k and k' respectively, and that the linear dimensions of the spring relating to the block of friction material are the same as the block of friction material itself in the regions outside and within the area of application of the protective element.

Supposing therefore a linear elastic behavior of the materials, then Hooke's law is valid, according to which:

$$F=kx$$

$$F'=k'x'$$

$$F_p=k_p x_p$$

where x, x' and respectively $x_p$ represent the deformation in the direction of compression, k, k' and respectively $k_p$ the elastic constant.

It can be shown that:

$$F'=2F/(1+k/k')$$

$$F_p=4F/(1+k'/k_p)(1+k/k')$$

The force $F_p$ as experienced by the piezoceramic sensor 104 is therefore linked but not equal to the force F originally applied to the block of friction material 103. The force $F_p$ attenuation factor depends upon the choice of the ratios $k'/k_p$ and k/k' and can be adjusted, with k and $k_p$ being equal, by increasing or decreasing the elastic constant k'.

It follows that once the block of friction material and the piezoceramic sensor are defined, which normally have quite strong limitations from the point of view of the variation in their mechanical properties as well as in terms of the requirements regarding their physical properties, the choice of the optimum values for k', or the mechanical properties of the protective element, then becomes crucial in order to optimize the transfer of forces.

Figure 6:
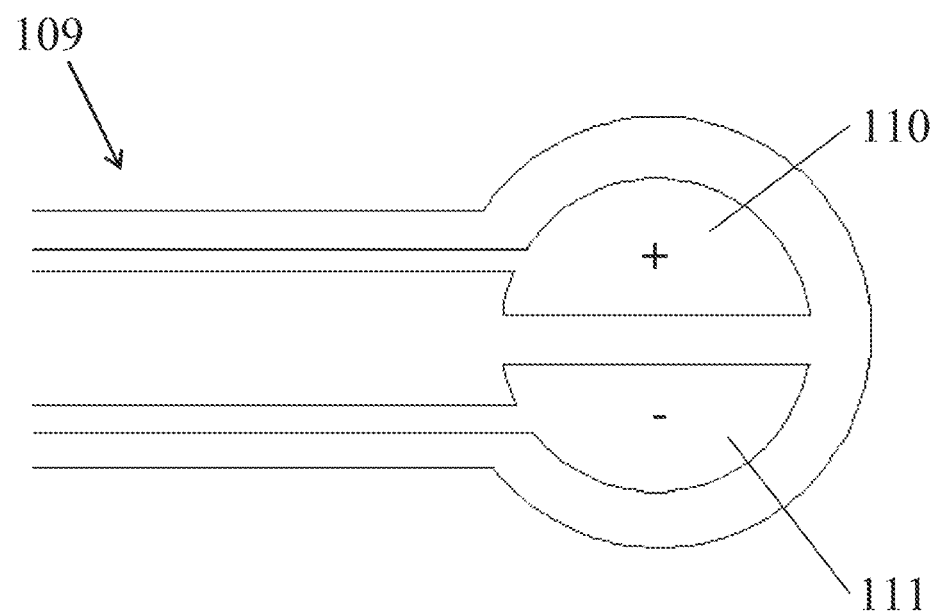
FIG. 6 shows a plan view of a terminal of an electrical circuit comprising contacts to which the electrodes of the piezoceramic sensor are connected.
Figure 7:
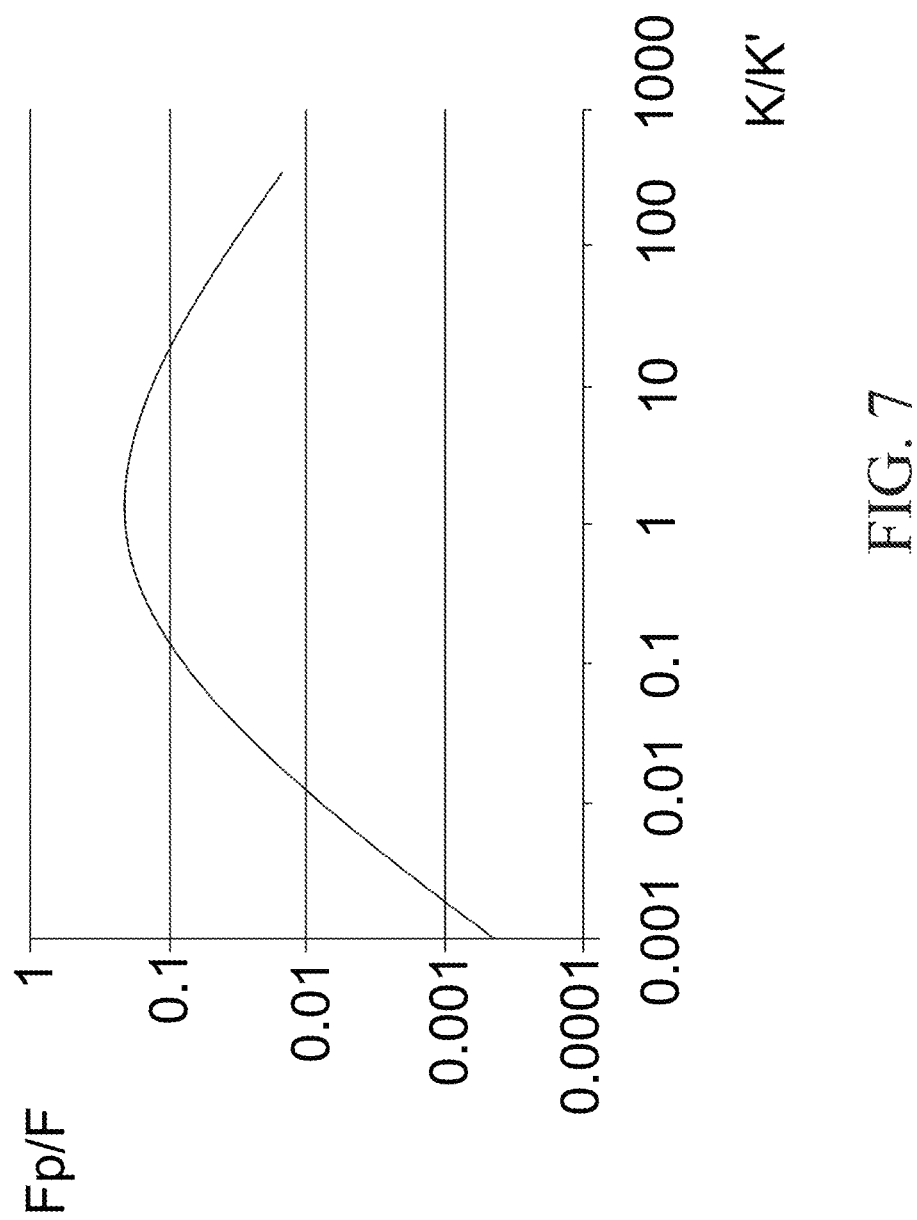
FIG. 7 shows a response curve linking the force transmitted to the sensor as the ratio between the elastic constants of the block of friction material and the protective element varies.

By way of a significant as well as explanatory example, we will consider the result from the model assuming realistic values for k and $k_p$, in particular produced from the measurements of the elastic constants for the block of friction material and the piezoceramic sensor. The constant k' will instead be regarded as a parametric variable to be chosen in order to optimize the response of the piezoceramic sensor. Suppose then that $k_p=10^{11}$ N/m=$10^{11}$ N/m and k=$10^{10}$ N/m. These values of $k_p$ and k for the block of friction material and the piezoceramic sensor are values that are close to reality. In this case the relationship between $F_p/F$ depends only upon k'. FIG. 6 shows the response curve $F_p/F$ as a function of k/k' while considering the above values of $k_p$ and k. It is clear that there is an optimal value regarding the ratio between the mechanical constants k/k' that optimizes the response of piezoceramic sensor. Therefore, once the piezoceramic sensor and the block of friction material are fixed, then the protective element should be chosen carefully. For example, choosing resins that are too soft compared to the optimal value at the maximum point of the response curve will determine a weak coupling which will lead to the forces being transferred inefficiently, while choosing resins that are too hard, again compared to the optimal value at the maximum point of the response curve, will lead to the deformation being transferred to the piezoceramic sensor inefficiently. With regard to FIG. 7 it should be noted that a logarithmic scale has been applied to the abscissa and ordinate axes, with the result that, away from the maximum point of the response curve, an order of magnitude variation in the ratio of the elastic constants will have similar results also on the forces measured at the location of the piezoceramic sensor. Only by keeping the values of the elastic constants near the optimum value at the maximum point of the response curve will efficient transfer be maintained. This means that also the thermo-mechanical properties have to be selected with care in order to avoid, as a result of softening or hardening of the mechanical properties between the materials employed, loss of efficiency as the temperature changes. Working in the vicinity of the maximum point of the response curve results then in a further improvement, namely that the stability of the response is greatly superior also in the case of variations in the thermo-mechanical properties, even at large intervals.

Therefore, by suitably selecting the mechanical properties of the material composing the protective element (in the sense of softening or hardening), it is possible to maintain the load experienced by the piezoceramic sensors well below the maximum load bearable by this class of sensors during both the braking device production process and normal operation of the braking device.

For the purposes of the application under consideration, it has nevertheless been found convenient, for predetermined values of $k_p$ and k, to choose k' such that $F_p/F$ is not less than 0.01, preferably not less than 0.1.

To be compatible with many applications, including vehicle industry, the mechanical properties of the protective element shall not be affected by temperature in a wide range of temperatures. Indeed a change in mechanical properties may occur if a material undergoes to a phase transition at a certain temperature. In this connection a material for the protective element is selected among materials having a transition phase at a temperature not lower than 150° C.

The protective element 116 has a thermal shield 119 for the piezoceramic sensor 104. The thermal shield 119 can be provided by a thermally insulating element that is accommodated within the protective element 116 and/or at least one thermally insulating layer which forms part of, or that itself constitutes, the protective element 116.

The thermal shield 119 thermally shields the piezoceramic sensor 104 from the heat coming from the block of friction material 103 or from the brake caliper such that the piezoceramic sensor 104 can function under less onerous operating conditions from the point of view of temperature during heavy braking. Various materials can be used for such purposes such as the so-called thermal barrier (TBC) materials, or else Yttria or Magnesium stabilized Zirconia in the form of mastics, coatings with ceramic compounds or special paints.

The support element 102 is preferably covered with at least one thermally insulating layer 120 upon which the piezoceramic sensors 104 are arranged. The thermally insulating layer 120, if provided, in particular has a first main planar surface that is conjugated to the first planar surface 105 of the support element 102 and a second planar surface that is parallel to the first planar surface upon which the piezoceramic sensors 104 are arranged.

In fact, in this way the electrically insulated electrical circuit 109, the sensors and the connector are not in direct contact with the support element 102, the contact being mediated by the thermal barrier layer 120 which, being subjected to a thermal gradient through its thickness, causes a significant reduction in the temperature actually experienced by the electrically insulated electrical circuit 109, the sensors and the connector.

In order to achieve good thermal insulation even over long periods of time, it is also appropriate to envisage areas featuring very high thermal conductivity around the thermally shielded elements which are designed to create preferential channels for the thermal dissipation produced during braking.

As a general rule, heat dissipation areas should be as wide as possible. This can aid in avoiding heat accumulation and/or the so called "Oven Effect" of inducing a temperature increase in the backplate instead of a temperature lowering due to heat accumulation. That means that, apart from the areas beneath the screen printing or few millimeters around them, the metal of the backplate should be left to come in contact with the friction material, or the damping layer is present and leaves a consistent portion of the backplate surface free to heat exchange.

By way of example, these areas may consist of gaps in the thermal barrier layer 120 that are either empty or filled with thermally conductive material. Preferably, the thermal barrier layer 120 has the same shape and dimensions as the electrical circuit 109, which in turn has a branched structure, such that the thermal dissipation channels are achieved by means of the spaces that are present between the branches. Typical materials usable for thermal insulating layers 120 are for instance YSZ (Yittria Stabilized Zirconia), Mullite ($Al_{4+2x}Si_{2-2x}O_{10-x}$), α-phase $Al_2O_3$ in conjunction with YSZ, $CeO_2$+YSZ, Rare-earth zirconates like $La_2Zr_2O_7$, Rare earth oxides like $La_2O_3$, $Nb_2O_5$, $Pr_2O_3$, $CeO_2$, Metal-Glass Composites.

Indicatively, but not restrictively the brake pad 101 may have following sizing of its components: piezoceramic sensor 104 may be typically 1 mm thick; protective element 116 may typically have a maximum thickness of 2 mm, 1 mm above the piezoceramic sensor 104 and 2 mm around it; damping layer 1101 may be typically 2-3 mm thick; thermal insulating layer 120 may typically have thickness well below 1 mm and 100 μm are enough to ensure a sufficient thermal insulation.

Figure 9B:
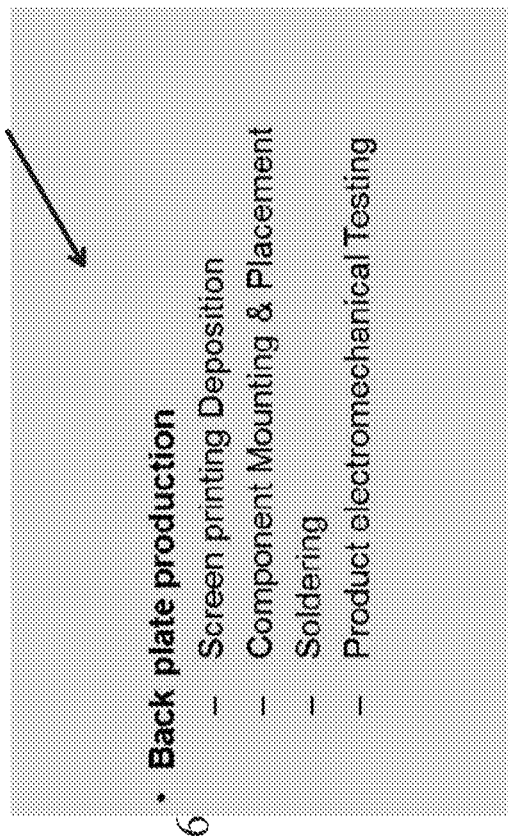
FIG. 9B shows a list of working steps in the first stage of the manufacturing process.
Figure 9A:
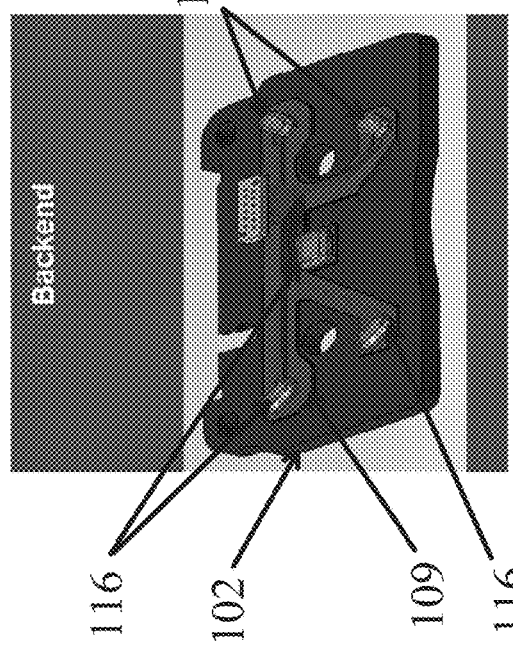
FIG. 9A shows a backend perspective view of the sensorized braking device in a first stage of its manufacturing process.
Figure 10B:
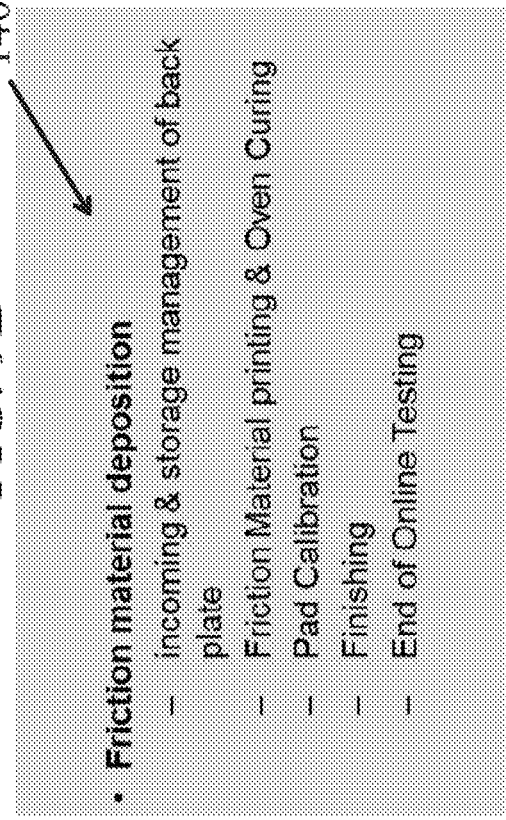
FIG. 10B shows a list of working steps in the second stage of the manufacturing process.
Figure 10A:
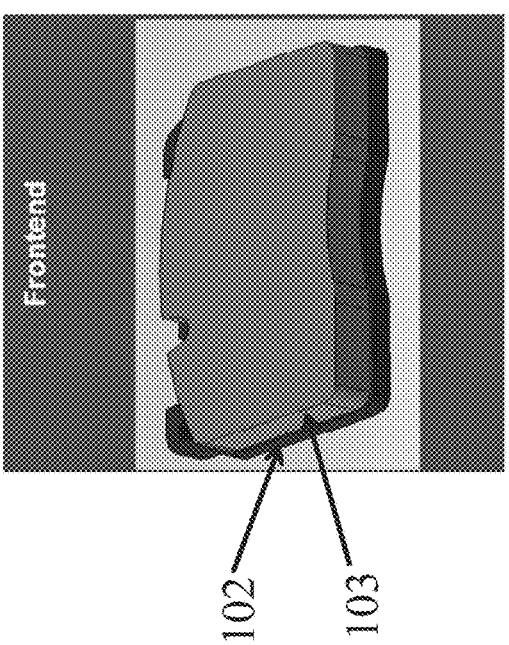
FIG. 10A shows a frontend perspective view of the sensorized braking device in a second stage of its manufacturing process.
Figure 11A:
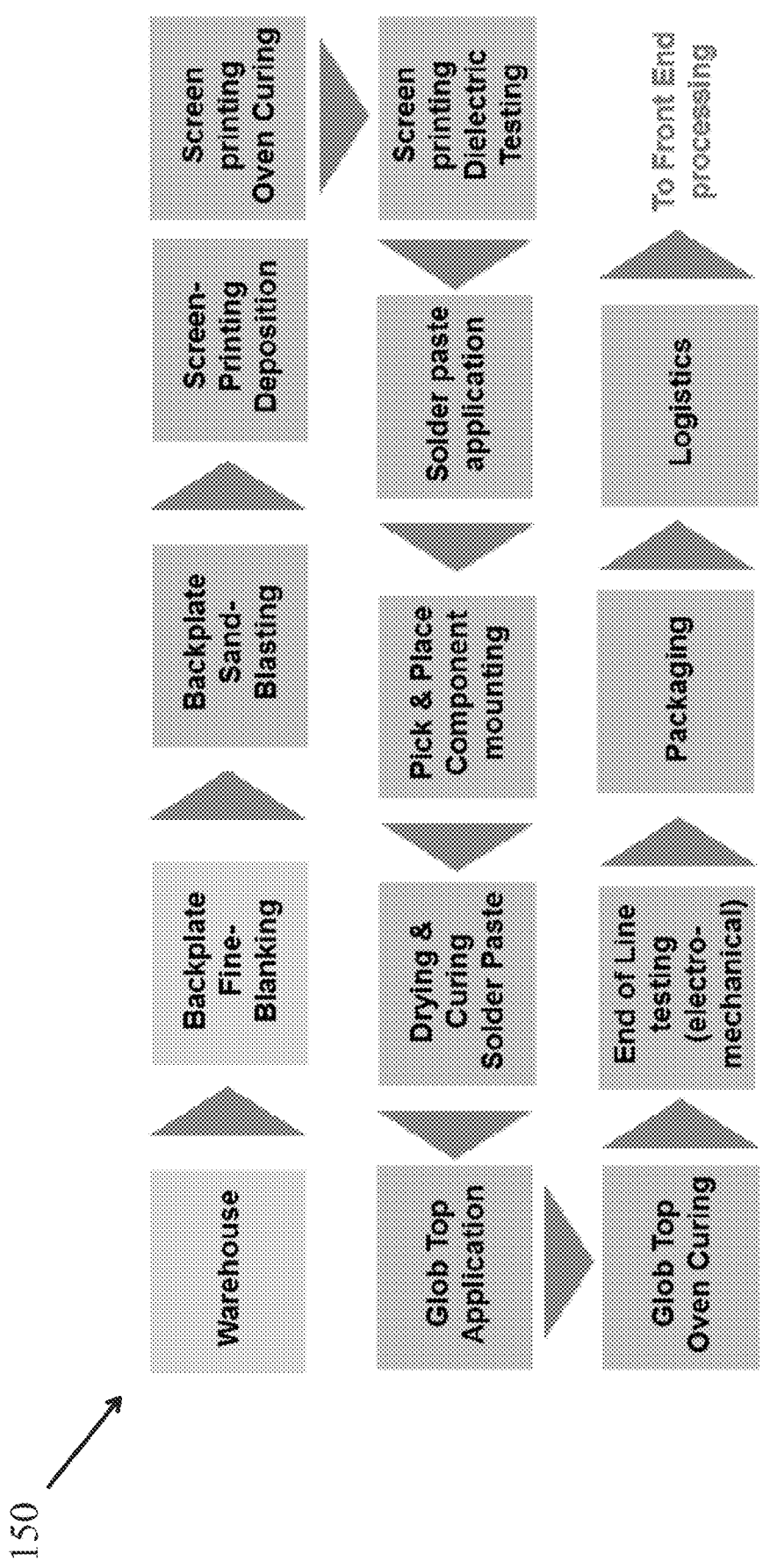
FIG. 11A is a flow chart of a backend manufacturing process of the sensorized braking device.
Figure 11B:
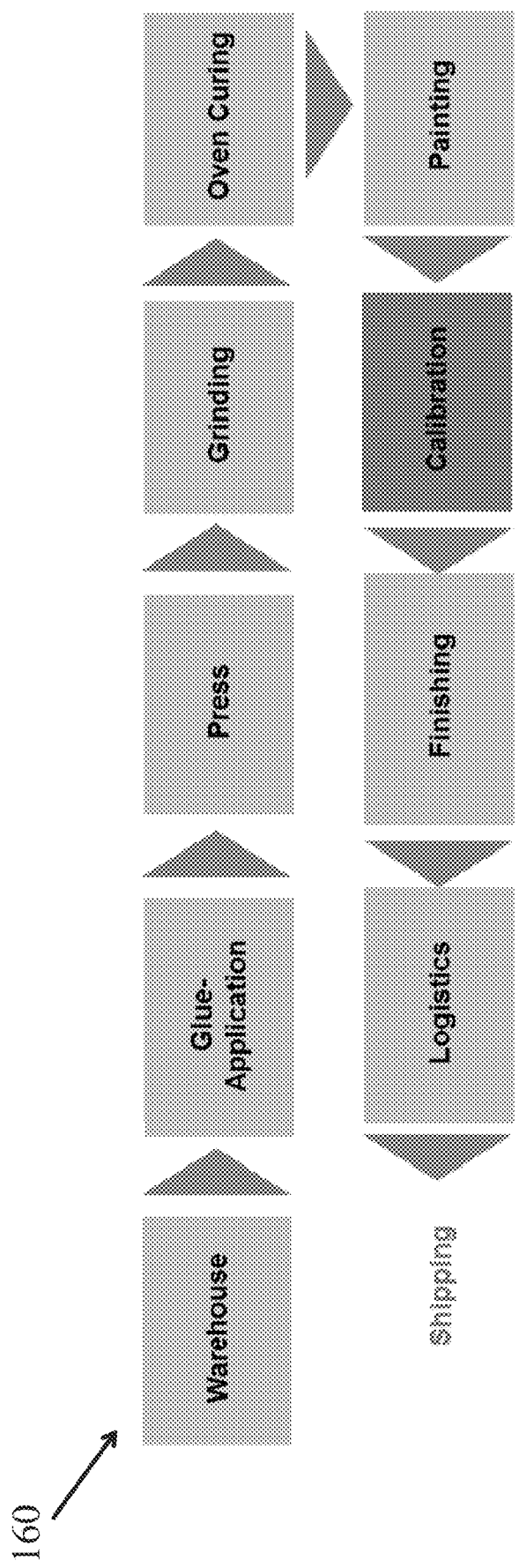
FIG. 11B is a flow chart of a frontend manufacturing process of the sensorized braking device.

FIGS. 9A to 11B illustrate two-stages of the manufacturing process of the sensorized braking device. FIG. 9A shows a first stage or backend of the manufacturing process for forming layers and applying the components onto the support element 102. FIG. 9B shows a list 130 of working steps of the backend manufacturing process. FIG. 11A shows a flow chart 150 of the backend manufacturing process. FIG. 10A shows a second stage of the manufacturing process for applying the friction material 103 onto the support element 102. FIG. 10B shows a list 140 of working steps in the second stage of the manufacturing process. FIG. 11B is a flow chart 160 of an example of the frontend manufacturing process.

In some embodiments, the braking device construction method is as follows. With reference to FIGS. 9A and 9B, the thermally insulating layer 120 is initially applied, if required, to the support element 102. The thermally insulating layer 120 is integrated directly onto the main planar surface of the support element 102 which in use is designed to face the element to be braked (which is not illustrated for the sake of simplicity), for example the brake disk or drum of a vehicle. The electrically insulated electrical circuit 109 can be integrated with the support element 102. The electrically insulated electrical circuit 109 is preferably constructed by means of the screen printing technique.

A lower screen printed layer 9A made of an electrically insulating material is first deposited onto the electrically insulating layer 120, if required, or else directly onto the support element 102, an intermediate screen printed layer 9B made of an electrically conductive material is then deposited onto the lower screen printed layer 9B, thus defining the actual electrical circuit itself, an upper screen printed layer 9C made of an electrically insulating material is then deposited onto the intermediate screen printed layer 9C which leaves the contacts 110, 111 uncovered for the electrical connection of the sensors 104.

The insulating layers 9A, 9C consist, for example, of a base made of alumina/graphite particles (or a silicate matrix) which are then immersed in a matrix of a polymeric nature (preferably polyimide), while the conductive layer 9B consists of silver or palladium screen printing pastes.

The sensors are then integrated, being electrically and mechanically connected to the electrical contacts 110, 111 which are located at the end of each branch of the electric circuit 109.

Preferably, as previously mentioned, a special configuration for the electrodes 114, 115 accommodated on a single face of the piezoceramic sensor 104 is used. Naturally this determines the envisaging of a configuration that is suitable for the contacts formed on the electrical circuit 109. This particular solution avoids the need to make use of bonding when connecting the electrodes to the contacts.

The piezoceramic sensor 104 is therefore permanently connected by means of its two electrodes to the respective contacts by means of a layer 125 composed of a welding paste that is electrically conductive at high temperatures. In practical terms, once the electrical circuit 109 has been formed, said high temperature welding paste layer is applied in the area of the contacts and/or of the electrodes, after which the sensor is positioned by matching its two electrodes with the counterpart contacts provided on the electrical circuit 109. Finally the assembly is cured typically at around 200° C. depending upon and in accordance with the specifications of the welding paste used, which is preferably composed of silver as the base element of the electrically conductive component. In principle, depending upon the choice of welding paste, temperatures in the order of 800° C. can be reached, thus making the process compatible with high temperature applications such as those for heavy vehicles for example.

At this point the sensors are covered with the related protective elements 116 in the manner previously described above. Above the electrical circuit 109 and the sensors covered in this manner, the block of friction material 103 is then formed by hot pressing, within the thickness of which the covered sensors are at least partially embedded. Before pressing the block of friction material 103 the damping layer 1101, if required, is accommodated.

In conclusion, the braking device according to the present disclosure is more reliable and features an improved operating interval during both the production process and the use, and is therefore also compatible with many applications, including heavy duty applications, such as those in the heavy vehicle industry.

The choice regarding the mechanical properties of the protective element is to be made whilst taking into consideration the maximum loads that can be applied during normal operation or during the production process in order to ensure the integrity of the sensors with respect to the stresses they are subjected to, especially during the production process of the braking device.

The protective element can also be functionalized in a way to include a thermal shield so as to shield the sensor from excessive temperature in order to widen the operating temperature interval of the braking device.

The thermal shield can be further improved by integrating within the support element, on the side facing the block of friction material, a further layer of thermally shielding material in such a way that a form of thermally insulated pocket is created within which both the sensors and the electrical circuit to which the sensors are connected, are enclosed. Around this pocket it is necessary to include large areas of high thermal conductivity materials in order to leave some low thermal impedance paths that will dissipate the heat efficiently and therefore leave the sensors and the electrical circuit at lower temperatures and for longer.

Finally, a layer composed of a high temperature welding paste has been provided for permanently welding the electrodes of the sensors to the contacts of the electrical circuit by means of a curing process which, being performed at a low temperature and at a standard pressure, is absolutely safe as regards the integrity of the piezoceramic sensors, but that once completed allows operating temperatures to be achieved that are above the majority of the Curie temperatures of almost all piezoceramic materials.

Additional Discussion Regarding Braking Device for Vehicles

With reference to FIGS. 15-20, reference numeral 201 indicates a sensorized braking device for vehicles as a whole, in the example illustrated a brake pad, that is intended to equip a vehicle braking system, which is known and not illustrated for the sake of simplicity.

Here and below specific reference will be made to a braking device formed of the brake pad 201, but it is clear that what follows is also identically applicable to the brake shoe of a drum brake.

Figure 15:
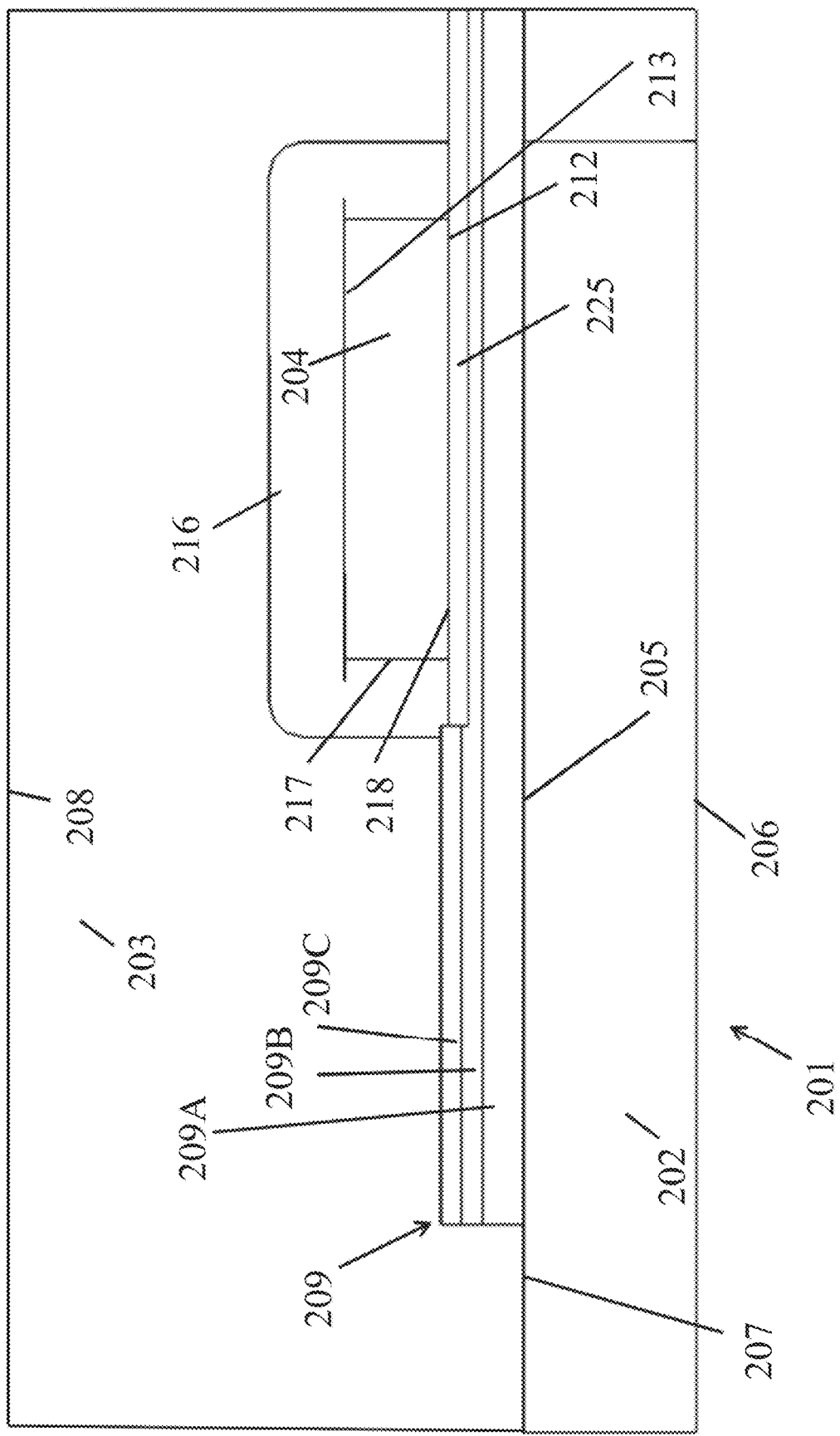
FIG. 15 shows schematically a raised section side view of the braking device.

As illustrated in FIG. 15, the brake pad 201 comprises a support element 202, preferably but not necessarily metallic, and known as a "backplate", a block of friction material 203 supported by the element 202, and one or more piezoceramic sensors 204 supported by the support element 202 and interposed between the latter and the block of friction material 203.

The piezoceramic sensors 204 are supported in a raised arrangement on the support element 202. In the case of a brake shoe, there could be elements corresponding to those described for the brake pad 201; therefore, for a person skilled in the art, the following description is easily transferable so that sensorized brake shoes can be constructed.

The support element 202 in particular is shaped like a flat plate having a first main planar surface 205 that is intended in use to face an element to be braked, such as a vehicle brake disc, and a second planar main surface 206 that is parallel to the first main planar surface 205.

The block of friction material 203 has in particular a first main planar surface 207 that is conjugated to the first planar surface 205 of the support element 202 and a second planar surface 208 that is parallel to the first planar surface 207, and intended in use for direct contact with the element to be braked.

The piezoceramic sensors 204 are able to detect the forces that are exchanged in use during the contact between the pad 201 and the element to be braked as a result of their inherent ability to emit an electrical signal when subjected to a mechanical stress.

For this purpose the support element 202 supports an electrically insulated electrical circuit 209 having electrical contacts to which the electrodes of piezoceramic sensors 204 are connected.

The electrical circuit 209 collects the electrical signal, which is generated without the need for an electrical power supply from piezoceramic sensors 204, when they are subjected to a mechanical stress in the direction of polarization. The electrical signal emitted by the piezoceramic sensors 204 and collected by the electrical circuit 209 can either be processed in real time or at a later point in time.

The piezoceramic sensors 204 can be made of piezoceramic materials with a Curie temperature greater than 200° C. and are formed of a preferably cylindrical body that is polarized in the direction of its axis and delimited by a pair of opposite flat faces 212 and 213 that are arranged in use parallel to the main planar surfaces 205, 206 of the support element 202.

Preferably one of the faces 212, 213, in particular the one facing the electrical circuit 209, presents both of the electrical signal pick up electrodes. The electrical circuit 209 can have branches (not shown) that are suitably shaped in order to arrange the piezoceramic sensors 204 in discrete positions on the support element 202 and is also provided with an electrical connector (not shown) integrated at the edge of the support element 202.

In addition to the piezoceramic sensors (which are essentially pressure sensors), and/or in place of, one or more temperature sensors and/or one or more shear force sensors that are electrically connected to the electrical circuit 209 may be integrated on the support element 202. The electrically insulated electrical circuit 209 is preferably screen printed and applied directly onto the support element 202.

All of the sensors integrated into the support element 202 are installed onto the electrically insulated electrical circuit 209 from the side of the latter that faces the block of friction material 203. The sensors that are thus integrated into the support element 202 are highly capable of measuring the forces acting on the braking device during braking or in general during the running of the vehicle.

A damping layer (not shown) can be provided that is interposed between the block of friction material 3 and the support element 202. The damping layer, if provided, has in particular a first main surface that is conjugated to the first planar surface 205 of the support element 202 and a second surface that is conjugated to the first planar surface 207 of the block of friction material 203.

In some configurations each piezoceramic sensor 204 is embedded within a corresponding protective element 216. The protective element 216 is comprised of one or more layers of resin-based material selected from materials having substantially stable mechanical properties in a temperature interval comprised between −40° C. and at least 200° C., so as to limit or cancel out the variation in the response signal with the temperature variations to which the piezoceramic sensor 204 is exposed in said temperature interval.

The expression "fairly stable" means, with reference to a variable magnitude, a maximum value of 30% and preferably not greater than 20% of its minimum value within the temperature interval of reference.

The protective element 216 is located on the support element 202 at the piezoceramic sensor 204. For the electrical insulation of the piezoceramic sensor 204 the protective element 216 can be made of electrically insulating material. The protective element 216 is preferably made from a material that is also thermally insulating.

In particular, but not necessarily, at least one layer of material of the protective element 216 can be electrically and thermally insulating, or else at least one electrically insulating layer and at least one thermally insulating layer could be envisaged.

The protective element 216 has, as we shall see, mechanical properties, and in particular the elastic modulus, which have been carefully chosen in order to limit the force transmitted to the piezoceramic sensor 204 when an external compression force is applied to the block of friction material 203.

The protective element 216 is in particular configured in order to direct at least part of the external compression force to an area of the support element 202 surrounding the piezoceramic sensor 204 itself.

Preferably, all of the other sensors and possibly also other components of the electrical circuit 209 have a respective protective element of the same type as that described above.

The protective element 216 completely embeds the piezoceramic sensor 204 and can be made up of a half-shell having an internal direct or indirect contact surface 217 uniform with the external surface of the piezoceramic sensor 204 and a uniform direct or indirect rest base 218 on said support element 202. The protective element 216 preferably is generally dome-shaped.

The resin that constitutes the protective element 216 is preferably a polyimide resin, or an epoxy resin, or a Bismaleimide resin, or a Cyanate-Ester resin or a mixture therein. These resins can be loaded with reinforcing particles, in particular a ceramic and/or metallic material, such as ceramic particles of alumina and/or metallic particles of aluminum.

In order to evaluate the progress in the response of the piezoceramic sensor as the operating temperature of brake pads changes, the following is the result of tests carried out on batches of brake pads that differ in the resin-based material that forms the protective element of the piezoceramic sensor.

Tests on the First Batch of Brake Pads

The tests were performed on standard Dyno benches for NVH and dynamometric measurements. In particular, the tests were conducted on a first batch of brake pads, in which the protective element of the piezoceramic sensor consists of an epoxy resin-based material commercially known by the name Hysol™ 9492 manufactured by Loctite™.

This epoxy resin-based material includes a first component of epoxy resin loaded with metallic particles of aluminum and ceramic particles of alumina, and a second amide-based component acting as a cross-linking catalyst.

The tests consisted of bench tests performed at different values of pressure from 5 to 40 Bar and with the temperature of the brake disc being controlled within the interval of 50 to 300° C.

The procedure used was as follows: 88 braking applications were made from 50 km/h to 2 km/h as per the following table.

| Braking applications | Braking pressure [Bar] | Brake disc temperature [° C.] |
|---|---|---|
| 1-1-1-1-1-1-1-1 | 5-10-15-20-25-30-35-40 | 50 |
| 1-1-1-1-1-1-1-1 | 5-10-15-20-25-30-35-40 | 100 |
| 1-1-1-1-1-1-1-1 | 5-10-15-20-25-30-35-40 | 150 |
| 1-1-1-1-1-1-1-1 | 5-10-15-20-25-30-35-40 | 200 |

-continued

| Braking applications | Braking pressure [Bar] | Brake disc temperature [° C.] |
|---|---|---|
| 1-1-1-1-1-1-1-1 | 5-10-15-20-25-30-35-40 | 250 |
| 1-1-1-1-1-1-1-1 | 5-10-15-20-25-30-35-40 | 300 |
| 1-1-1-1-1-1-1-1 | 5-10-15-20-25-30-35-40 | 250 |
| 1-1-1-1-1-1-1-1 | 5-10-15-20-25-30-35-40 | 200 |
| 1-1-1-1-1-1-1-1 | 5-10-15-20-25-30-35-40 | 150 |
| 1-1-1-1-1-1-1-1 | 5-10-15-20-25-30-35-40 | 100 |
| 1-1-1-1-1-1-1-1 | 5-10-15-20-25-30-35-40 | 50 |

Regarding the temperature of the brake pad, its temperature is normally approximately half that of the brake disc.

Figure 16:
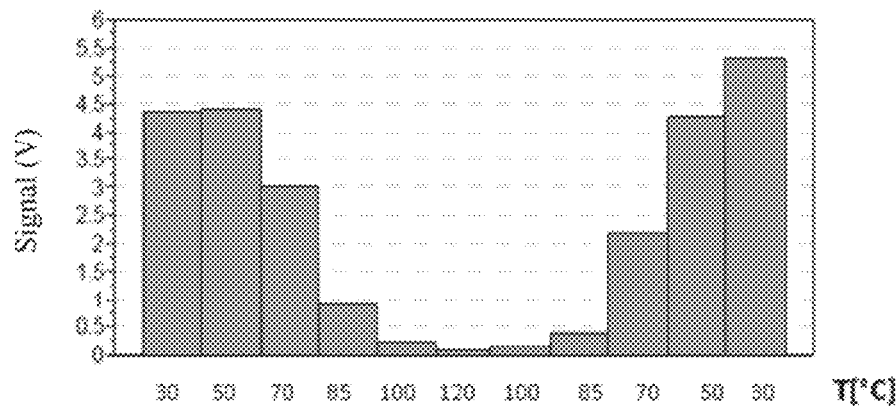
FIG. 16 shows the variation in the piezoceramic sensor response signal used in testing with a temperature variation of the brake pad, where the protective element of the piezoceramic sensor consists of a first type of resin-based material.
Figure 17:
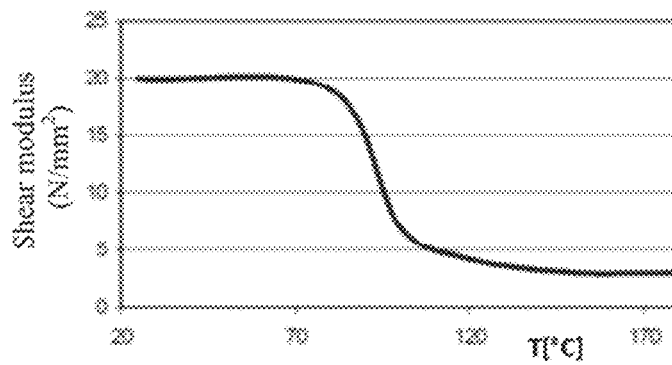
FIG. 17 shows the variation in the shear modulus of the first type of resin-based material used in the tests as a function of temperature.
Figure 18:
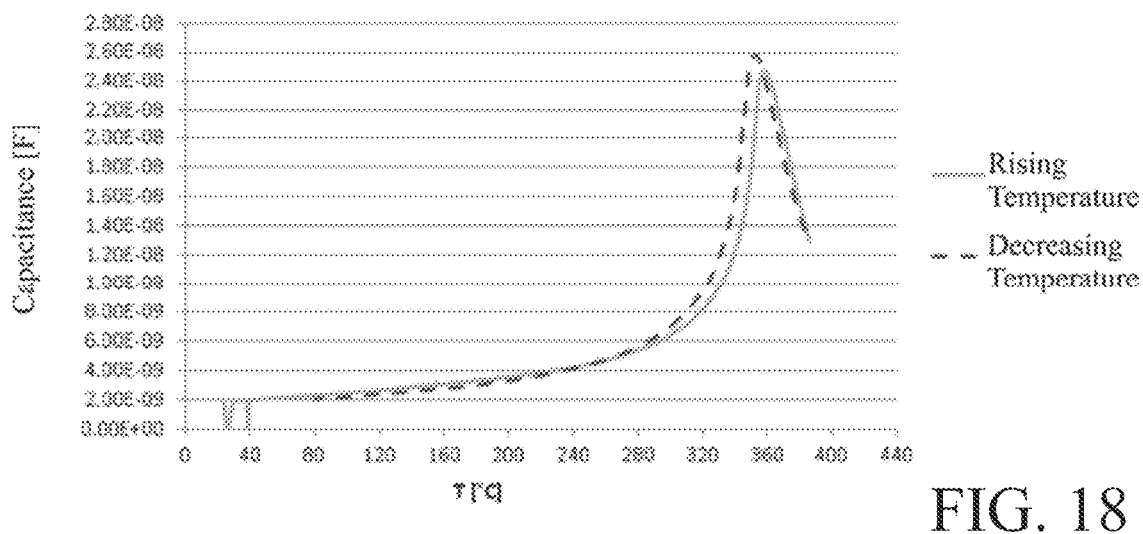
FIG. 18 shows the variation in the capacitance of the piezoceramic sensor used in the tests as a function of temperature.

FIG. 16 shows the progress in the piezoceramic sensor response signal as the temperature of the brake pad changes and at a braking pressure value of 20 Bar. Similar results are obtained for the other values of braking pressure.

During the test a clear attenuation in the signal was observed already at low/moderate temperatures. For example, in FIG. 16 the rapid decay can be seen at around 75-80° C. For the signal measured the amplitude of the second peak is represented (the one at the end of the braking) and reported according to the temperature of the brake pad as measured by a thermocouple on-board the brake pad. The choice of the second peak is linked only to the fact that being tied to the release of the pressure within the hydraulic circuit, it turns out to be more repeatable and thus provides results that are less affected by experimental errors.

The signal attenuation in FIG. 16 is mainly due to the material used for the protective element. In this regard, in FIG. 17 the variation in the mechanical characteristic (shear modulus) of the material used for the protective element can be seen within the temperature interval of interest.

Along with the signal attenuation there is also a secondary contribution due to the variation in the capacitance of the piezoceramic sensor (FIG. 18), though its impact is much lower than that due to the material used for the protective element. In fact the strong correlation is clear between the decline in the response of the brake pad between 70 and 100° C., and the corresponding decline in the mechanical properties of the material of the protective element. The dependence of the piezoceramic sensor on temperature only provides a small contribution, the electrical and mechanical characteristic of the piezoceramic sensor being approximately constant within the interval comprised between 70 and 100° C., while the change is practically linear and modest up to temperatures near to the Curie temperature of the piezoceramic sensor.

The conclusion of this test is that with the material used for the protective element the maximum obtainable temperatures that do not cause excessive losses in the signal from the sensor are approximately 70-85° C. Clearly, this temperature interval, which corresponds to temperatures at brake disc of 170° C. or so, is unacceptable.

Figure 19:
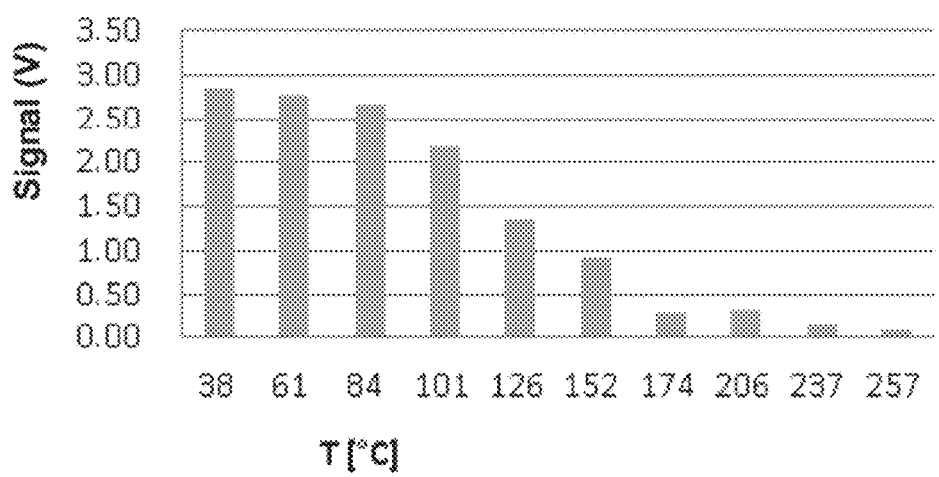
FIG. 19 shows the variation in the piezoceramic sensor response signal used in testing as a temperature variation of the brake pad, where the protective element of the piezoceramic sensor consists of a second type of resin-based material.

FIG. 19 shows a piezoceramic sensor response versus temperature where the protective element of the piezoceramic sensor consists of a second type of resin-based material. As illustrated, signal loss occurs at higher temperatures than the material illustrated in FIG. 16 which may be suitable for higher temperatures applications.

Tests on the Second Batch of Brake Pads

Further tests were performed using for the protective element an epoxy resin-based material commercially known as Duralco™ 4703 produced by Cotronics™. This material differs from the previous material by way of the concentration of reinforcement particles within the epoxy resin and the provision of specific functional groups within the epoxy chains.

The tests were performed on standard Dyno benches for NVH and dynamometric measurements.

The tests consisted of bench tests performed at different values of pressure from 10 to 40 Bar and with the temperature of the brake disc being controlled within the interval 50 to 500° C.

The procedure used was as follows: braking applications were made from 50 km/h to 2 km/h as per the following table.

| Braking applications | Pressure (Bar) | Brake disc temperature [° C.] |
|---|---|---|
| 200 | 20 | 50 |
| 10-10-10-10 | 10-20-30-40 | 50 |
| 10-10-10-10 | 10-20-30-40 | 100 |
| 10-10-10-10 | 10-20-30-40 | 150 |
| 5-5-5-5 | 10-20-30-40 | 200 |
| 5-5-5-5 | 10-20-30-40 | 250 |
| 5-5-5-5 | 10-20-30-40 | 300 |
| 1-1-1-1 | 10-20-30-40 | 350 |
| 1-1-1-1 | 10-20-30-40 | 400 |
| 1-1-1-1 | 10-20-30-40 | 450 |
| 1-1-1-1 | 10-20-30-40 | 500 |
| 200 | 20 | 50 |

Below we provide an explanation of how this occurs.

Let us assume the application of an external compression force F upon the friction material 203.

We refer to the stress situation acting upon a piezoceramic sensor 204.

The protective element 216 experiences a force whose resultant F' is different from the compression force F applied to the block of friction material 203.

Such a resultant force F is also transmitted to the piezoceramic sensor 204 which experiences a final force $F_p$ which in general is also different from the force F' but also linked to it. $F_p$ is the force that induces the electrical signal that is effectively measured by the piezoceramic sensor.

We assume that the transfer of the external compression force F takes place from the surface of the block of friction material 203 to the underlying layers without appreciable tangential deformations, in other words, we assume that the block of friction material 3 is substantially rigid in the longitudinal direction.

In the model it is also assumed that the friction material and the protective element are represented in the mechanical model by springs with the elastic constants k and k' respectively, and that the linear dimensions of the spring relating to the block of friction material are the same as the block of friction material itself in the regions outside and within the area of application of the protective element.

Supposing therefore a linear elastic behavior of the materials, then Hooke's law is valid, according to which:

$$F = kx$$

$$F' = k'x'$$

$$F_p = k_p x_p$$

where x, x' and respectively $x_p$ represent the deformation in the direction of compression, k, k' and respectively $k_p$ the elastic constant.

It can be shown that:

$$F' = 2F/(1+k/k')$$

$$F_p = 4F/(1+k'/k_p)(1+k/k')$$

The force $F_p$ as experienced by the piezoceramic sensor 204 is therefore linked but not equal to the force F originally applied to the block of friction material 203. The force $F_p$ attenuation factor depends upon the choice of the ratios $k'/k_p$ and k/k' and can be adjusted, with k and $k_p$ being equal, by increasing or decreasing the elastic constant k'.

It follows that once the block of friction material and the piezoceramic sensor are defined, which normally have quite strong limitations from the point of view of the variation in their mechanical properties as well as in terms of the requirements regarding their physical properties, the choice of the optimum values for k', or the mechanical properties of the protective element, then becomes crucial in order to optimize the transfer of forces.

Figure 20:
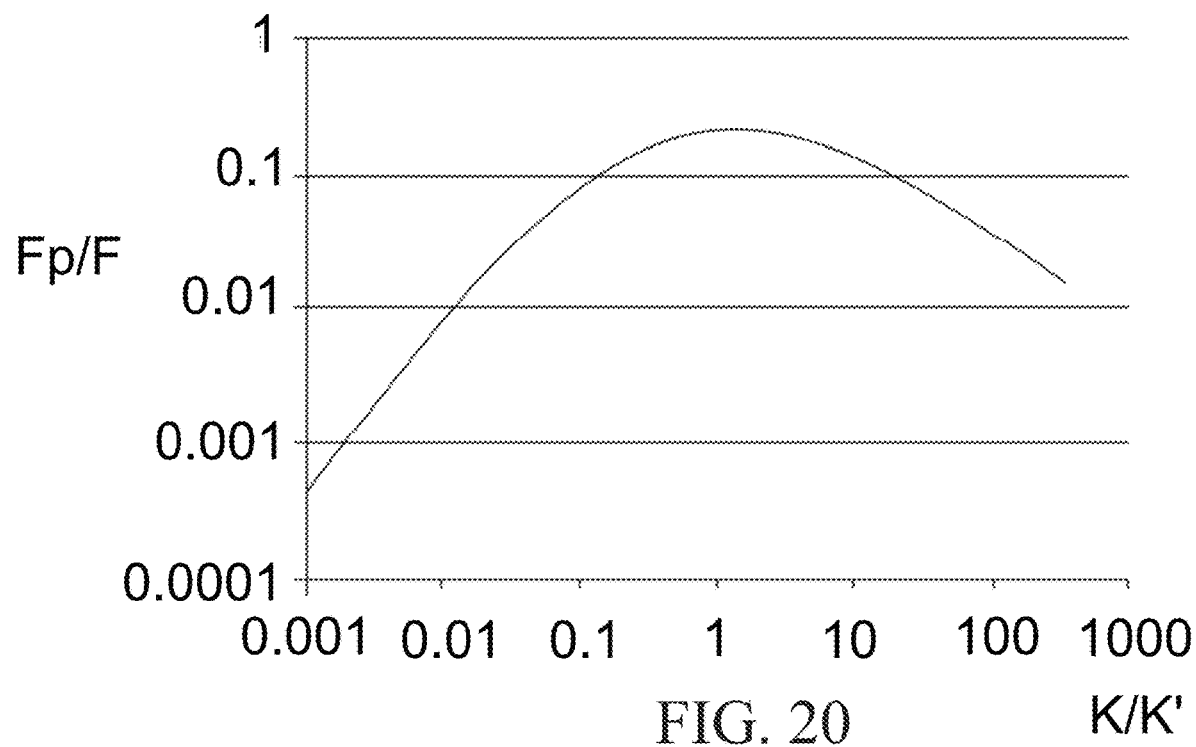
FIG. 20 shows a curve that ties the force experienced by the piezoceramic sensor as a result of applying an external compression force F as the elastic constant of the resin-based material, that forms the protective element, changes.

By way of a significant as well as explanatory example, we will consider the result from the model assuming realistic values for k and $k_p$, in particular taken from the measurements of the elastic constants for the block of friction material and the piezoceramic sensor. The constant k' will instead be considered as a parametric variable to be chosen in order to optimize the response of the piezoceramic sensor. Suppose then that $k_p = 10^{11}$ N/m $= 10^{11}$ N/m and $k = 10^{10}$ N/m. These values of $k_p$ and k for the block of friction material and the piezoceramic sensor are values that are close to reality. In this case the relationship for $F_p/F$ depends only upon k'. FIG. 20 shows the response curve $F_p/F$ as a function of k/k' while considering the above values of $k_p$ and k. It is clear that there is an optimal value regarding the ratio between the mechanical constants k/k' that optimizes the response of piezoceramic sensor. Therefore, once the piezoceramic sensor and the block of friction material are fixed, then the protective element should be chosen carefully. For example, choosing materials that are too soft compared to the optimal value at the maximum point of the response curve will determine a weak coupling which will lead to the forces being transferred inefficiently, while choosing materials that are too hard, again with respect to the optimal value at the maximum point of the response curve, will lead to the deformation being transferred to the piezoceramic sensor inefficiently. With regard to FIG. 20 it should be noted that a logarithmic scale has been applied to the abscissa and ordinate axes, with the result that, away from the maximum point of the response curve, an order of magnitude variation in the ratio of the elastic constants will have similar results also on the forces measured at the location of the piezoceramic sensor. Only by keeping the values of the elastic constants near the optimum value at the maximum point of the response curve will efficient transfer be maintained. This means that also the thermo-mechanical properties have to be selected with care in order to avoid, as a result of softening or hardening of the mechanical properties between the materials employed, loss of efficiency as a temperature variation. Working in the vicinity of the maximum point of the response curve results then in a further clear advantage, namely that the stability of the response is greatly superior also in the case of variations in the thermo-mechanical properties, even at large intervals.

Therefore, by suitably selecting the mechanical properties of the material composing the protective element (in the sense of softening or hardening), it is possible to maintain the load experienced by the piezoceramic sensors well below the maximum load bearable by this class of sensors during both the braking device production process and normal operation of the braking device.

For the purposes of the application under consideration, it has nevertheless been found convenient, for predetermined values of $k_p$ and k, to choose k' such that $F_p/F$ is not less than 0.01.

This means that also the thermo-mechanical properties have to be selected with care in order to avoid, as a result of softening or hardening of the mechanical properties between the materials employed, loss of efficiency as a temperature variation. Working in the vicinity of the maximum point becomes then a further clear advantage, namely that the stability of the response is greatly higher also in the case of variations in the thermo-mechanical properties, even at large intervals (even up to 200% without significant variations in said maximum point).

With reference to the tests carried out, the predictions of the simple mechanical model described above are accurate.

In fact, at low temperatures the ratio k/k' for the first type of material adopted is close to 30, and involves a transmission efficiency of 10% which is very close to that which was actually measured. At high temperatures the phase transition of the material above 90° C. induces a change in the elastic constant of about a factor 5. Given that we are within the region of linear behavior, the model predicts a corresponding collapse in the response of the sensor by a factor 6, which is further reduced as the temperature increases up to a further factor 10 i.e. up to an order of magnitude less, i.e. it provides an increase in efficiency of up to 1-2%, which is effectively what has been observed.

Unlike the second type of material that has a ratio k/k' close to 10, i.e. closer to the maximum and in fact exhibits an efficiency of 30%, it suffers smaller variations, also in temperature, and only at higher values.

In conclusion, since the friction materials and the piezoceramic materials have reasonably stable mechanical properties within very wide temperature intervals, the choice of the material for the protection element should be made whilst applying logic that is based upon the graph of FIG. 20. This means that the elastic constant for the material is chosen to be as close as possible to the maximum point of the graph of FIG. 20. This is in order to achieve the maximum response from the piezoceramic sensor with the greatest possible stability in the signals coming from the piezoceramic sensor also as a result of moderate reciprocal variations between the elastic constants of the materials.

Signal Transduction Devices

Figure 21:
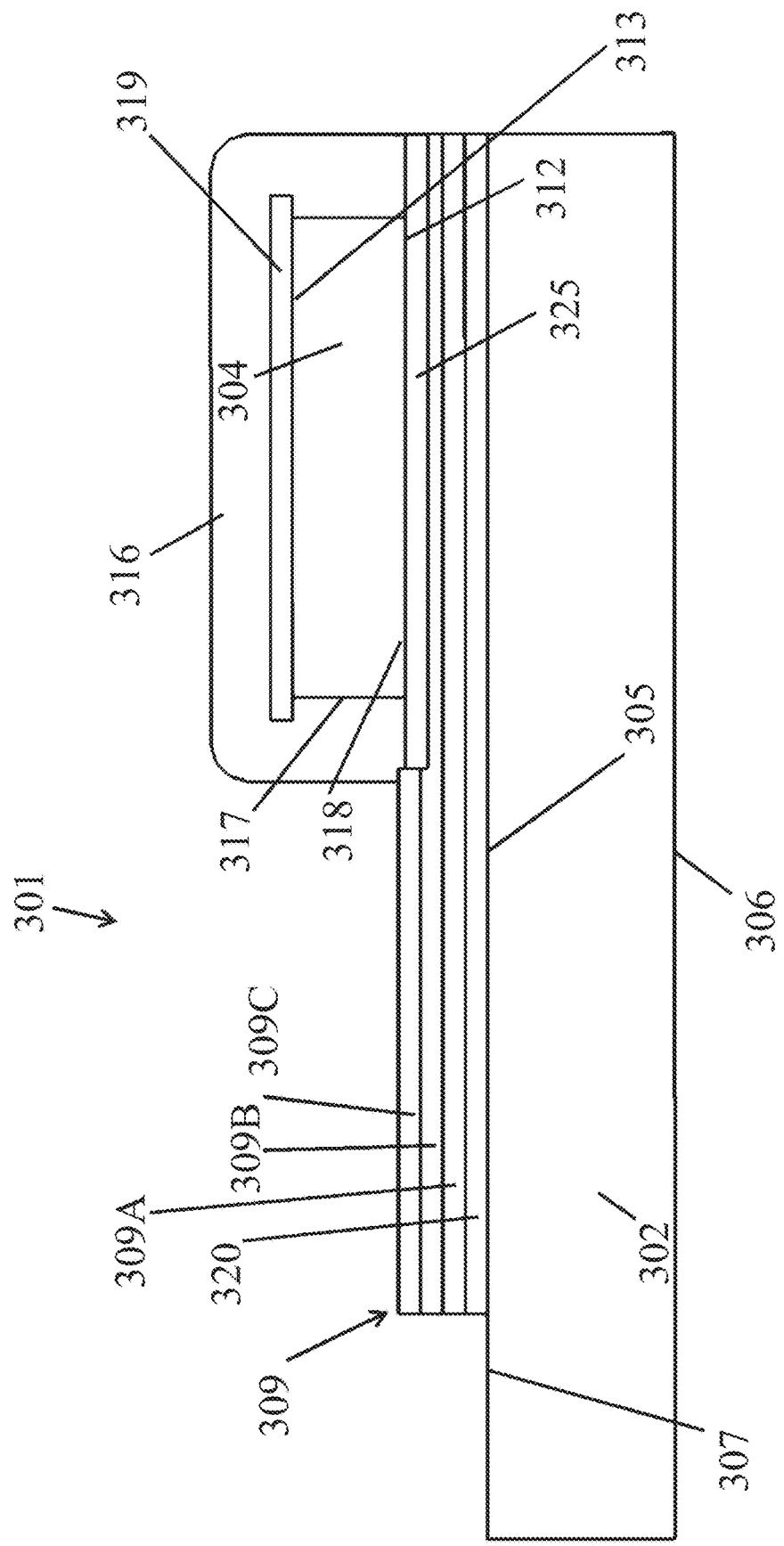
FIG. 21 illustrates a section of a signal transduction device. With reference to the figures a signal transduction device is referenced as a whole with 1.

FIG. 21 illustrates a signal transduction device 301 comprising a flat plate-like support element 302 and one or more piezoceramic sensors 304 supported by the support element 302. In the case shown and below reference will be made, without limitation, to cases in which there will be a single piezoceramic sensor 304.

The piezoceramic sensor 304 is supported in a raised arrangement on the support element 302. The support element 302 supports an electrically isolated electric circuit 309 that has electrical contacts that are connected to the electrodes of the piezoceramic sensor 304.

The piezoceramic sensor 304 can be made of piezoceramic materials with a Curie temperature greater than 200° C., and can be formed of a preferably cylindrical body that is polarized in the direction of its axis and delimited by a pair of opposite flat faces 312 and 313 that are arranged in use parallel to the main planar surfaces of the support element 302. Preferably both electrodes of the piezoceramic sensor 304 are obtained on the face of the piezoceramic sensor 304 facing the electric circuit 309. Specific examples of piezoceramic sensors 304 that may be used are for instance PIC 255 (Manufacturer: PI Ceramic), PIC 300 (Manufacturer: PI Ceramic), PIC 181 (Manufacturer: PI Ceramic), PIC 050 (Manufacturer: PI Ceramic), TRS BT200 (Manufacturer: TRS Ceramics), PZT5A1 (Manufacturer: Morgan Advanced Ceramic), PZT5A3 (Manufacturer: Morgan Advanced Ceramic).

In some configurations the piezoceramic sensor 304 has an integral protective coating 316 being in direct or indirect contact with the support element 302 perimetrally to the piezoceramic sensor 304 itself. The integral protective coating 316 is located on the support element 302 at the position of the piezoceramic sensor 304.

The integral protective coating 316 can be configured to direct a predetermined part of an external compression force onto an area of the support element 302 surrounding said piezoceramic sensor 304.

The integral protective coating 316 has an internal direct or indirect contact surface 317 uniform with the external surface of the piezoceramic sensor 304 and a uniform direct or indirect rest base 318 on said support element 302. The integral protective coating 316 can have a generally domed shape.

The integral protective coating 316 is preferably made from a resin-based material, for example polyimide resins, epoxy resins (loaded or not), Bismaleimide resins and Cyanate-Ester resins, but ceramic materials that are much harder than resins and suitable for temperatures above 350° C. may also be used.

The integral protective coating 316 has electrical and thermal insulation properties.

The thermal and electrical insulation properties can be conferred by the constituent material or by a specific layer or an appropriate constituent element of the integral protective coating 316.

In the illustrated case the integral protective coating 316 comprises a main body made of electrically insulating material within which an element made from thermally insulating material 319 is located.

The integral protective coating 316 therefore thermally shields the piezoceramic sensor 304 from external heat in such a way that the piezoceramic sensor 304 can function under less onerous operating conditions from the point of view of temperature. Various materials can be used for such purposes such as the so-called thermal barrier (TBC) materials, or else Yttria or Magnesium stabilized Zirconia in the form of mastics, coatings with ceramic compounds or special paints.

In addition the integral protective coating 316 shields the piezoceramic sensor 304 from external electrical disturbance.

The support element 302 is covered with a thermally insulating layer 320 upon which the piezoceramic sensor 304 is arranged.

The thermally insulating layer 320 in particular is interposed between the support element 302 and the electric circuit 309.

Typical materials usable for thermal insulating layers 320 are for instance YSZ (Yittria Stabilized Zirconia), Mullite ($Al_{4+2x}Si_{2-2x}O_{10-x}$), α-phase $Al_2O_3$ in conjunction with YSZ, $CeO_2$+YSZ, Rare-earth zirconates like $La_2Zr_2O_7$, Rare earth oxides like $La_2O_3$, $Nb_2O_5$, $Pr_2O_3$, $CeO_2$, Metal-Glass Composites.

The signal transduction device construction method is as follows.

The thermally insulating layer 320 is initially applied to the support element 302.

The electrically isolated electric circuit 309 is then integrated with the support element 302.

The electrically isolated electric circuit 309 is preferably constructed by means of the screen printing technique.

A lower screen printed layer 9A made from an electrically insulating material is first deposited onto the thermally insulating layer 320, an intermediate screen printed layer 9B made from an electrically conductive material is then deposited onto the lower screen printed layer 9A, thus defining the actual electrical circuit itself, an upper screen printed layer 9C made from an electrically insulating material is then deposited onto the intermediate screen printed layer 9B which leaves the contacts uncovered for the electrical connection of the piezoceramic sensor 304.

The insulating layers 9A, 9C consist, for example, of a base made of alumina/graphite particles (or a silicate matrix) optionally immersed in a matrix of a polymeric nature (preferably polyimide), while the conductive layer 9B consists of silver or palladium screen printing pastes.

The sensor is then integrated being electrically and mechanically connected to the electrical contacts of the electric circuit 309.

The piezoceramic sensor 304 is permanently connected by means of its two electrodes to the respective contacts by means of a layer 325 composed of welding paste which is electrically conductive at high temperature. In practical terms, once the electrical circuit 9 has been formed, this high temperature welding paste layer is applied to the area of the contacts and/or of the electrodes, after which the sensor is positioned by matching its two electrodes with the counterpart contacts provided by the electrical circuit 309. Finally the assembly is cured typically at around 200° C. depending upon and in accordance with the specifications of the welding paste used, which is preferably composed of silver as the base element of the electrically conductive component. In principle, depending upon the choice of welding paste, temperatures in the order of 800° C. can be reached.

At this point the sensor 304 is coated with the related protective element 316 for example by means of the dripping of material at standard pressure and moderate temperatures of less than 200° C.

Figures 22A, 22B, 22C:
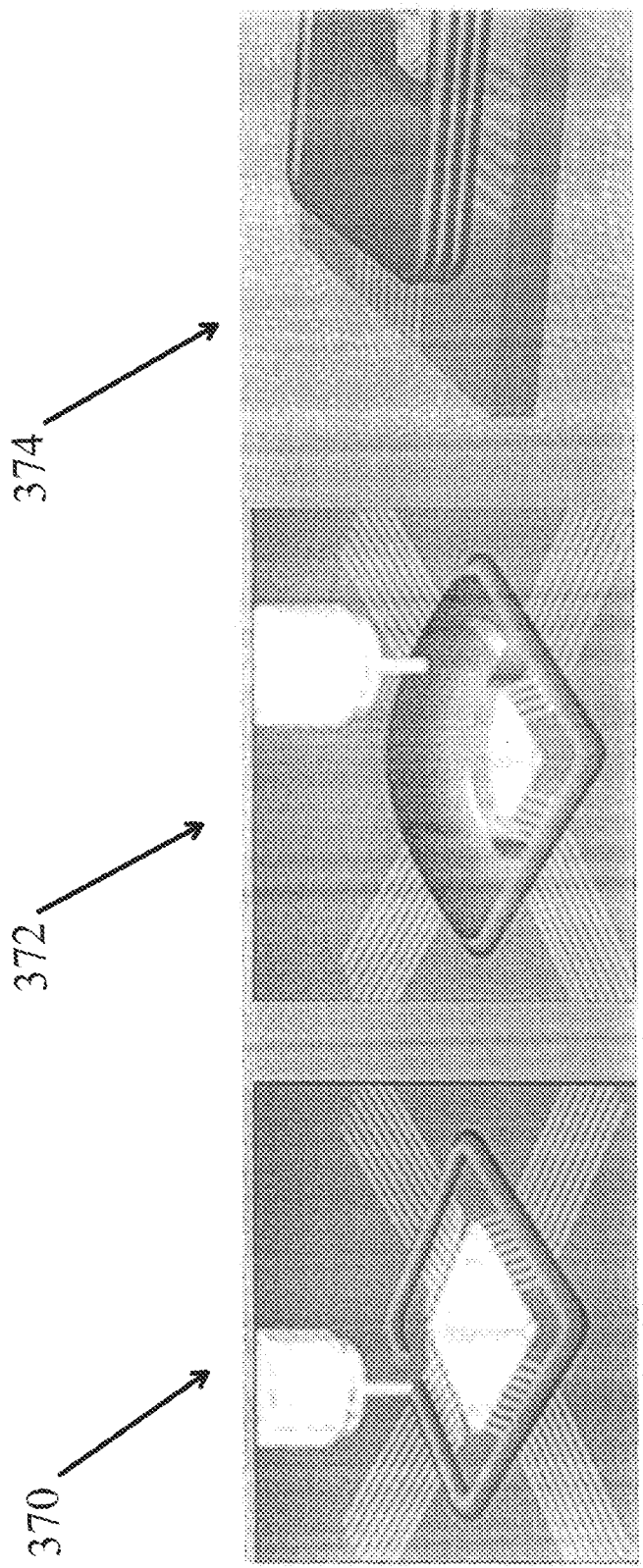
FIG. 22A shows a schematic view of a "damming" step of a method of application of a protective layer by a Dam & Fill technique.
FIG. 22B shows a schematic view of a "filling" step of the Dam & Fill technique.
FIG. 22C shows a schematic view of a formed protective element applied to the piezoelectric sensor by the Dam & Fill technique.

With particular reference to FIGS. 22A, 22B and 22C, a method to apply the protective element 316 to the piezoelectric sensor is illustrated in steps 370, 372, 374. The resin for the protective element 316 is deposited by a dispenser for resin material, preferably with an automatic dispenser for resins with a low level of thixotropy Dam & Fill technique. A ring of a sacrificial thixotropy resin can be made first around the sensor in order to build a kind of dam to enclose the resin used for making the protective element 316, as shown in step 370 of FIG. 22A. Then, the material for protective element 316 is used to fill up the dam in order to cover the sensor, as shown in step 372 of FIG. 22B. Multiple layers of material may be overlaid to form the protective element 316, as shown in step 374 of FIG. 22C.

The signal transduction device thus conceived is capable of operating in extreme environmental conditions thanks to its special construction which ensures suitable thermal and electrical insulation and that guarantees the integrity of the piezoceramic sensor, which is suitably protected by its coating, said coating being capable of deflecting at least part of the external compression forces towards the area of the support element surrounding the piezoceramic sensor.

The applications of the signal transduction device thus conceived and described above can be extended to all fields of technology where a conventional piezoelectric transduction device may not function due to prohibitive environmental boundary conditions.

Piezoelectric Sensor Conditioning Circuits and Electrical Systems for Generating Brake Pad Data In certain implementations herein, an electrical system for generating brake pad data of a vehicle is provided. The electrical system can include a piezoelectric sensor that generates a sensor signal, a passive conditioning stage that generates an analog conditioned signal based on conditioning the sensor signal, an active conditioning stage that processes the analog conditioned signal to generate an analog output signal, and a control unit that processes the analog output signal to generate brake pad data that includes a digital representation of the sensor signal.

Accordingly, a sensor signal from a piezoelectric sensor, such as a piezoceramic sensor, is processed using analog circuitry that is divided or partitioned into multiple stages that are physically separated from one another. The passive conditioning stage generates the analog conditioned signal based on conditioning the sensor signal using passive electronic components, such as resistors and/or capacitors. Additionally, the active conditioning stage generates an analog output signal based on processing the analog conditioned signal.

In certain implementations, the passive conditioning stage includes a resistor electrically connected in parallel with the piezoelectric sensor. For example, the resistor can include a first end electrically connected to a first terminal of the piezoelectric sensor and a second end electrically connected to a second terminal of the piezoelectric sensor and to ground. In one embodiment, the resistor can have a resistance in the range of about 1 MΩ to about 50 MΩ, for instance, 10 MΩ. However, other resistance values are possible, including, for example, resistance values that depend on application, implementation, and/or a type of sensor. In one embodiment, the analog conditioned signal is substantially proportional to a time derivative of a charge stored in the piezoelectric sensor.

The passive conditioning stage can be placed in a relatively close vicinity to the piezoelectric sensor. In a first example, the passive conditioning stage is integrated into a backplate of the sensorized brake pad. For instance, a resistor can be screen printed and electrically connected to a pair of electrodes or terminals of the piezoelectric sensor. In a second example, the passive conditioning stage is integrated into a connector of the sensorized brake pad, including, for instance a flying or fixed part of the connector. In a third example, the passive conditioning stage is integrated into a cable. In one embodiment, the passive conditioning stage is integrated in a portion of the cable that is within about 10 cm of the sensorized brake pad.

The active conditioning stage can be implemented in a wide variety of ways. In certain implementations, the active conditioning stage includes one or more analog buffers, which can non-inverting, inverting, or a combination thereof. In one embodiment, the analog output signal from the active conditioning stage is substantially proportional to a time derivative of a charge stored in the piezoelectric sensor.

The active conditioning stage is separated from the passive conditioning stage to increase the robustness of the electrical system to high heat operating conditions. In certain implementations, the active conditioning stage is positioned at least about 2 cm from the passive conditioning stage. However, other amounts of separation are possible. By separating the active conditioning stage from the passive conditioning stage, heat-sensitive active circuitry, such as transistors (for instance, metal oxide semiconductor transistors), can be thermally decoupled from high heat generating components of the sensorized brake pad. Accordingly, the active conditioning stage can operate in a lower temperature environment (for instance, less than about 125° C.) relative to the passive conditioning stage, and thus the active conditioning stage can exhibit a slower rate of thermal aging.

Although it can be desirable from a standpoint of signal processing to place the active conditioning stage relatively close to a piezoelectric sensor, positioning the active conditioning stage in close proximity to the piezoelectric sensor can result in the active conditioning stage being exposed to a relatively large amount of heat. In certain implementations, an active conditioning stage is integrated with a cable. In other implementations, an active conditioning stage is integrated with a connector, such as on a flying part. By increasing a distance between the active conditioning stage and the piezoelectric sensor, thermal decoupling increases and the temperature of the active conditioning stage can be lowered during operation of the brake pad. In certain implementations, one or more thermal barrier materials are included in a flying connector to improve thermal insulation of the active conditioning stage.

The control unit can implemented in a wide variety of ways. For example, the control unit can include a stability control unit, a traction control unit, an engine control unit, a brake control unit, or other vehicle control unit. In certain configurations, a sensorized brake pad includes multiple piezoelectric sensors and corresponding passive and active conditioning stages, and a common control unit processes sensor signals from the piezoelectric sensors.

In certain implementations, the control unit includes a digitizer that generate a digital signal based on the analog output signal from the active conditioning stage, a digital integration stage that digitally integrates the digital signal to generate a digital integrated signal, and a low frequency noise filtering stage that filters the digital integrated signal to generate brake pad data, which includes a digital representation of the sensor signal from the piezoelectric sensor.

Accordingly, in certain implementations the control unit includes a digitizer and at least two distinct digital processing stages.

Figure 32:
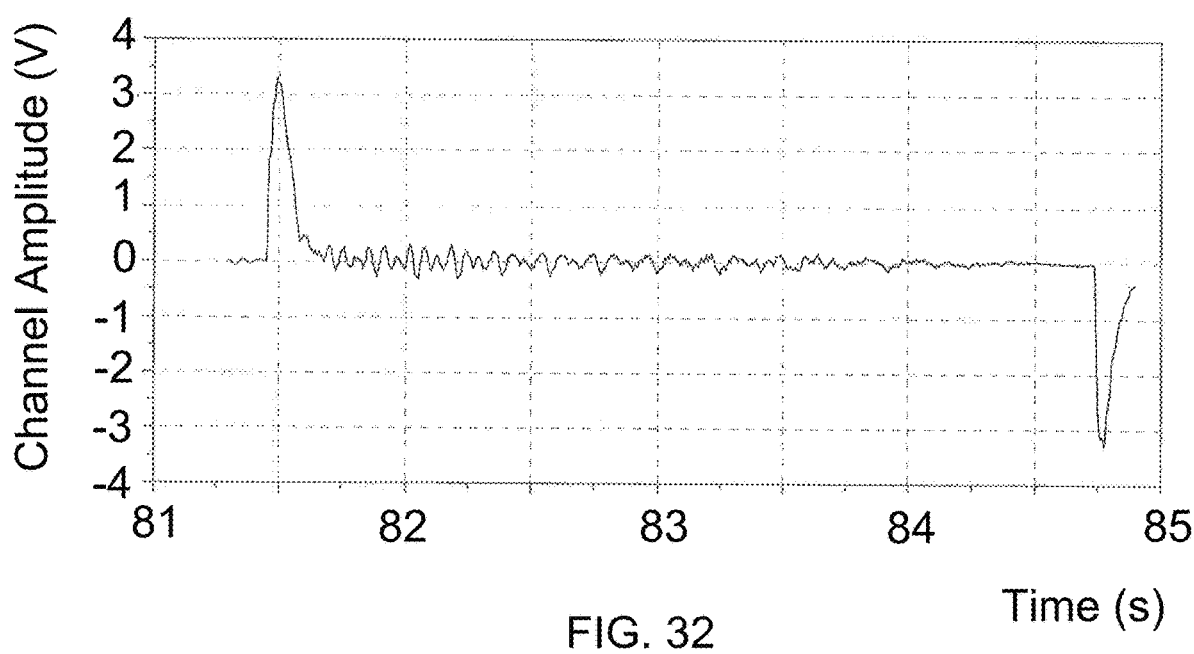
FIG. 32 is a graph of one example of channel voltage amplitude versus time for a braking event.

The digital integration stage can be implemented as a numerical integrator that integrates a digital representation of the sensor signal over a time range that includes a start of an application of the brake and an associated release of the brake (see, for example, FIG. 32). Integrating the sensor signal in this manner avoids a need to integrate the sensor signal using an analog charge amplifier. Thus, the analog integration circuitry can be removed from the brake pad, which can enhance the robustness of the brake pad's electronics to high heat conditions, thereby providing a brake pad that exhibits superior temperature performance.

The digital integrated signal can be further processed by the low frequency noise filtering stage to remove noise components. Filtering the digital integrated signal in this manner reduces or eliminates noise components that do not have physical meaning with respect to compression of the piezoelectric sensor, and aids in avoiding signal drift issues. In contrast, an analog charge amplifier integrates substantially all charge, including noise-induced charge, and thus can suffer from signal drift issues.

Accordingly, the teachings herein can be used to enhance accuracy of processing a sensor signal from a piezoelectric sensor. In particular, low frequency components of the sensor signal can be naturally decoupled from high frequency noise, since the analog output signal from the active conditioning stage can correspond to a time derivative of charge stored in the piezoceramic sensor. In certain implementations, a raw signal in the frequency domain can be about equal to $j\omega Q(\omega)$, where j is the mathematical imaginary unit, $\omega$ is angular frequency, and $Q(\omega)$ is a frequency-dependent charge function, as will be described in detail further below. In such implementations, the raw signal can be 0 at $\omega=0$ and relatively small at low frequencies. Accordingly, the low frequency noise filtering can be used to remove from the raw signal a component at about $\omega=0$ that would have otherwise induced a drift on the integration process with time. Accordingly, performing digital integration and low frequency noise filtering using a control unit can provide superior robustness to signal drift relative to analog integration schemes using a charge amplifier.

In certain implementations, the sensorized brake pad and the control unit are connected to one another via a wired connection, such as a cable terminated by a connector. In other implementations, the sensorized break pad can include a wireless component, such as a transceiver that wirelessly communicates with the control unit. For example, the transceiver and active conditioning stage can be integrated with a connector, such as on a flying part of the connector, thereby providing a relatively high amount of thermal decoupling and limiting temperatures in harsh operating conditions to relative low temperature, for instance, less than about 125° C., and more preferably less than about 85° C. The active conditioning stage can be powered in a variety of ways, including, for example, via a cable from the control unit and/or via a battery of the sensorized brake pad.

The passive conditioning stage is implemented using passive components that have a relatively high tolerance to heat. In one example, a passive conditioning stage includes passive components, such as surface mount components, that can withstand high temperatures of at least about 200° C., or more preferably, at least about 350° C.

In certain implementations, the passive components are implemented via a screen printing process applied directly onto the backplate of the sensorized brake pad. However, the passive components can be implemented in other ways. In another example, the passive components are implemented via screen printing onto a relative thin circuit or substrate (for instance, less than about 1 mm, or more preferably, less than about 200 μm), which is soldered or otherwise attached to the backplate. In yet another example, the passive components are integrated on a printed circuit board (PCB), which is integrated into a connector or cable. In certain configurations, the PCB can be implemented to withstand high temperatures. For instance, a ceramic PCB, such as a PCB including alumina, can withstand relatively hot operating environments. However, other implementations are possible. For example, in implementations with relatively good thermal decoupling, such as when the PCB temperature is less than about 200° C. during operation, the PCB can be implemented using, for instance, FR4.

In implementations using screen printing to integrate the passive analog stage onto the backplate, the screen printing material can be selected for compatibility with relative high operating temperatures of, for instance, up to about 350° C. or more. In one example, the screen printing material can include a high temperature resin material, such as a resin in a polyimide class, and/or ceramic-based pastes. Additionally, one or more dielectric layers (preferably at least three layers of, for instance, resin and/or ceramic) can be applied directly onto the backplate. Additionally, a conductive material can be applied over the one or more dielectric layers to implement a passive analog stage of a desired circuit topology and connectivity. Additionally, at least one dielectric layer (and preferably at least two layers of, for instance, resin and/or ceramic) can be applied over the conductive material to provide electrical insulation. In one embodiment, the insulation withstands at least about 1500 volts DC to ground.

In certain implementations, the passive conditioning stage operates using a shared ground with respect to the piezoelectric sensor. Implementing the passive conditioning stage in this manner reduces or eliminates current loops. In certain implementations, the ground of the piezoelectric sensor and passive conditioning stage is provided from the control unit via a cable. For instance, as discussed above, in certain configurations the passive conditioning stage can be screen printed onto the backplate, and electrically insulated therefrom. Although parasitic capacitance can be present, the relatively high level of insulation can hinder formation of current loops.

In multiple-sensor implementations, ground loops can be reduced by using a common ground for each of the multiple sensors. In certain implementations, the ground of the control unit is connected to a vehicle ground, for instance, directly or via a resistor of, for example, 1 kΩ.

In certain implementations, the active conditioning stage includes one or more operational amplifiers connected as buffers to process a conditioned signal from a passive conditioning stage. Using operational amplifiers or other high input impedance circuits in the active conditioning stage aids in providing signal decoupling and reduces noise and/or current loops. For example, certain piezoelectric sensors, such as piezoceramic sensors, can have relatively high impedance, and implementing the active conditioning stage with high input impedance reduces a risk of current loops that degrade the reliability of brake pad measurements.

Accordingly, the teachings herein can be used to provide a conditioner and a method for conditioning the electrical signal coming from at least one piezoelectric sensor of a braking device for vehicles, and a braking device for vehicles that integrates such a conditioner for conditioning the electrical signal.

In certain implementations, a brake pad for vehicles can include a metallic support element, a block of friction material supported by the metallic support element, and one or more piezoceramic sensors supported by the metallic support element and interposed between the block of friction material and the metallic support element.

During use of the piezoceramic sensors, when subjected to mechanical stress due to the interaction between the block of friction material and the disc bound to the wheel, the sensors generate electrical signals. The electrical signals are conditioned for the detection and/or for the prediction of numerous phenomena, including, for example, an abnormal consumption of the brake pads, due to said brake pads "touching" the disc even when the brake is not actuated, for example due to poor alignment of the brake calipers, or rather noise, vibration and unwanted screeching during braking.

Electrical signals from piezoelectric sensors can be conditioning by means of charge amplifiers that are located near to the piezoelectric sensors. However, very high operating temperatures, such as temperatures greater than about 350° C., damage such charge amplifiers. There is, among other things, the inconvenience of having to apply effective shielding against external disturbances due to the very high impedance of the piezoelectric sensors. The implementation of proper screening is however both complex and costly. Also the electronic circuitry required for a charge amplifier is usually complex and requires electrical circuits and therefore circuit boards of a certain size. This fact implies appropriate installation spaces that may not be readily available near to the brake pads.

Figure 23:
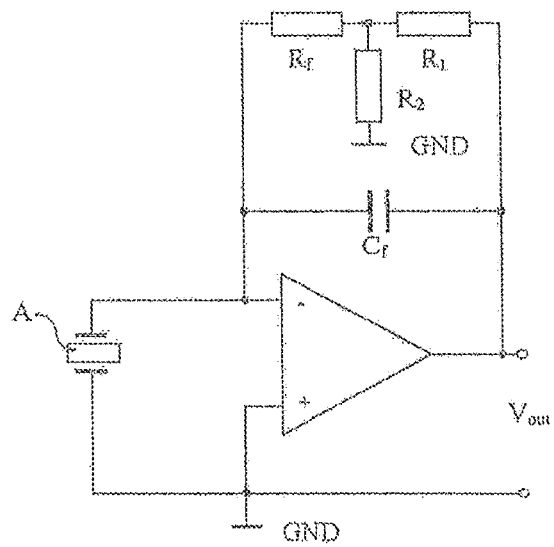
FIG. 23 is a schematic diagram of an active conditioning circuit including a charge amplifier.

For example, FIG. 23 is a schematic diagram of an active conditioning circuit including a charge amplifier, where a piezoelectric sensor is indicated with A. The active conditioning circuit can consist of one or more high-gain voltage amplifiers (inverting configuration) with metal oxide semiconductor (MOS) transistor inputs. In such a case, due to the presence within the circuit of a capacitor, the charge amplifier acts as a charge integrator by means of balancing the variations in the charge coming from the piezoelectric sensor due to the mechanical stresses to which it is subject, by inducing equal variations in charge, but opposite in sign, on the measurement capacitor, and providing at the output of the conditioning circuit a voltage Vout that can be measured by a capture board. The charge amplifier has a relatively large bandwidth. For the configuration shown in FIG. 23, a cut-off frequency at low frequencies can be given by the equation below:

$$V_L = \frac{1}{2\pi\left(1 + \frac{R_1}{R_2}\right)R_f C_f}$$

By means of a modification to the ratio of the resistors R1 to R2, the cut-off frequency can be set to a desired value without using resistance values for Rf that are too large and that could lead to saturation problems, or else too great an offset due to large bias current within the charge amplifier itself. In addition, the capacitance Cf can be kept sufficiently low to maintain the high sensitivity of the circuit during the variations in charge at the piezoelectric sensor. However, a challenging technical problem with respect to the configuration of FIG. 23 can be simultaneously meeting multiple technical specifications. For example, it can be difficult to implement a charge amplifier that has, for instance, a cut-off frequency close to 1 Hz while at the same time maintaining high stability with high sensitivity and low drift over long periods of time.

In certain implementations, a braking device for a vehicle generates signals of interest ranging from very low frequencies (1-2 Hz) up to higher frequency values (20-30 kHz), thus presenting very difficult to solve technical issues due to the high demand for accuracy and the absence of drifting over time periods of even several minutes.

The teachings herein can be used to provide a system for the conditioning of the electrical signal coming from at least one piezoceramic sensor of a braking device for vehicles that exhibits high stability, sensitivity and measurement accuracy in the absence of drifting over long periods of time. The teachings herein can also provide a conditioner for conditioning the electrical signal coming from at least one piezoceramic sensor of a braking device for vehicles that is economical, compact and resistant to high temperatures to be installed in the region of the sensor itself.

This and other purposes are fulfilled by a braking device for vehicles, comprising a support element, a block of friction material supported by the support element, and electrically isolated electrical circuit that has at least one piezoceramic sensor and is interposed between the block of friction material and the support element, characterized in that it comprises a conditioner for conditioning the electrical signal of said at least one piezoceramic sensor comprising a passive analog stage for measurement and a processing digital stage for processing the output signal from said passive analog stage, said passive analog stage comprises a charge derivative electrical circuit and in that said processing digital stage is a stage for digitization and integration of the output signal from said passive analog stage, said passive analog stage for measurement is integrated in said support element or in an electric cable connector of said electrical circuit for transferring said electrical signal or in said cable, said processing digital stage being remotely located from said passive analog stage.

In certain embodiments, the passive analog stage for measurement includes a charge derivative electrical circuit, and the digital stage digitizes the output signal from the analog stage and integrates the same.

In certain embodiments, the charge derivative circuit includes a resistor that is placed in parallel with the piezoceramic sensor. In certain configurations, an AC coupling capacitor is included between the piezoceramic sensor and said resistor.

In another aspect, a braking device for vehicles includes a support element, a block of friction material supported by the support element, an electrically isolated electrical circuit that has at least one piezoceramic sensor and is interposed between the block of friction material and the support element, characterized in that it comprises a conditioner for conditioning the electrical signal of said at least one piezoceramic sensor comprising a passive analog stage for measurement and a digital stage for processing the output signal from said passive analog stage.

In certain embodiments, the passive analog stage for measurement is integrated or in said support element, or in said support element through a cable connector of said electrical circuit, or in said cable.

In another aspect, a method for conditioning an electrical signal coming from at least one piezoceramic sensor integrated into a braking device of a vehicle is provided. The method includes carrying out the conditioning of the electrical signal using a passive analog stage for measuring the electrical signal and using a subsequent digital stage for processing the output signal from said passive analog stage.

Figure 26:
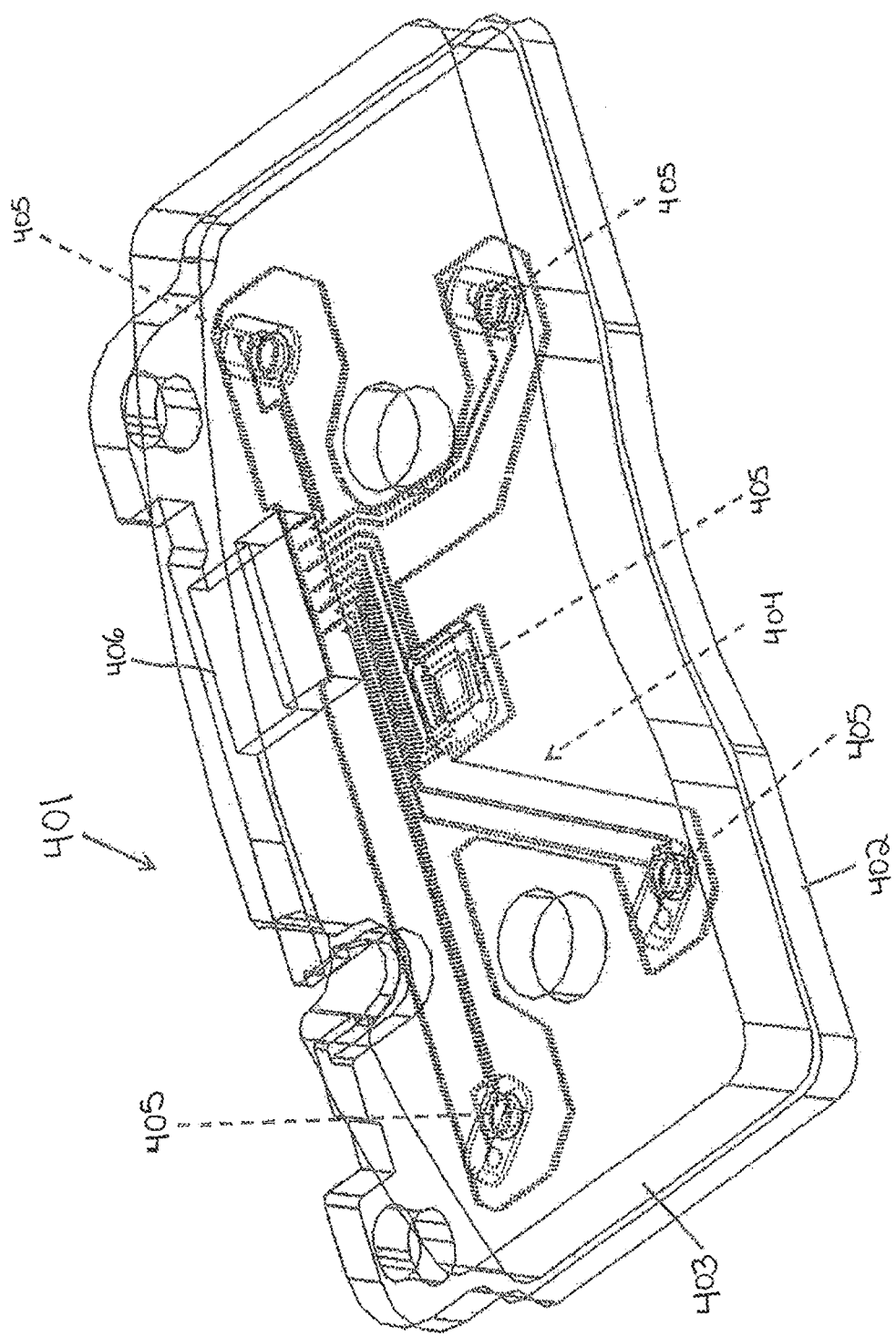
FIG. 26 schematically shows a sensorized brake pad according to one embodiment.

FIG. 26 schematically shows a sensorized brake pad 401 according to one embodiment. The sensorized braking pad 401 can be included in a vehicle braking system. Although specific reference will be made to the brake pad 401, the teachings herein are applicable to other implementations, including, but not limited to a brake shoe of a drum brake.

The illustrated brake pad 401 includes a support element 402, preferably but not necessarily metallic, and known as a "backplate," a block of friction material 403 supported by said support element 402, optionally a damping underlayer applied to the block of friction material 403, an electrically isolated electrical circuit 404 supported by the support element 402 and interposed between the latter and the block of friction material.

The free surface of the block of friction material 403 is intended in use to come into sliding contact with the element to be braked, typically the brake disc of a vehicle wheel.

The electrical circuit 404 has one or more piezoceramic sensors 405 that are able to detect the forces that are exchanged in use during the contact between the pad 401 and the element to be braked as a result of their inherent ability to emit an electrical signal when subjected to a mechanical stress.

The electrical circuit 404 collects the electrical signal, which is generated without the need for an electrical power supply, from the piezoceramic sensors 405 when they are subjected to a mechanical stress.

The brake pad 401 also includes a connector 406 which is preferably integrated into the support element 402 to which an electric cable 400 (see, for example, FIG. 29) is connected or connectable for transferring the electrical signal.

As described further below, a wireless communication channel for transferring the electrical signal may be envisaged as well according other embodiments of the invention.

The braking device includes a conditioner for conditioning the electrical signal coming from the piezoceramic sensors 405 including advantageously a passive analog stage for measuring the signal and a digital stage for processing the output signal from the analog stage.

The digital stage can include a digitization stage for digitizing the analog output signal from the analog stage and an integration stage for integrating the digitized signal.

The passive components used for the analog stage are robust and compact and thus allow for easy integration of the analog stage into the braking device while meeting or exceeding bandwidth performance specifications.

The passive analog stage for measurement can include a charge derivate circuit having a resistor that is placed in parallel with the piezoceramic sensor, and can further include an AC coupling capacitor between the piezoceramic sensor and the resistor.

Figure 24:
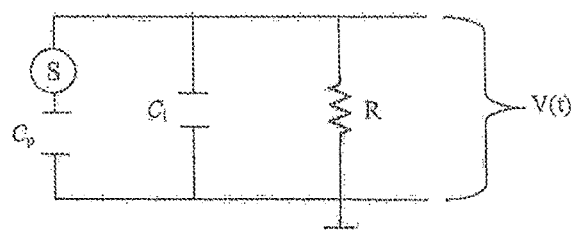
FIG. 24 shows one embodiment of a passive conditioning circuit for an analog stage of a signal conditioner.

FIG. 24 shows one embodiment of a passive conditioning circuit for an analog stage of a signal conditioner. With reference to FIG. 24, the signal source S and the capacitor Cp represent a simplified variant of the equivalent circuit of a piezoelectric sensor; Ci is a parasitic capacitance due mainly to the wiring, while R is a resistance placed in parallel with the piezoceramic sensor. The illustrated electrical circuit transforms the charge signal Q(t) to a voltage signal V(t) (discharge current passing through the resistance R from the piezoceramic sensor). The electrical circuit can be customized or otherwise implemented to provide a sufficiently large signal to be processed by a subsequent digital stage. The illustrated electrical circuit advantageously has relatively low drifting and is intrinsically linked in its operation to the charge accumulated at the piezoceramic sensor, and in particular to its derivative over time. The conditioning circuit allows the piezoceramic sensor discharge rate to be regulated by means of change in the resistance R, but with all the attendant advantages in terms of robustness and reliability at high temperatures due to the fact that it is passive. The analog stage thus implemented optimizes the response of the sensor and constitutes a natural single pole high pass filter.

Figure 25:
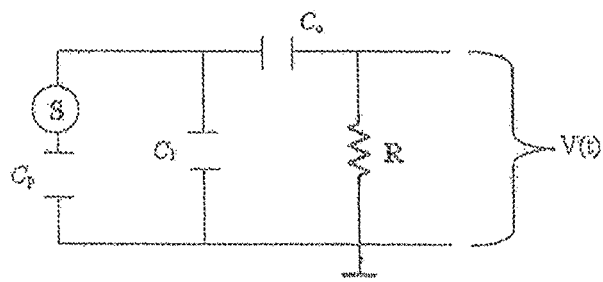
FIG. 25 shows another embodiment of a passive conditioning circuit for an analog stage of a signal conditioner.

FIG. 25 shows another embodiment of a passive conditioning circuit for an analog stage of a signal conditioner. The passive condition circuit of FIG. 25 is similar to the passive conditioning circuit of FIG. 24, except that the passive condition circuit of FIG. 25 further includes a capacitor Co arranged in series with the resistor R. The response of the circuit of FIG. 25 is similar to that of the circuit of FIG. 24, except that the circuit of FIG. 25 includes another first order pole at the frequency $1/(R*Co)$. Including the capacitor Co reduces or eliminates frequency components below this value, and in particular DC components. By appropriately selecting values of R and Co, a desired low cut-off frequency can be obtained. In one example, the low cut-off frequency is selected to be less than 10 Hz, for example, about 2 Hz.

The circuit can exhibit a relatively flat frequency response above the cut-off frequency, and thus provides relatively little distortion above the cut-off frequency, which, among other things, can be controlled to a desired value by choosing a suitable value for the resistance R. In certain implementations, the resistance R is in the order of 1-20 MΩ, and is coupled to a piezoceramic sensor of around 2-3 nF of capacitance, such that a cut-off frequency of 1-10 Hz is provided. This range of cut-off frequencies can retain substantially all of the most important information relating to the braking dynamics, while maintaining sufficiently high signal intensity in terms of dynamic range to be detectable.

With reference to FIGS. 24 and 25, the illustrated conditioning circuits are compact and passive, and are therefore compatible with relatively simple integration with the brake pad. Furthermore, these configurations directly provide an amplified voltage signal. In this way, a transformation of the signal from current to voltage as close as possible to the current source itself (the piezoceramic sensor) contributes significantly to reducing the impact of external disturbances (and increases the signal-to-noise ratio), which is a factor of merit of high importance for conditioning circuits for high impedance sensors, such as piezoceramic sensors. In this respect, a further contribution may be provided by the adding, for both of the conditioning circuit examples above, a buffer or other active conditioning stage that is located not too far from the passive conditioning circuit in order to decouple the disturbances coming from the stages of the signal conditioner.

In particular the buffer decouples the disturbances noise contribution from the cable and from the connector and contributes to immunity from external electromagnetic interference.

The conditioning circuit, being completely passive, is suitable for being integrated in the immediate vicinity of the piezoceramic sensor, with the result of minimizing external disturbances.

In particular the passive conditioning circuit can be integrated directly onto the support element 402. In one example, a special mechanical extension of the mechanical support element 402 could be included which would be thermally decoupled from the block of friction material 403, where the passive conditioning circuit is integrated by means of a PCB electrical circuit or by screen printing it onto the support element 402.

In another example, the passive conditioning circuit can be integrated into the support element through the connector. Such a configuration is thermally decoupled with respect to the brake pad 401. In practical terms the integration of the passive conditioning circuit is achieved by adding a small PCB to the connector.

In another example, the passive conditioning circuit can be integrated externally the support element, but in the immediate vicinity of the connector itself, for instance by adding a small PCB to the electric cable connectable to the brake pad 401 for transferring the electrical signal.

Coming to the discussion and analysis of the signals associated with the electrical conditioning circuits, reference will be made to FIG. 24. The conditioning circuit of FIG. 25 can produce similar types of signals in terms of the response of the sensors because the major differences will be found at low frequencies (i.e. below 2 Hz for example to the ac coupling of the series capacitor) or at high frequencies (well above 20 KHz) because of the low pass filtering due to the buffer itself or to the piezoceramic sensor, which, however, are positioned above 10 kHz in certain implementations, and so do not normally produce serious differences for typical signals with principal components that are well below these frequencies.

In FIG. 24 the capacitor Cp has one electrode that may be held at ground potential and another electrode which provides the signal. In this way the charge induced by an external mechanical stress π(t) will induce a charge on the piezoceramic sensor. Due to the fact that the circuit is tied to ground by means of the resistance R, the piezoceramic sensor will discharge relatively quickly. The result will be a time variant voltage that is seen across the resistance R caused by the piezoceramic sensor discharge current. The external mechanical stress π(t) will therefore act as an electromotive force, for which reason it is hereby represented as a time variant voltage S. Solving the differential equations of the equivalent circuit with respect to the output voltage V(t), considering that the two parallel capacitances Cp and Ct are equivalent to a single capacitance C=Cp+Ci, and considering that the force during braking is in the form of a step function, in other words it begins at a certain instant t0 and ends at a second instant t1, and remains constant during this period and equal to F, we arrive at the equations below, where dp is a constant that depends upon the piezoceramic sensor.

$$V(t) = R\frac{dQ}{dt}$$

$$t < 0$$

$$V(t) = 0$$

$$0 < t < t_1$$

$$V(t) = -\frac{d_p \cdot F}{C} \cdot e^{-t/RC}$$

$$t \geq t_1$$

$$V(t) = -\frac{d_p \cdot F}{C} \cdot e^{-\frac{t}{RC}} + \frac{d_p \cdot F}{C} \cdot e^{-\frac{(t-t_1)}{RC}}$$

The equation given above for V(t) states that the pressure signal during braking and having the previously shown step function form, induces signals within the chosen circuit in the form of a double peak, one positive and one negative, that represent the beginning and end of the braking event. The peak heights will be proportional to the applied force F and circuit parameters of the circuit employed. The exponential decay of the signal is clearly related to the discharging of the capacitor which within the circuit represents the piezoceramic sensor. It follows that the dynamic behavior of the sensor can be changed simply by increasing or decreasing the value of the resistance R. In particular, decreasing the value of R will make the circuit response faster, but on the other hand will make the amplitude of the response smaller due to the increase in the circuit's natural cut-off frequency. From the time dependence of the equivalent circuit it is clear that the dynamics of the sensor connected to the circuit employed for the conditioning will be linked to the derivative over time of the charge induced at the sensor itself due to the mechanical stress that the sensor is placed under. This is evident from the form of the frequency dependence of the load itself, which can be given by the equation below, where ω is the angular frequency and π(Ω) is the Fourier transform (FFT) of π(t).

$$Q(\omega) = -\frac{d_p \cdot \pi(\omega)}{RC} \cdot \frac{1}{j\omega + \frac{1}{RC}}$$

Outside the cut-off frequency region, the charge induced will be directly proportional to the current flowing in the circuit.

The response of the sensor over time is the derivative over time of the charge stored within it and will be dominated by the natural discharge process of the RC circuit associated with the circuit proposed.

Since the passive conditioning circuits of FIGS. 24 and 25 are intrinsically of a derivative nature, and therefore diametrically opposite to a charge amplifier which is by nature integrative, the digital stage of the conditioner (such as a control unit) calculates the information regarding the charge by means of a numerical integration of the signal obtained by the analog stage. The result obtained is directly linked to the total charge accumulated at the sensor during braking and to the variations at the sensor that are associated with the applied forces, which will be seen by the sensor in the form of currents flowing in the circuit itself. The numerical integration of the signal thus can recover the same information that can be obtained with a fully analog-based solution provided by an analog charge amplifier.

Accordingly, in certain implementations herein, an electrical system for generating break pad data omits an analog charge amplifier in favor of including a hardware analog measurement stage that includes a passive conditioning circuit, and a subsequent digital stage for the digitization and integration of the digitized signal.

The integration can be performed in real time in order to promptly intercept variations in the forces during braking (indicated by the charge on the sensor), or else it can be performed subsequently.

The integration can be performed numerically using a software device or else it can be performed by a hardware device, including, but not limited to, an FPGA, a processor, digital circuitry in CMOS technology, etc.

The signal conditioners disclosed herein operate differently from an analog charge amplifier. For example, the signal conditioners separate an analog stage from a digital stage, with the digital stage located remotely from the analog stage.

This approach gives the advantage of having a much more simplified, compact and passive analog stage rather than the active and complex stage that would result from an analog charge amplifier. Thus, a passive condition circuit can be miniaturized and/or integrated into brake pads with advantages in terms of cost and/or signal-to-noise ratio (immunity to external disturbances).

Accordingly, the sensor signal conditioning method involves the integration of the signal coming from a passive "derivative" circuit. The integration is performed in a computational stage which directly integrates the appropriately digitized signal that is directly associated with the charge on the piezoceramic sensor and therefore the forces acting upon said sensor.

The conditioning circuit is located in proximity to the sensors in order to intercept and transform the voltage signal without said signal having to travel too far. Implementing the conditioning circuit in this manner improves accuracy and signal-to-noise ratio.

Figure 27A:
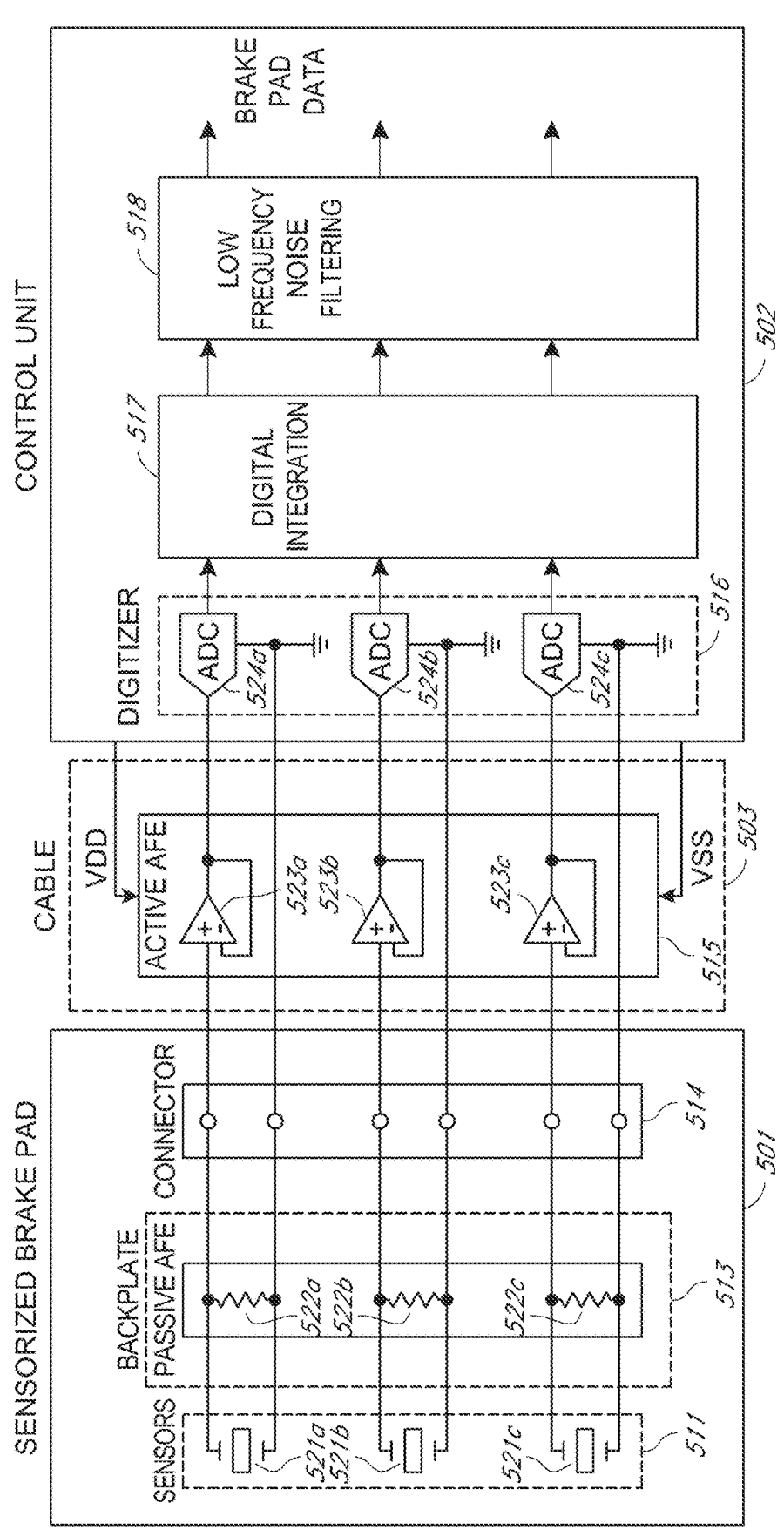
FIG. 27A is a schematic diagram of one embodiment of an electrical system for generating brake pad data.

FIG. 27A is a schematic diagram of one embodiment of an electrical system 500 for generating brake pad data. The electrical system 500 includes a sensorized brake pad 501, a control unit 502, and a cable 503.

The illustrated sensorized brake pad 501 includes sensors 511, a backplate 513, and a connector 514. The sensors 511 include a first piezoelectric sensor 521a, a second piezoelectric sensor 521b, and a third piezoelectric sensor 521c. Although the illustrated embodiment includes three piezoelectric sensors, a sensorized brake pad can include more or fewer sensors.

In the illustrated embodiment, a passive analog front end (AFE) is integrated on the backplate 513. A passive AFE is also referred to herein as a passive conditioning stage. The illustrated passive AFE includes a first resistor 522a in parallel with the first piezoelectric sensor 521a, a second resistor 522b in parallel with the second piezoelectric sensor 521b, and a third resistor 522c in parallel with the third piezoelectric sensor 521c. Although one implementation of a passive AFE is shown, other implementations are possible.

In the illustrated embodiment, the cable 503 includes an active AFE 515 integrated therein. An active AFE is also referred to herein as an active conditioning stage. As shown in FIG. 27A, the active AFE 515 includes operational amplifiers 523a-523c connected as buffers, and used to buffer analog condition signals generated by the passive AFE. Although an embodiment using operational amplifiers is shown, other implementations of an active AFE are possible.

The active AFE 515 is powered using a power high supply VDD and a power low supply VSS provided by the control unit 502, in this embodiment. Additionally, the control unit 502 provides ground to the sensors 511 and to the resistors 522a-522c of the passive AFE. As shown in FIG. 27A, the ground is also used by the ADCs 524a-524c. The ground provided by the control unit 502 is common to the sensors 511, in this embodiment.

As shown in FIG. 27A, the control unit 502 includes a digitizer 516, a digital integration stage 517, and a low frequency noise filtering circuit 518. The digitizer 516 includes analog-to-digital converters (ADCs) 524a-524c, in this embodiment. The ADCs 524a-524c generate digitized signals by providing analog-to-digital conversion to the buffered analog output signals generated by the operational amplifiers 523a-523c, respectively. The control unit 502 further includes a digital integration stage 517 that integrates the digitized signals from the ADCs 524a-524c. The integrated digital signals are provided to the low frequency noise filtering circuit 518, which filters the integrated digital signals to generate brake pad data that includes a digital representation of the electrical signals generated by the sensors 511.

In the illustrated embodiment, the passive AFE is integrated with the backplate 513 of the sensorized brake pad 501, and the active AFE 503 is integrated with the cable 503.

Additional details of the electrical system 500 can be as described earlier.

Figure 27B:
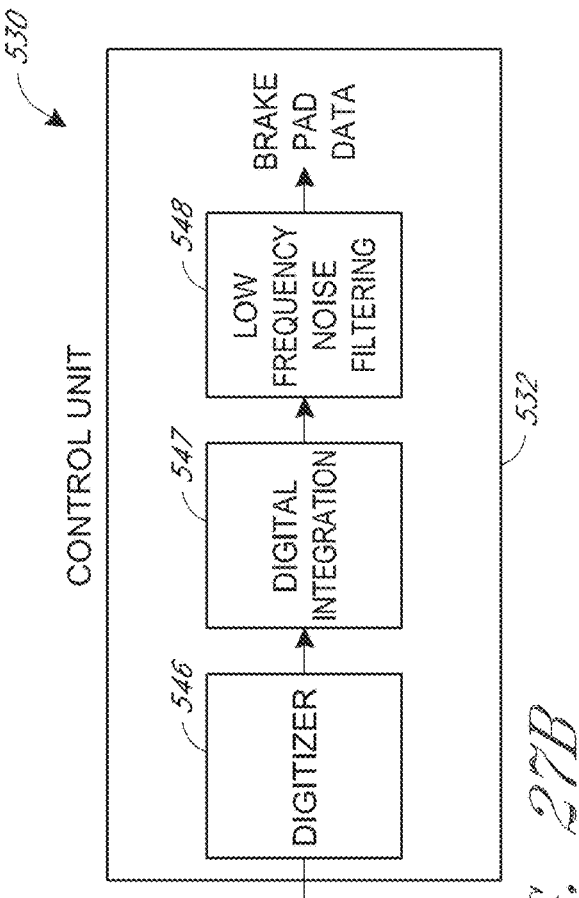
FIG. 27B is a schematic diagram of another embodiment of an electrical system for generating brake pad data.

FIG. 27B is a schematic diagram of another embodiment of an electrical system 530 for generating brake pad data. The electrical system 530 includes a sensorized brake pad 531, a control unit 532, and a cable 533.

The sensorized brake pad 531 includes sensor(s) 541, a backplate 543, and a connector 544. Additionally, the control unit 532 includes a digitizer 546, a digital integration stage 547, and a low frequency noise filtering stage 548.

In the illustrated embodiment, the passive AFE 542 is integrated with the backplate 543 of the sensorized brake pad 531, and the active AFE 545 is integrated with the connector 544.

Additional details of the electrical system 530 can be as described earlier.

Figure 27C:
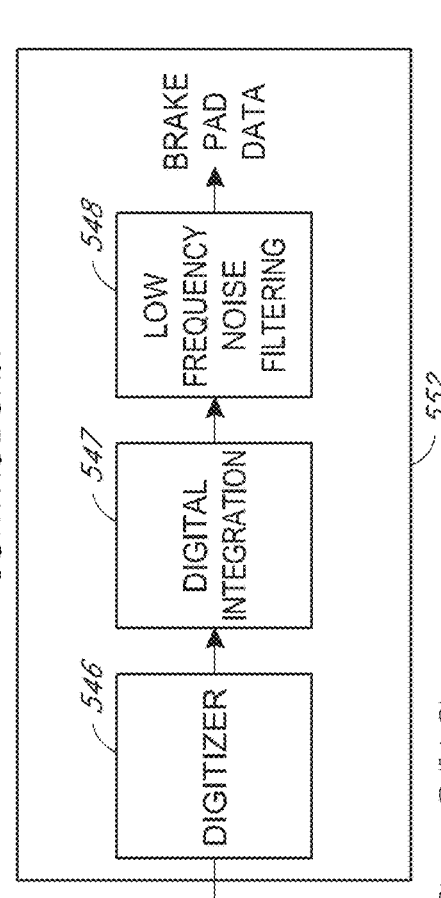
FIG. 27C is a schematic diagram of another embodiment of an electrical system for generating brake pad data.

FIG. 27C is a schematic diagram of another embodiment of an electrical system 550 for generating brake pad data. The electrical system 550 includes a sensorized brake pad 551, a control unit 552, and a cable 533.

The sensorized brake pad 551 includes sensor(s) 541 and a connector 554. Additionally, the control unit 552 includes a digitizer 546, a digital integration stage 547, and a low frequency noise filtering stage 548.

In the illustrated embodiment, the passive AFE 542 and the active AFE 545 are both integrated with the connector 554. In certain configurations, the passive AFE 542 is implemented on a fixed part of the connector 554 and the active AFE 545 is implemented on a flying part of the connector 554.

Additional details of the electrical system 550 can be as described earlier.

FIG. 27D is a schematic diagram of another embodiment of an electrical system 560 for generating brake pad data. The electrical system 560 includes a sensorized brake pad 561, a control unit 562, and a cable 563.

The sensorized brake pad 561 includes sensor(s) 541 and a connector 564. Additionally, the control unit 562 includes a digitizer 546, a digital integration stage 547, and a low frequency noise filtering stage 548. Furthermore, the cable 563 includes the active AFE 545.

In the illustrated embodiment, the passive AFE 542 is integrated with the connector 564, and the active AFE 545 is integrated with the cable 563.

Additional details of the electrical system 560 can be as described earlier.

FIG. 27E is a schematic diagram of another embodiment of an electrical system 570 for generating brake pad data. The electrical system 570 includes a sensorized brake pad 571, a control unit 572, and a cable 573.

The sensorized brake pad 571 includes sensor(s) 541 and a connector 574. Additionally, the control unit 572 includes a digitizer 546, a digital integration stage 547, and a low frequency noise filtering stage 548. Furthermore, the cable 573 includes the passive AFE 542 and the active AFE 545, which are physically separated from one another to provide thermal decoupling.

Additional details of the electrical system 570 can be as described earlier.

Figure 27F:
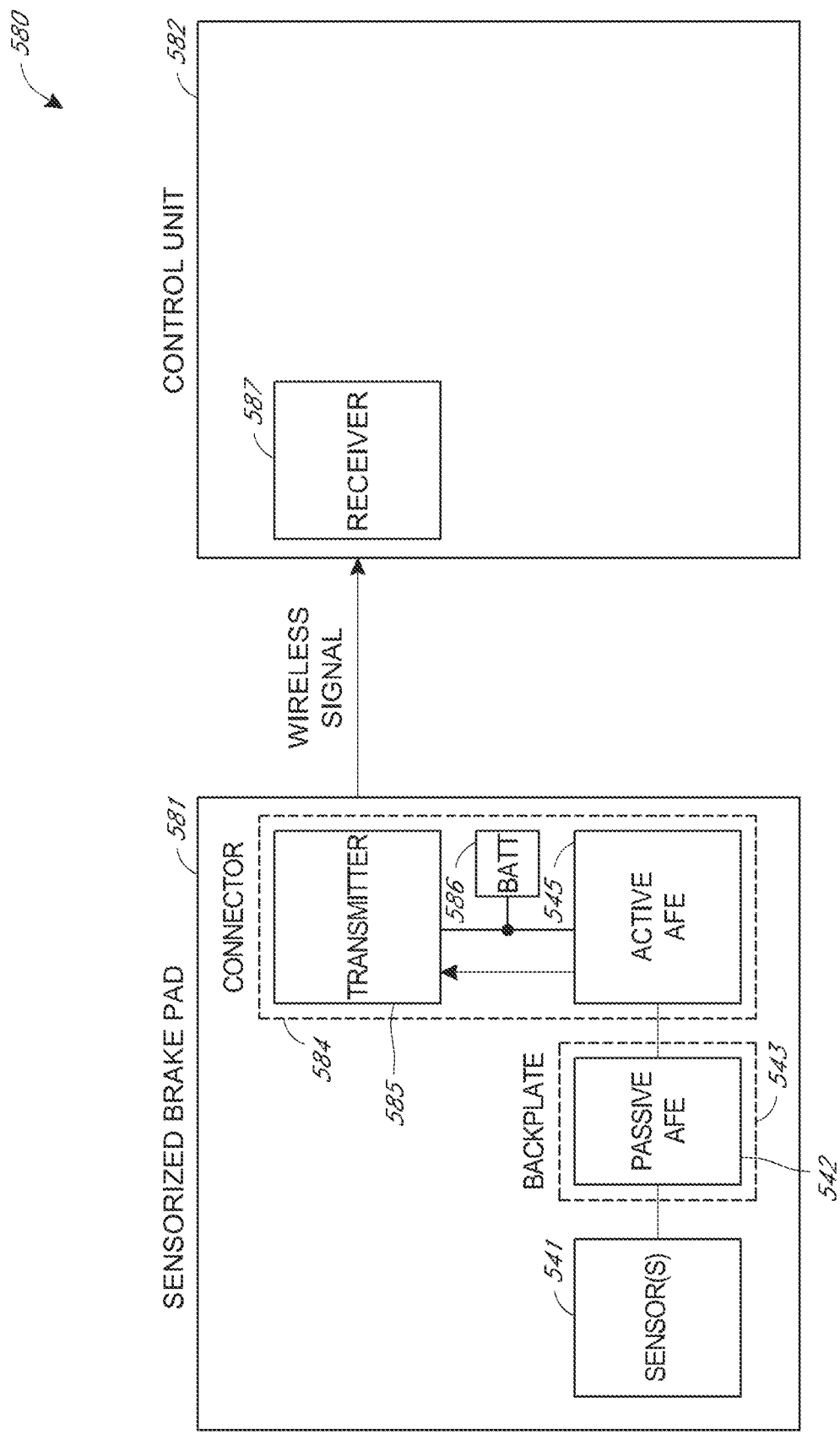
FIG. 27F is a schematic diagram of another embodiment of an electrical system for generating brake pad data.

FIG. 27F is a schematic diagram of another embodiment of an electrical system 580 for generating brake pad data. The electrical system 580 includes a sensorized brake pad 581 and a control unit 582.

The sensorized brake pad 581 includes sensor(s) 541, a backplate 543, and a connector 584. The backplate 543 includes the passive AFE 542. Additionally, the connector 584 includes the active AFE 545, a battery 586, and a transmitter 585. As shown in FIG. 27F, the battery 586 powers the active AFE 545 and the transmitter 585.

The control unit 572 includes a receiver 587. The control unit 572 can further include a digitizer, a digital integration stage, and a low frequency noise filtering stage. In one embodiment, a digitizer is omitted from the control unit 582 in favor of providing analog-to-digital conversion prior to wireless transmission by the transmitter 585.

In certain implementations, the connector 584 is not connected to a cable. In other implementations, a cable also connected between the sensorized brake pad 581 and the control unit 582 via the connector 584. In one example, the cable can be used to provide ground to the sensor(s) 541.

Additional details of the electrical system 580 can be as described earlier.

Figure 27G:
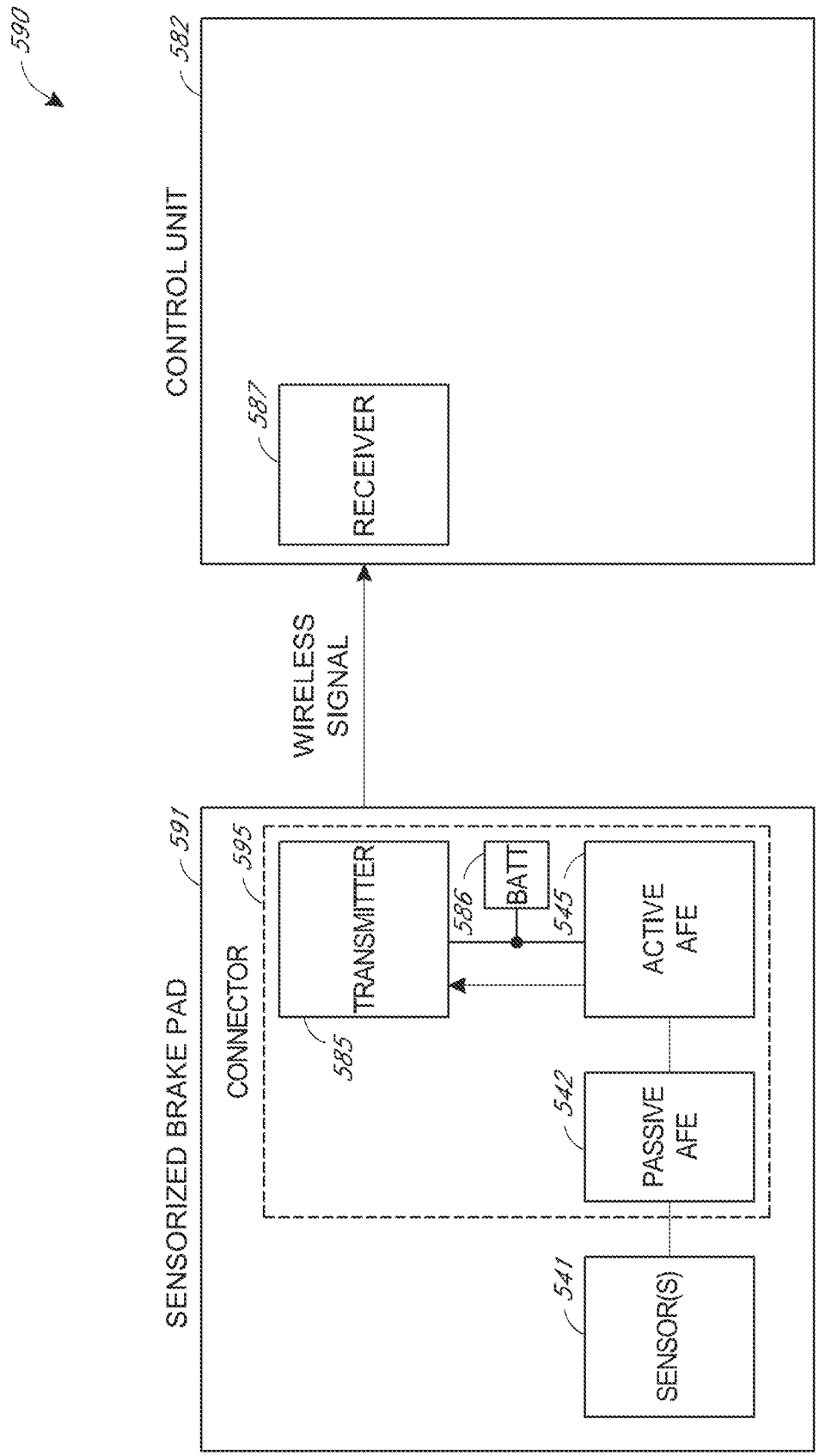
FIG. 27G is a schematic diagram of another embodiment of an electrical system for generating brake pad data.

FIG. 27G is a schematic diagram of another embodiment of an electrical system 590 for generating brake pad data. The electrical system 590 includes a sensorized brake pad 591 and a control unit 582.

The sensorized brake pad 591 includes sensor(s) 541 and a connector 595. The connector 585 includes the passive AFE 542, the active AFE 545, the battery 586, and the transmitter 585.

Additional details of the electrical system 590 can be as described earlier.

With reference to FIGS. 27A-27G, an electrical sensor from a piezoelectric sensor can be processed by an analog stage and a subsequent digital stage. The analog stage can include a cascade of a passive AFE and an active AFE. Additionally, the digital stage can be implemented by a control unit, which can be, for example, a stability control unit, a traction control unit, a brake control unit, or other electronic control unit.

The analog stage and the digital stage may be mutually connected by the electric cable (FIGS. 27A, 27B, 27C, 27D, 27E) or may have a wireless mutual connection provided by a transmitter 585 powered by a battery 586 installed in the sensorized brake pad and a receiver 587 of the control unit 582 (FIGS. 27F, 27G). In certain implementations, a sensorized brake pad and a control unit each include a transceiver, thereby permitting two-way communications between the sensorized brake pad and the control unit.

In certain implementations, a passive AFE of the analog stage is placed on or relatively close to a sensorized braking pad.

For example, a passive AFE of the analog stage may be integrated in a backplate (FIGS. 27A, 27B, 27F), in a connector (FIGS. 27C, 27D, 27G), in a cable (FIG. 27E), or in any other suitable location.

A passive AFE of the analog stage includes only passive components (for instance, a resistor of about 10 MΩ) closed to ground.

In case of wired communication through the cable between the analog stage and the digital stage of the conditioner, the ground of the piezoelectric sensors may be provided by the cable itself (see for instance FIG. 27A). In certain implementations, the passive AFE is implemented using screen printing, and is insulated from the backplate. To reduce or eliminate current loops, the ground can be provided by the control unit and be common to all sensors. In certain implementations, the ground of the control unit is connected to the ground of the vehicle through a small resistance of, for instance, about 1 kΩ.

The active AFE includes the above mentioned buffer(s) or other analog processing circuitry, and is located in between the passive AFE and the digital stage.

The passive components of the passive analog stage, when integrated into a backplate, can use high temperature-resistant screen printing techniques. In certain implementations, the passive components are directly screen printed upon a backplate or screen printed on a thin circuit or a thin substrate (for instance, less than about 1 mm, or more preferably 100-200 μm), which can be soldered to the backplate. In one example, wiring can be directly connected to the flying portion of a connector by soldering to the pin of the connector or by crimping on the pins. In another example, direct welding can be performed to conductive pads created for this purpose via screen printing on the backplate.

The active AFE can be integrated in a cable (FIGS. 27A, 27D, 27E), a connector (FIGS. 27B, 27C, 27F, 27G), or in another suitable location.

Figure 28:
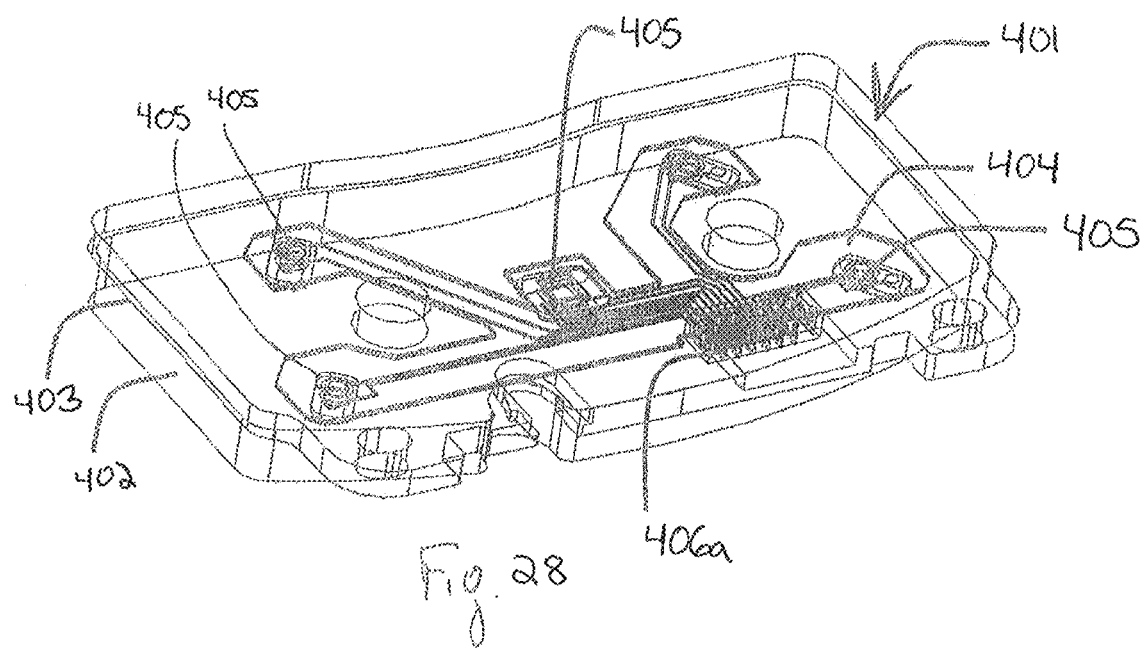
FIG. 28 shows one embodiment of a braking pad.

FIG. 28 shows one embodiment of a braking pad 401. The braking pad 401 includes a support element or backplate 402, a block of friction material 403, an electrical circuit 404 including screen printed conductors, piezoceramic sensors 405, and a connector fixed part 406a.

Figure 29:
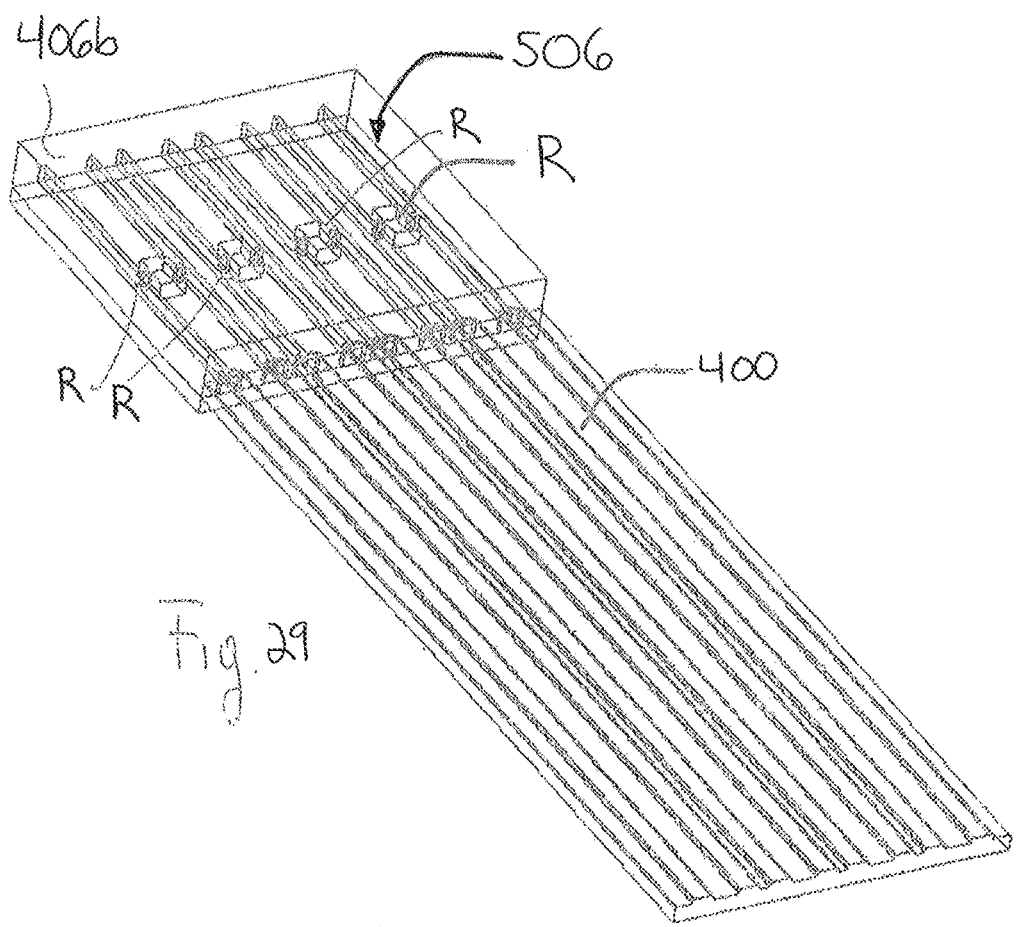
FIG. 29 shows one embodiment a portion of a connector and of a cable for the braking pad of FIG. 28.

FIG. 29 shows one embodiment a portion of a connector and of a cable 400 for the braking pad 401 of FIG. 28. As shown in FIG. 29, a connector flying portion 406b includes a passive AFE 506 integrated therein. In the illustrated embodiment the passive AFE 506 includes resistors R. However, other implementations are possible.

Figure 30:
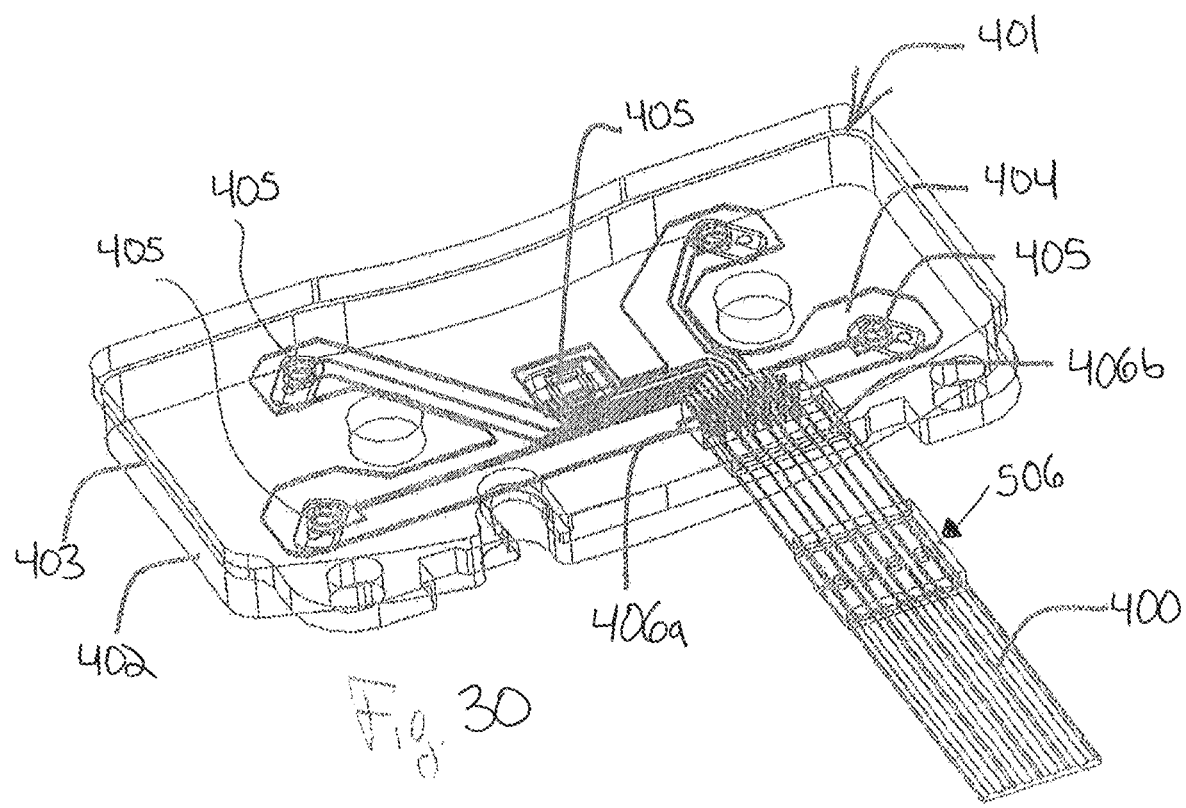
FIG. 30 shows one embodiment of a braking pad with a passive analog stage integrated in a cable.

FIG. 30 shows one embodiment of a braking pad 401 with a passive AFE 506 integrated in a cable 400.

Figure 31A:
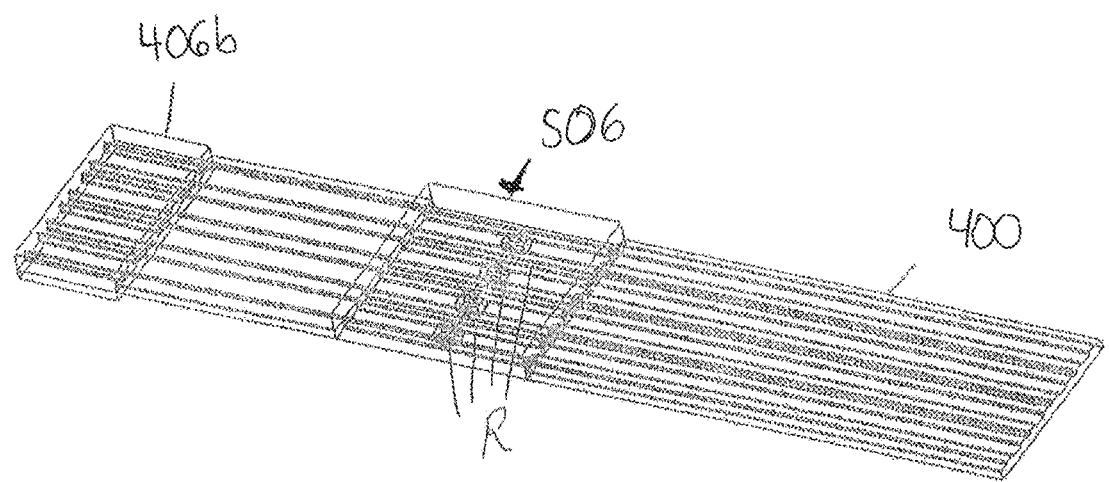
FIGS. 31A and 31B are perspective views of the cable of FIG. 30.
Figure 31B:
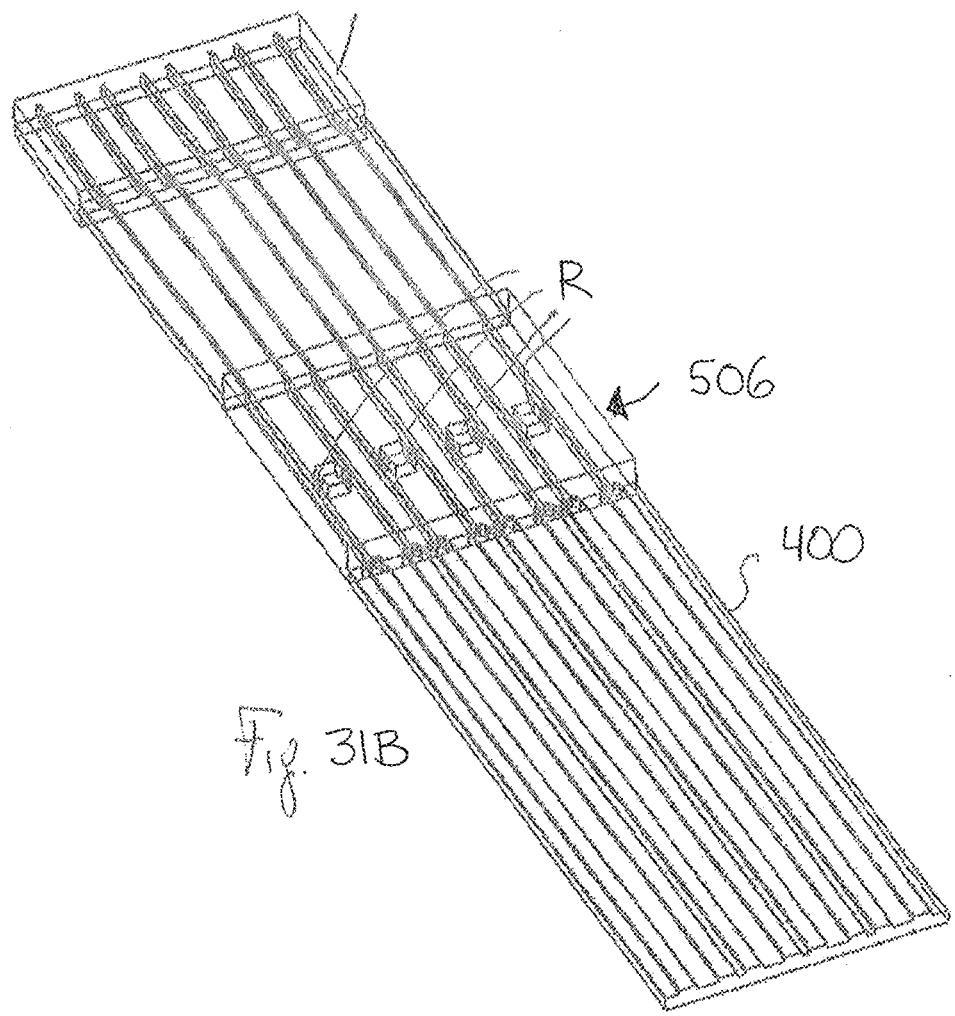

FIGS. 31A and 31B are perspective views of the cable 400 of FIG. 30.

FIG. 32 is a graph of one example of channel voltage amplitude versus time for a braking event.

The graph of FIG. 32 shows an example of a double peak, one positive and one negative, that represents the beginning and end of the braking event. Although one example of channel voltage amplitude versus time is shown, other voltage amplitudes versus time are possible.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a device configured to carry out recitations A, B, and C" can include a first device configured to carry out recitation A working in conjunction with a second device configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Various smart braking devices, systems, and methods have been disclosed in the context of certain embodiments and examples above. However, this disclosure extends beyond the specifically disclosed embodiments to other alternative embodiments and/or uses and obvious modifications and equivalents thereof. In particular, while the smart braking devices, systems, and methods has been described in the context of illustrative embodiments, certain advantages, features, and aspects of the devices, systems, and methods may be realized in a variety of other applications. Various features and aspects of the disclosed embodiments can be combined with or substituted for one another in order to form varying modes of the devices, systems, and methods. The scope of this disclosure should not be limited by the particular disclosed embodiments described herein.

Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of smart braking systems and methods, and other systems and methods, have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. A sensorized brake pad comprising:
   a backplate;
   a block of friction material supported by the backplate;
   a passive electrical circuit interposed between the backplate and the block of friction material, the passive electrical circuit including
      a piezoelectric sensor configured to generate a sensor signal, and
      a passive conditioning stage configured to generate an analog conditioned signal based on conditioning the sensor signal; and
   an active conditioning stage physically separated from and thermally decoupled from the passive conditioning stage, wherein
   the active conditioning stage is configured to generate an analog output signal based on processing the analog conditioned signal.

2. The sensorized brake pad of claim 1, further comprising a connector, wherein the passive conditioning stage is integrated into the connector.

3. The sensorized brake pad of claim 2, wherein the passive conditioning stage is integrated into a fixed part of the connector and the active conditioning stage is integrated into a flying part of the connector.

4. The sensorized brake pad of claim 1, further comprising a connector, wherein the active conditioning stage is integrated into the connector.

5. The sensorized brake pad of claim 1, wherein the active conditioning stage is separated from the passive conditioning stage by at least about 2 cm.

6. The sensorized brake pad of claim 1, further comprising a transmitter configured to receive the analog output signal and to transmit a wireless signal representing the analog output signal to a control unit that is located externally from the sensorized brake pad.

7. The sensorized brake pad of claim 1, wherein the passive conditioning stage comprises a resistor electrically connected in parallel with the piezoelectric sensor.

8. The sensorized brake pad of claim 1, wherein the passive conditioning stage comprises a resistor and a capacitor, wherein a first end of the resistor is electrically connected to a first terminal of the piezoelectric sensor via the capacitor, and wherein a second end of the resistor is electrically connected to a second terminal of the piezoelectric sensor.

9. The sensorized brake pad of claim 1, wherein the passive conditioning stage is integrated on the backplate.

10. The sensorized brake pad of claim 1, wherein the active conditioning stage is physically separated from and thermally decoupled from the backplate and the block of friction material.

11. The sensorized brake pad of claim 1, the sensorized brake pad further comprising a cable configured to connect the passive conditioning stage and the active conditioning stage, wherein the active conditioning stage is integrated in the cable.

12. A method of generating brake pad data for a vehicle, the method comprising:
   generating a sensor signal using a piezoelectric sensor interposed between a backplate and a block of friction material of a brake pad;
   generating an analog conditioned signal based on conditioning the sensor signal using a passive conditioning stage;
   generating an analog output signal based on processing the analog conditioned signal using an active conditioning stage, the active conditioning stage being physically separated from and thermally decoupled from the passive conditioning stage;
   providing the analog output signal to a control unit that is located externally from the brake pad; and
   processing the analog output signal using the control unit to generate brake pad data.

13. The method of claim 12, wherein processing the analog output signal using the control unit comprises digitizing the analog output signal to generate a digitized signal, integrating the digitized signal to generate an integrated signal, and generating the brake pad data by low frequency noise filtering of the integrated signal.

14. An electrical system for generating brake pad data for a vehicle, wherein the electrical system comprises:
   a piezoelectric sensor interposed between a backplate and a block of friction material of a brake pad, the piezoelectric sensor configured to generate a sensor signal;
   a passive conditioning stage configured to generate an analog conditioned signal based on conditioning the sensor signal;
   an active conditioning stage physically separated from and thermally decoupled from the passive conditioning stage, the active conditioning stage configured to generate an analog output signal based on processing the analog conditioned signal; and a control unit configured to process the analog output signal to generate the brake pad data, wherein the brake pad data comprises a digital representation of the sensor signal.

15. The electrical system of claim 14, wherein the active conditioning stage comprises an operational amplifier configured to buffer the analog conditioned signal.

16. The electrical system of claim 14, wherein the passive conditioning stage comprises a resistor electrically connected in parallel with the piezoelectric sensor.

17. The electrical system of claim 14, wherein the control unit comprises a digitizer configured to generate a digital signal based on digitizing the analog output signal, a digital integration stage configured to generate a digital integrated signal based on integrating the digital signal, and a low frequency noise filtering stage configured to generate the brake pad data based on filtering the digital integrated signal.

18. The electrical system of claim 14, further comprising a cable, wherein the sensorized brake pad comprises a connector, wherein the cable electrically connects the control unit to the sensorized brake pad via the connector.

19. The electrical system of claim 14, further comprising a transmitter configured to receive the analog output signal and to transmit a wireless signal representing the analog output signal to the control unit.

20. The electrical system of claim 14, wherein the active conditioning stage is physically separated from and thermally decoupled from the backplate and the block of friction material.

\* \* \* \* \*